(12) United States Patent
Rentz et al.

(10) Patent No.: US 11,963,064 B2
(45) Date of Patent: Apr. 16, 2024

(54) RECREATIONAL VEHICLE GROUP MANAGEMENT SYSTEM

(71) Applicant: Polaris Industries Inc., Medina, MN (US)

(72) Inventors: Gray I. Rentz, Waconia, MN (US); Adam C. Koosmann, Osceola, WI (US); Nathan A. Good, Wyoming, MN (US); Jacob H. Larson, Minneapolis, MN (US); Rebecca C. Deitz, Vadnais Heights, MN (US); David J. Koenig, Wyoming, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 17/408,036

(22) Filed: Aug. 20, 2021

(65) Prior Publication Data

US 2022/0116741 A1    Apr. 14, 2022

Related U.S. Application Data

(63) Continuation of application No. 16/811,865, filed on Mar. 6, 2020, now Pat. No. 11,102,612, which is a
(Continued)

(51) Int. Cl.
*H04W 4/21*     (2018.01)
*G06Q 10/047*   (2023.01)
(Continued)

(52) U.S. Cl.
CPC .......... *H04W 4/023* (2013.01); *G06Q 10/047* (2013.01); *G06Q 10/06311* (2013.01); *G06Q 10/06315* (2013.01); *H04W 4/21* (2018.02)

(58) Field of Classification Search
CPC ..... H04W 4/023; H04W 4/206; H04W 4/025; H04W 4/04; H04W 4/008; H04W 4/02;
(Continued)

(56) References Cited

U.S. PATENT DOCUMENTS

| | | | |
|---|---|---|---|
| 3,784,839 A | 1/1974 | Weber | |
| 3,987,408 A | 10/1976 | Sassover et al. | |

(Continued)

FOREIGN PATENT DOCUMENTS

| | | | |
|---|---|---|---|
| CA | 2260292 A1 | 7/2000 | |
| CA | 2525965 A1 | 12/2004 | |

(Continued)

OTHER PUBLICATIONS

RPM8000 TacTrack web page, "New RPM8000 Device Manager Software Available Free!," Atgo Technologies, 2 pgs., downloaded on Dec. 12, 2008 from www.atgotech.com.
(Continued)

*Primary Examiner* — Jean A Gelin
(74) *Attorney, Agent, or Firm* — Faegre Drinker Biddle & Reath LLP

(57) ABSTRACT

Systems and methods are provided to permit groups of recreational vehicle riders and others the ability to quickly create and join groups without prior knowledge of the contact information of everyone in the group. In one embodiment, groups are joinable based on the proximity information of the prospective member and the current group members.

15 Claims, 38 Drawing Sheets

Related U.S. Application Data continuation of application No. 16/043,514, filed on Jul. 24, 2018, now Pat. No. 10,595,160, which is a continuation of application No. 15/428,950, filed on Feb. 9, 2017, now Pat. No. 10,038,977.

(60) Provisional application No. 62/293,471, filed on Feb. 10, 2016.

(51) Int. Cl.
   *G06Q 10/0631* (2023.01)
   *H04W 4/02* (2018.01)

(58) Field of Classification Search
   CPC ..... H04W 4/21; G01C 21/3682; G01C 21/20; G01C 21/34; G01C 21/3667; G01C 21/3676; G01C 21/3691; G06Q 10/047; G06Q 10/06315; G06Q 10/06311
   See application file for complete search history.

(56) References Cited

U.S. PATENT DOCUMENTS

| | | | |
|---|---|---|---|
| 4,532,507 A | 7/1985 | Edson et al. | |
| 4,675,865 A | 6/1987 | Devries et al. | |
| 4,682,062 A | 7/1987 | Weinberger | |
| 4,696,148 A | 9/1987 | Brace | |
| 4,715,031 A | 12/1987 | Crawford et al. | |
| 4,745,596 A | 5/1988 | Sato | |
| 4,805,923 A | 2/1989 | Soltis | |
| 4,819,174 A | 4/1989 | Furuno et al. | |
| 4,903,983 A | 2/1990 | Fukushima et al. | |
| 4,927,170 A | 5/1990 | Wada | |
| 4,930,082 A | 5/1990 | Harara et al. | |
| 4,949,262 A | 8/1990 | Buma et al. | |
| 4,991,683 A | 2/1991 | Garretto et al. | |
| 5,023,591 A | 6/1991 | Edwards | |
| 5,037,128 A | 8/1991 | Okuyama et al. | |
| 5,040,168 A | 8/1991 | Maue et al. | |
| 5,054,813 A | 10/1991 | Kakizaki | |
| 5,070,832 A | 12/1991 | Hapka et al. | |
| 5,081,586 A | 1/1992 | Barthel et al. | |
| 5,083,811 A | 1/1992 | Sato et al. | |
| 5,092,624 A | 3/1992 | Fukuyama et al. | |
| 5,113,345 A | 5/1992 | Mine et al. | |
| 5,114,177 A | 5/1992 | Fukunaga et al. | |
| 5,144,559 A | 9/1992 | Kamimura et al. | |
| 5,168,957 A | 12/1992 | Ross | |
| 5,191,531 A | 3/1993 | Kurosu et al. | |
| 5,311,514 A | 5/1994 | Cook | |
| 5,375,872 A | 12/1994 | Ohtagaki et al. | |
| 5,383,680 A | 1/1995 | Bock et al. | |
| 5,418,526 A | 5/1995 | Crawford | |
| 5,474,146 A | 12/1995 | Yoshioka et al. | |
| 5,491,631 A | 2/1996 | Shirane et al. | |
| 5,513,107 A | 4/1996 | Gormley | |
| 5,732,359 A | 3/1998 | Baranowsky et al. | |
| 5,742,226 A | 4/1998 | Szabo et al. | |
| 5,767,771 A | 6/1998 | Lamont | |
| 5,769,051 A | 6/1998 | Bayron et al. | |
| 5,803,043 A | 9/1998 | Bayron et al. | |
| 5,856,976 A | 1/1999 | Hirano | |
| 5,869,907 A | 2/1999 | Marler | |
| 5,886,627 A | 3/1999 | Brady et al. | |
| 6,006,161 A | 12/1999 | Katou | |
| 6,060,981 A | 5/2000 | Landes | |
| 6,122,568 A | 9/2000 | Madau et al. | |
| 6,124,826 A | 9/2000 | Garthwaite et al. | |
| 6,125,326 A * | 9/2000 | Ohmura ........... | G08G 1/096861 |
| | | | 701/470 |
| 6,125,782 A | 10/2000 | Takashima et al. | |
| 6,154,132 A | 11/2000 | Iwamoto et al. | |
| 6,154,703 A | 11/2000 | Nakai et al. | |
| 6,157,297 A | 12/2000 | Nakai | |
| 6,157,890 A | 12/2000 | Nakai et al. | |
| 6,249,727 B1 | 6/2001 | Muller | |
| 6,249,744 B1 | 6/2001 | Morita | |
| 6,275,231 B1 | 8/2001 | Obradovich | |
| 6,290,034 B1 | 9/2001 | Ichimaru | |
| 6,304,819 B1 | 10/2001 | Agnew et al. | |
| 6,339,745 B1 | 1/2002 | Novik | |
| 6,343,248 B1 | 1/2002 | Rizzotto et al. | |
| 6,356,186 B1 | 3/2002 | Price et al. | |
| 6,427,115 B1 | 7/2002 | Sekiyama | |
| 6,430,488 B1 | 8/2002 | Goldman et al. | |
| 6,431,301 B1 | 8/2002 | Forbes | |
| 6,463,385 B1 | 10/2002 | Fry | |
| 6,476,714 B2 | 11/2002 | Mizuta | |
| 6,483,467 B2 | 11/2002 | Kushida et al. | |
| 6,526,342 B1 | 2/2003 | Burdock et al. | |
| 6,595,811 B2 | 7/2003 | Dagenais et al. | |
| 6,640,164 B1 | 10/2003 | Farwell et al. | |
| 6,684,140 B2 | 1/2004 | Lu | |
| 6,697,966 B1 | 2/2004 | Smuk et al. | |
| 6,700,504 B1 | 3/2004 | Aslandogan et al. | |
| 6,744,985 B1 | 6/2004 | Smuk et al. | |
| 6,756,697 B2 | 6/2004 | Mizutani et al. | |
| 6,772,061 B1 | 8/2004 | Berthiaume et al. | |
| 6,784,569 B1 | 8/2004 | Peller | |
| 6,806,590 B1 | 10/2004 | Smuk et al. | |
| 6,839,630 B2 | 1/2005 | Sakamoto | |
| 6,871,250 B2 | 3/2005 | Froeschl et al. | |
| 6,876,924 B2 | 4/2005 | Morita et al. | |
| 6,898,656 B2 | 5/2005 | Griessbach et al. | |
| 6,987,446 B2 | 1/2006 | Konno et al. | |
| 7,044,814 B2 | 5/2006 | Kamio et al. | |
| 7,058,506 B2 | 6/2006 | Kawase et al. | |
| 7,092,808 B2 | 8/2006 | Lu et al. | |
| 7,104,352 B2 | 9/2006 | Weinzierl | |
| 7,123,189 B2 | 10/2006 | Lalik et al. | |
| 7,222,006 B2 | 5/2007 | Proefke et al. | |
| 7,227,283 B2 | 6/2007 | Suzuki | |
| 7,263,379 B1 | 8/2007 | Parkulo et al. | |
| 7,394,352 B2 | 7/2008 | Bell et al. | |
| 7,546,182 B2 | 6/2009 | Mudalige | |
| 7,891,004 B1 | 2/2011 | Gelvin et al. | |
| 7,904,569 B1 | 3/2011 | Gelvin et al. | |
| 8,005,911 B2 | 8/2011 | Jhanji | |
| 8,060,400 B2 | 11/2011 | Wellman | |
| 8,326,338 B1 | 12/2012 | Vasilevsky | |
| 8,610,550 B2 | 12/2013 | Hagiwara et al. | |
| 8,620,515 B2 | 12/2013 | Kwak | |
| 8,994,494 B2 | 3/2015 | Koenig et al. | |
| 9,026,367 B2 | 5/2015 | Paek et al. | |
| 9,143,601 B2 | 9/2015 | Padmanabhan et al. | |
| 9,324,195 B2 | 4/2016 | Koenig et al. | |
| 9,494,938 B1 | 11/2016 | Kemler et al. | |
| 9,501,920 B2 | 11/2016 | Harring et al. | |
| 9,613,386 B1 | 4/2017 | Arden et al. | |
| 9,644,969 B2 | 5/2017 | Koenig et al. | |
| 9,646,502 B1 | 5/2017 | Gentry | |
| 9,733,096 B2 | 8/2017 | Colijn et al. | |
| 9,996,236 B1 | 6/2018 | Spencer-Harper et al. | |
| 10,038,977 B2 | 7/2018 | Rentz et al. | |
| 10,154,377 B2 | 12/2018 | Post et al. | |
| 10,198,707 B1 | 2/2019 | Bolton et al. | |
| 10,203,220 B2 | 2/2019 | Koenig et al. | |
| 10,607,485 B2 * | 3/2020 | Gupta ................ | G06F 3/0482 |
| 10,715,962 B2 | 7/2020 | Liang et al. | |
| 10,856,251 B2 | 12/2020 | Khan et al. | |
| 11,209,286 B2 | 12/2021 | Koenig et al. | |
| 2001/0044677 A1 | 11/2001 | Bauer et al. | |
| 2002/0042670 A1 | 4/2002 | Diaz et al. | |
| 2002/0059075 A1 | 5/2002 | Schick et al. | |
| 2002/0113185 A1 | 8/2002 | Ziegler | |
| 2002/0171291 A1 | 11/2002 | Wayne et al. | |
| 2002/0177949 A1 | 11/2002 | Katayama et al. | |
| 2003/0036360 A1 | 2/2003 | Russell et al. | |
| 2003/0046000 A1 | 3/2003 | Morita et al. | |
| 2003/0070020 A1 | 4/2003 | Kondo et al. | |
| 2003/0078042 A1 | 4/2003 | Miriyala et al. | |
| 2003/0097211 A1 | 5/2003 | Carroll et al. | |
| 2003/0105567 A1 | 6/2003 | Koenig et al. | |
| 2003/0187555 A1 | 10/2003 | Lutz et al. | |

(56) References Cited

U.S. PATENT DOCUMENTS

| | | |
|---|---|---|
| 2004/0003153 A1 | 1/2004 | Froeschl et al. |
| 2004/0011096 A1 | 1/2004 | Quinn et al. |
| 2004/0015603 A1 | 1/2004 | Griessbach et al. |
| 2004/0048598 A1 | 3/2004 | Gagnon |
| 2004/0164850 A1 | 8/2004 | Konno et al. |
| 2004/0186929 A1 | 9/2004 | Salerno |
| 2004/0215861 A1 | 10/2004 | Beaudoin et al. |
| 2004/0227695 A1 | 11/2004 | Schedivy |
| 2004/0254690 A1 | 12/2004 | Hasegawa et al. |
| 2005/0065678 A1 | 3/2005 | Smith et al. |
| 2005/0125565 A1 | 6/2005 | Ying |
| 2005/0190080 A1 | 9/2005 | Flick |
| 2005/0222716 A1 | 10/2005 | Tengler et al. |
| 2006/0068822 A1 | 3/2006 | Kalhan |
| 2006/0226961 A1 | 10/2006 | Bell et al. |
| 2006/0229811 A1 | 10/2006 | Herman et al. |
| 2006/0265117 A1 | 11/2006 | Cahoon |
| 2007/0003162 A1 | 1/2007 | Miyoshi et al. |
| 2007/0005202 A1 | 1/2007 | Breed |
| 2007/0050095 A1 | 3/2007 | Nelson et al. |
| 2007/0126628 A1 | 6/2007 | Lalik et al. |
| 2007/0150140 A1 | 6/2007 | Seymour |
| 2007/0152804 A1 | 7/2007 | Breed et al. |
| 2007/0222293 A1 | 9/2007 | Shimomura |
| 2007/0233864 A1 | 10/2007 | Xie et al. |
| 2007/0279344 A1 | 12/2007 | Kimura et al. |
| 2007/0288480 A1 | 12/2007 | Caplan et al. |
| 2008/0019420 A1 | 1/2008 | Carbone et al. |
| 2008/0077309 A1 | 3/2008 | Cobbold |
| 2008/0084852 A1 | 4/2008 | Karschnia |
| 2008/0091352 A1 | 4/2008 | O'Hare |
| 2008/0132250 A1 | 6/2008 | Harris |
| 2008/0278314 A1 | 11/2008 | Miller et al. |
| 2009/0005928 A1 | 1/2009 | Sells et al. |
| 2009/0047068 A1 | 2/2009 | Bucalo |
| 2009/0085368 A1 | 4/2009 | Coffelt et al. |
| 2009/0322510 A1 | 12/2009 | Berger et al. |
| 2010/0069058 A1 | 3/2010 | Rothschild |
| 2010/0070180 A1 | 3/2010 | Ridenour |
| 2010/0080168 A1 | 4/2010 | Fukuyama |
| 2010/0088023 A1 | 4/2010 | Werner |
| 2010/0150122 A1 | 6/2010 | Berger et al. |
| 2010/0198508 A1 | 8/2010 | Tang |
| 2010/0325194 A1* | 12/2010 | Williamson .......... H04W 4/029 709/203 |
| 2011/0060480 A1 | 3/2011 | Mottla et al. |
| 2011/0142016 A1 | 6/2011 | Chatterjee |
| 2011/0149958 A1 | 6/2011 | Jeon et al. |
| 2012/0166533 A1 | 6/2012 | Rubinstein et al. |
| 2013/0018577 A1 | 1/2013 | Gooding |
| 2013/0088369 A1 | 4/2013 | Yu et al. |
| 2013/0091447 A1 | 4/2013 | Kang |
| 2013/0110739 A1 | 5/2013 | Hill et al. |
| 2013/0158860 A1 | 6/2013 | Gum |
| 2013/0179056 A1 | 7/2013 | Fukuyama |
| 2013/0226633 A1 | 8/2013 | Brock et al. |
| 2013/0246102 A1 | 9/2013 | Finegold et al. |
| 2013/0279393 A1 | 10/2013 | Rubin et al. |
| 2013/0290040 A1* | 10/2013 | Perry .................... G06Q 10/02 705/5 |
| 2014/0210644 A1 | 7/2014 | Breed |
| 2014/0244110 A1 | 8/2014 | Tharaldson et al. |
| 2014/0302774 A1 | 10/2014 | Burke et al. |
| 2014/0359131 A1 | 12/2014 | Seed et al. |
| 2014/0365913 A1* | 12/2014 | Santamaria ......... G06F 3/04842 715/748 |
| 2015/0141060 A1 | 5/2015 | Shan et al. |
| 2015/0177363 A1 | 6/2015 | Hermann et al. |
| 2015/0197215 A1 | 7/2015 | Koenig et al. |
| 2015/0323335 A1 | 11/2015 | Lord et al. |
| 2016/0003621 A1 | 1/2016 | Koenig et al. |
| 2016/0019788 A1 | 1/2016 | Milne et al. |
| 2016/0057639 A1 | 2/2016 | Smith |
| 2016/0124635 A1* | 5/2016 | Covington ............ G06F 3/0482 345/440 |
| 2016/0139596 A1 | 5/2016 | Na et al. |
| 2016/0198315 A1 | 7/2016 | Sakata |
| 2016/0238407 A1 | 8/2016 | Koenig et al. |
| 2016/0320195 A1 | 11/2016 | Liu et al. |
| 2016/0364678 A1* | 12/2016 | Cao ...................... G06Q 10/083 |
| 2017/0104824 A1 | 4/2017 | Bajwa et al. |
| 2017/0163746 A1 | 6/2017 | Kawato |
| 2017/0192426 A1 | 7/2017 | Rust |
| 2017/0193627 A1 | 7/2017 | Urmson et al. |
| 2017/0201850 A1 | 7/2017 | Raleigh et al. |
| 2017/0213554 A1 | 7/2017 | Faaborg |
| 2017/0230795 A1 | 8/2017 | Rentz et al. |
| 2017/0230799 A1 | 8/2017 | Wawrowski et al. |
| 2017/0302774 A1 | 10/2017 | Lei et al. |
| 2018/0011197 A1 | 1/2018 | Waldman et al. |
| 2018/0081614 A1* | 3/2018 | Tsai ..................... G06F 3/04883 |
| 2018/0101998 A1* | 4/2018 | Pierce .................. B60L 3/0015 |
| 2018/0225975 A1 | 8/2018 | Park |
| 2019/0110161 A1 | 4/2019 | Rentz et al. |
| 2019/0200173 A1 | 6/2019 | Puckette et al. |
| 2019/0200185 A1 | 6/2019 | Wotton |
| 2019/0200188 A1 | 6/2019 | Elgee et al. |
| 2019/0200189 A1 | 6/2019 | Wotton |
| 2019/0265064 A1 | 8/2019 | Koenig et al. |
| 2019/0288916 A1* | 9/2019 | Ricci ................. G08G 1/096725 |
| 2019/0320285 A1 | 10/2019 | Liang et al. |
| 2019/0347945 A1* | 11/2019 | Mohn ................ G06Q 10/0631 |
| 2020/0209012 A1 | 7/2020 | Koenig et al. |
| 2020/0213807 A1 | 7/2020 | Rentz et al. |
| 2021/0209691 A1* | 7/2021 | Salazar Ibanez ..... H04W 4/021 |
| 2022/0057227 A1* | 2/2022 | Koenig ................ G06F 3/0482 |

FOREIGN PATENT DOCUMENTS

| | | |
|---|---|---|
| CN | 1739125 A | 2/2006 |
| CN | 101031161 A | 9/2007 |
| CN | 101253067 A | 8/2008 |
| CN | 101320386 A | 12/2008 |
| CN | 101383983 A | 3/2009 |
| CN | 101410815 A | 4/2009 |
| CN | 201245187 Y | 5/2009 |
| CN | 102295004 A | 12/2011 |
| CN | 102328894 A | 1/2012 |
| CN | 102547729 A | 7/2012 |
| CN | 102571866 A | 7/2012 |
| CN | 102711037 A | 10/2012 |
| CN | 103002037 A | 3/2013 |
| CN | 103118071 A | 5/2013 |
| CN | 103269478 A | 8/2013 |
| CN | 103326942 A | 9/2013 |
| CN | 103373416 A | 10/2013 |
| CN | 103856566 A | 6/2014 |
| CN | 103971529 A | 8/2014 |
| CN | 104036279 A | 9/2014 |
| CN | 104468140 A | 3/2015 |
| CN | 104580468 A | 4/2015 |
| CN | 104811372 A | 7/2015 |
| CN | 104949684 A | 9/2015 |
| CN | 104994130 A | 10/2015 |
| CN | 105050053 A | 11/2015 |
| CN | 105074385 | 11/2015 |
| CN | 105141582 A | 12/2015 |
| CN | 105282220 A | 1/2016 |
| DE | 4017255 A1 | 12/1990 |
| DE | 4323589 A1 | 1/1994 |
| DE | 4326328 | 11/1994 |
| DE | 4431070 | 3/1996 |
| DE | 102012200672 A1 | 4/2013 |
| EP | 0723892 A2 | 7/1996 |
| EP | 0978433 A2 | 2/2000 |
| EP | 1005006 A2 | 5/2000 |
| EP | 1258706 A2 | 11/2002 |
| EP | 2975592 A1 | 1/2016 |
| EP | 3510576 A1 | 7/2019 |
| GB | 2232272 A | 12/1990 |
| GB | 2233939 A | 1/1991 |
| GB | 2234211 A | 1/1991 |
| JP | 07-186668 A | 7/1995 |
| JP | 09-203640 A | 8/1997 |

(56) References Cited

FOREIGN PATENT DOCUMENTS

| | | |
|---|---|---|
| JP | 2956221 B2 | 10/1999 |
| JP | 11-321754 A | 11/1999 |
| JP | 3087539 B2 | 9/2000 |
| JP | 2005-207943 A | 8/2005 |
| JP | 2005-266844 A | 9/2005 |
| JP | 2006-338282 A | 12/2006 |
| JP | 2007-272587 A | 10/2007 |
| JP | 2008-514140 A | 5/2008 |
| JP | 4584510 B2 | 11/2010 |
| JP | 2011-170762 A | 9/2011 |
| JP | 2012-068722 A | 4/2012 |
| JP | 2013-175057 A | 9/2013 |
| JP | 2015-197760 A | 11/2015 |
| JP | 2016-025659 A | 2/2016 |
| JP | 2016-095789 A | 5/2016 |
| JP | 2016-523751 A | 8/2016 |
| KR | 10-2013-0039203 A | 4/2013 |
| MX | 350397 B | 9/2017 |
| TW | M332597 U | 5/2008 |
| WO | 96/05975 A1 | 2/1996 |
| WO | 02/20318 A1 | 3/2002 |
| WO | 2006/110805 A2 | 10/2006 |
| WO | 2009/014861 A1 | 1/2009 |
| WO | 2013/137182 A1 | 9/2013 |
| WO | 2014/051473 A1 | 4/2014 |
| WO | 2014/134148 A2 | 9/2014 |
| WO | 2017/209666 A1 | 12/2017 |
| WO | 2018/049381 A1 | 3/2018 |

OTHER PUBLICATIONS

Snow Trails by RiderX on the App Store, iTunes Preview, downloaded from the Internet https://itunes.apple.com/us/app/snow-trails-by-riderx-id418680704?mt=8 on Oct. 22, 2015; 2 pages.
Sport Rider Online Magazine, 2005 BMW K1200S, downloaded on Jun. 30, 2005 from www.sportrider.com/bikes/2005/146_05_bmw_K12s; 5 pages.
SPOT Connect, downloaded from the Internet http://www.findmespot.com/en/index.php9ckM 16 on Oct. 22, 2015; 2 pages.
SPOT Global Phone, downloaded from the Internet http://www.findmespot.com/en/index.php9ckM23 on Oct. 22, 2015; 2 pages.
SPOT HUG, downloaded from the Internet http://www.findmespot.com/en/index.php9ckM13 on Oct. 22, 2015; 3 pages.
The SPOT Personal Tracker, downloaded from the Internet http://www.findmespot.com/en/index.php?cid=101 on Oct. 22, 2015; 2 pages.
The SPOT Satellite GPS Messenger, downloaded from the Internet http://www.findmespot.com/en/index.php?cid=102 on Oct. 22, 2015; 2 pages.
Valk, John, "The New BMW R1200 RT," 11 pgs., downloaded on Jul. 8, 2005 from www.johnvalkbmw.ca/2005/BMW/R1200RT/General-R1200RT-More.htm.
What is Glympse: Glympse, downloaded from the Internet, http://glympse.com/what-is-glympse on Oct. 22, 2015; 2 pages.
Written Opinion of the International Preliminary Examining Authority, dated May 15, 2017, for International Application No. PCT/US2017/017122; 8 pages.
"Automotive Electro Hydraulic Technology", Yang Huayong et al., Mechanical Industry Press, Oct. 2012; 16 pages.
"TrakMaps—Our Digital Maps & Charts"—Snowmobile Trails Tab, Jan. 28, 2013, retrieved from the Internet: URL: https://web.archive.org/web/20130128163653/http://www.trakmaps.com/ListGPSProduct . . . [retrieved on Nov. 10, 2015]; 2 pages.
"TrakMaps—Our Digital Maps & Charts"—Topography Tab, Jan. 6, 2013, retrieved from the Internet: URL: https://web.archive.org/web/20130106085557/http://www.trakmaps.com/ListGPSProduct . . . [retrieved on Nov. 10, 2015]; 2 pages.
"TrakMaps—Our Digital Maps & Charts"—ATV Trails Tab, Jan. 28, 2013, retrieved from the Internet: URL: https://web.archive.org/web/20130128164123/http://www.trakmaps.com/ListGPSProduct . . . [retrieved on Nov. 10, 2015]; 2 pages.
"TrakMaps—Our Digital Maps & Charts"—All Products Tab, Jan. 4, 2013, retrieved from the Internet: URL: https://web.archive.org/web/20130104230952/http://www.trakmaps.com/ListGPSProduct . . . [retrieved on Nov. 10, 2015]; 4 pages.
2004 Engine Preview—Volvo Penta; www.powerandmotoryacht.com/engines/0104preview/index.html; printed Jun. 30, 2005; 2 pgs.
Ackermann et al., "Robust steering control for active rollover avoidance of vehicles with elevated center of gravity", Jul. 1998, pp. 1-6.
Apple (United Kingdom)—Apps—Find My Friends, downloaded from the Internet http://www.apple.com/uk/apps/find-my-friends/ on Oct. 22, 2015; 4 pages.
Bhattacharyya et al., "An Approach to Rollover Stability In Vehicles Using Suspension Relative Position Sensors And Lateral Acceleration Sensors", Dec. 2005, 100 pages.
BMW Motorrad article, "Single Wire Systems and CAN bus," www.bmwmotorrad.com/technology; printed Jul. 8, 2005; 3 pgs.
BMW Motorrad Media Release, Overall Concept and Model Features, www/motorcycles.bmw.com.au/scripts/main.asp (Jul. 14, 2004); printed Jul. 8, 2005; 4 pgs.
BMW Motorrad of Santa Cruz On-Line Article, "Electrics and Electronics," www.bmwscruz.com/motorcycles/K1200S/K1200S.sub.-F4.html; printed Jul. 8, 2005; 3 pgs.
BMW Motorrad of South Africa, The Motorcycles, R1200GS SA Road Test, www.bmwmotorroad.co.za/bikes/tests/display.asp?Id=100, Feb. 2004 edition; 3 pages.
BMW Motorrad RepROM R-Modelle K2x1 Auflage, Nov. 2004 edition, (Copyright) BMW Motorrad, UX-VS-2, D-80778 Munchen, Nov. 2004, 1-Auflage, replacing main wiring harness; 19 pages.
BMW Motorrad; R 1200 RT Sales Brochure; Printed in Germany in Mar. 2005; Front Cover, Rear Cover and p. 26—Information at Your Fingertips—The Single Wire System; 3 pgs.
Buddy GPS Tracker for Android—Appszoom, downloaded from the Internet http://www.appszoom.com/android.applications/social/buddy-gps-tracker_hds- tk_htlm?ref=list_referer on Oct. 22, 2015; 5 pages.
Buddy Tracker for Android by Talentica Software (1) Pvt. Ltd.—Appszoom, downloaded from the Internet http://www.appszoom.com/android-app/buddy-tracker-movhy.html?ref=list_ref- erer on Oct. 22, 2015; 4 pages.
Buddy-Tracker, for Android by Mattias Leonhardt—Appszoo downloaded from the Internet http://www.appszoom.com/android-app/buddy-tracker-naxdx.html?ref=list_ref- erer on Nov. 15, 2015; 133 pages.
English translation of "Automotive Electro Hydraulic Technology", Yang Huayong et al., Mechanical Industry Press, Oct. 2012; 6 pages.
Find My Contacts on the App Store, iTunes Preview, downloaded from the Internet https://itunes.apple.com/us/app/find-my-contacts/id763404612?mt=- 8 on Nov. 15, 2015; 2 pages.
Ford Motor Company web page, "Ford's Mykey Feature Allows Fleet Owners to Control Speed and Radio Volume for Safety," 2 pgs., 2008, downloaded from www.ford.com/about-ford;news-announcements/press-releases.
Ford Motor Company, 2007 Explorer Owner's Guide (post-2002-fmt), pp. 1, and 124-126; 4 pgs.
Friends Tracker—Android Apps on Google Play, downloaded from the Internet https://play.google.com/store/apps/details?id=com.others_cell_tracker&h1=- en on Nov. 15, 2015; 3 pages.
GeoLLERY: view/edit GPS tags APK Download—Free Photography app for Android/APLPure.com, downloaded from the Internet http://apkpure.com/geollery-view-edit-gps-tags/com.pkg.geollery on Oct. 22, 2015; 2 pages.
GeoLLERY: view/edit GPS tags—Android Apps on Google Play, downloaded from the Internet https://play.google.com/store/apps/details?id=com.pkg.geollery on Nov. 15, 2015; 3 pages.
Glympse for Business, downloaded from the Internet http:/glympse.com/business on Oct. 22, 2015; 4 pages.
Glympse for Partners, downloaded from the Internet, http://glympse.com/partners, on Oct. 22, 2015; 4 pages.

(56) References Cited

OTHER PUBLICATIONS

Glympse Partners With BMW and Mini to Provide In-Car Location Sharing, Seattle, Mar. 27, 2013; 2 pages.
GPS-Trace Orange—Android Apps on Google Play, downloaded from the Internet https://play.google.com/store/apps/details?id=com.gurtam.gps_tra- ce_orange on Nov. 15, 2015; 3 pages.
Hac et al., "Improvements in vehicle handling through integrated control of chassis systems", Int. J. of Vehicle Autonomous Systems(IJVAS), vol. 1, No. 1, 2002, pp. 83-110.
Huang et al., "Nonlinear Active Suspension Control Design Applied to a Half-Car Model", Proceedings of the 2004 IEEE International Conference on Networking, Mar. 21-23. 2004, pp. 719-724.
International Preliminary Report on Patentability received for PCT Patent Application No. PCT/US2014/018638, dated Sep. 11, 2015, 8 pages.
International Preliminary Report on Patentability received for PCT Patent Application No. PCT/US2017/051120, dated Mar. 21, 2019, 9 pages.
International Preliminary Report on Patentability, issued by the International Preliminary Examining Authority, dated May 3, 2018, for related International Application No. PCT/US2017/017122; 22 pages.
International Search Report and Written Opinion issued by the International Searching Authority, dated May 20, 2019, or International Patent Application No. PCT/US2018/065973; 26 pages.
International Search Report and Written Opinion received for PCT Patent Application No. PCT/US2014/018638, dated Sep. 1, 2014, 10 pages.
International Search Report and Written Opinion received for PCT Patent Application No. PCT/US2017/051120, dated Dec. 15, 2017, 10 pages.
International Search Report issued by the International Searching Authority, dated May 15, 2017, for International Patent Application No. PCT/US2017/017122; 13 pages.
Jeep—The Jeep Community—Jeep Urban Ranger, 3 pgs; downloaded on Jun. 8, 2009 from www.jeep.com; 3 pgs.
MotoMappers Blog, downloaded from the Internet http:/www.motomappers.com/blog/best-gps-motorcycle-apps-for-navigation-an- d-tracking/ on Feb. 4, 2017; 28 pages.
My Jeep Community—Welcome Jeep Owners, Enthusiasts, Employees and Suppliers! online community, 25 pages, downloaded on Jun. 8, 2009 from www.myjeepcommunity.com.
New! SPOT Gen3, downloaded from the Internet http://www.findmespot.com/en/index.php?cid=100 on Oct. 22, 2015; 2 pages.
New! SPOT Trace, downloaded from the Internet http://www.findmespot.com/en/index.php?cid=128 on Oct. 22, 2015; 2 pages.
Office Action issued by the Canadian Intellectual Property Office, dated Nov. 3, 2020, for Canadian Patent Application No. 3,003,473; 6 pages.
Partial International Search Report issued by the European Patent Office, dated Apr. 4, 2019, for International Patent Application No. PCT/US2018/065973; 6 pages.
Phone Tracker for iPhones, iTunes Preview, downloaded from the Internet https://itunes.apple.com/us/app/phone-tracker-for-iphones/id447442214?mt=- 8 on Oct. 22, 2015; 3 pages.
Preliminary amendment filed on Mar. 6, 2020 for U.S. Appl. No. 16/811,458, 3 pages.
Preliminary amendment filed on May 3, 2020 for U.S. Appl. No. 16/234,162, 6 pages.
Preliminary amendment filed on May 3, 2020 for U.S. Appl. No. 16/811,458, 7 pages.
RPM8000 TacTrack User Manual, Atgo Technologies, 11 pgs., Buffalo, MN, available at least as early as Mar. 2009; 11 pgs.
Second Office Action issued by the China National Intellectual Property Administration, dated Sep. 8, 2021, for Chinese Patent Application No. 201780010476.5; 8 pages.

\* cited by examiner

RECREATIONAL VEHICLE GROUP MANAGEMENT SYSTEM

CROSS-REFERENCE TO RELATED APPLICATIONS

This application is a continuation of U.S. patent application Ser. No. 16/811,865, filed Mar. 6, 2020, which is a continuation of U.S. patent application Ser. No. 16/043,514, filed Jul. 24, 2018, which is a continuation of U.S. patent application Ser. No. 15/428,950, filed Feb. 9, 2017, titled RECREATIONAL VEHICLE GROUP MANAGEMENT SYSTEM, docket PLR-15-27455.02P-US-e, and claims the benefit of U.S. Provisional Application Ser. No. 62/293,471, filed Feb. 10, 2016, titled RECREATIONAL VEHICLE GROUP MANAGEMENT SYSTEM, docket PLR-15-27455.01P-US-e, the entire disclosures of which are expressly incorporated by reference herein.

BACKGROUND AND SUMMARY

The present disclosure relates to systems and methods which form groups of people or devices, and in particular to groups of riders and/or groups of recreational vehicle riders Recreational vehicles, such as motorcycles, or off-road vehicles such as all-terrain vehicles (ATVs) and snowmobiles, are widely used for recreational purposes. These vehicles might be used on both roads and trails, or only on trails. Various systems have been developed to assist riders of recreational vehicles understand the various terrain, points of interest, and status of roads and trails. Exemplary systems are disclosed in U.S. patent application Ser. No. 14/190,369, titled RECREATIONAL VEHICLE INTERACTIVE, TELEMETRY, MAPPING, AND TRIP PLANNING SYSTEM, filed Feb. 26, 2014 and PCT Patent Application No. PCT/US2014/018638, titled RECREATIONAL VEHICLE INTERACTIVE, TELEMETRY, MAPPING, AND TRIP PLANNING SYSTEM, filed Feb. 26, 2014. These applications further mention the tracking of the location of others.

With the proliferation of smartphones and other mobile devices, various programs executable on these mobile devices permit determining the location of other mobile devices associated with people stored in contacts in the mobile device. These location sharing programs for mobile devices struggle with the use case of allowing groups of individuals to quickly share their location with and among each other without lots of prior setup.

The present application discloses systems and methods to permit groups of recreational vehicle riders and others the ability to quickly create and join groups without prior knowledge of the contact information of everyone in the group. In one embodiment, groups are joinable based on the proximity information of the prospective member and the current group members.

The overall advantage for the disclosed systems and methods is to enable a safer and more intelligent riding experience. Most riding takes place in groups and knowing where all individuals are in the group, as well as, if they become stuck, broken down or lost can not only improve the quality of the ride experience, but also ensure safety for all members of the group.

In an exemplary embodiment of the present disclosure, a method of facilitating usage of recreational vehicles is provided. The method comprising the steps of receiving a request from a first computing device to create a first user group; the first computing device being associated with a location of a first recreational vehicle, the first computing device also being associated with the first user group; receiving a request from a second computing device being associated with a location of a second recreational vehicle to identify at least one available user group for the second computing device; and determining whether the second computing device may join the first user group based on a proximity distance of the location of the second recreational vehicle to the location of the first recreational vehicle being within a proximity range of the first user group.

In one example of the method, the second computing device may join the first user group. The method further comprising the steps of associating the second computing device with the first user group; tracking the location of the first recreational vehicle; and tracking the location of the second recreational vehicle. In a variation thereof, the method further comprises the steps of transmitting the location of the first recreational vehicle to the second recreational vehicle; and transmitting the location of the second recreational vehicle to the first recreational vehicle. In another variation thereof, the method further comprises the steps of displaying on the first computing device a first icon type representing the location of the second recreational vehicle; and displaying on the first computing device a second icon type representing a location of a third recreational vehicle. The third recreational vehicle not being associated with the first user group. The first icon type being limited to recreational vehicles which are associated with the first user group.

In another example of the method, the method further comprises the steps of sequentially setting a privacy flag of the first user group to closed; receiving a request from a third computing device being associated with a location of a third recreational vehicle to identify at least one available user group for the third computing device; and determining that the first user group is an unavailable group based on the privacy flag of the first user group even though the location of the third recreational vehicle is within the proximity range of the first user group.

In yet another example of the method, the method further comprises the steps of sequentially receiving an indication from each computing device of the first user group that the first user group is to be closed; and setting a privacy flag of the first user group to closed. In a variation of thereof, the method further comprises the subsequent steps of receiving an indication from any one of the computing devices of the first user group that the first user group is to be open; and setting the privacy flag of the first user group to open.

In another exemplary embodiment of the present disclosure, a recreational vehicle connectable to a group management master controller through at least one network is provided. The recreational vehicle comprising a plurality of ground engaging members; a frame supported by the plurality of ground engaging members; a power system operatively coupled to at least one of the plurality of ground engaging members; at least one sensor coupled to monitor at least one characteristic of the power system; seating supported by the frame; at least one controller supported by the frame, the at least one controller being operatively coupled to the at least one sensor; at least one display positioned forward of the seating, the display being operatively coupled to the at least one controller to receive an indication of the at least one characteristic of the power system for display on the at least one display; at least one input device operatively coupled to the at least one controller and rider actuatable to provide input to the at least one controller; a location determiner supported by the frame, the location determiner determining a current location associated with the recreational vehicle; a network controller supported by the frame, the network controller adapted to communicate with the group management master controller through the at least one network; and a group management controller supported by the frame. The group management controller being operatively coupled to the network controller to communicate with the group management master controller. In response to a first rider input, the group management controller is configured to send a request to the group management master controller to identify at least one available user group for the recreational vehicle and to receive from the group management master controller a listing of at least one available user groups based on the current location associated with the recreational vehicle.

In one example, in response to a second rider input, the group management controller is configured to send a request to the group management master controller to include the recreational vehicle in a first available user group. In a variation thereof, the group management controller is configured to receive a current location for each recreational vehicle in the first available user group and to provide an indication of the current location for each recreational vehicle in the first available user group for display on the at least one display.

In another example, at least two of the at least one controller, the location determiner, the network controller, and the group management controller are an integrated device.

In a further example, the at least one display and the at least one input device are part of an integrated user interface device. In a variation thereof, the user interface device includes at least one operator interface controller being operatively coupled to the at least one controller to receive an indication of the at least one characteristic of the power system for display on the at least one display. In a further variation thereof, the interface controller and at least one of the location determiner, the network controller, and the group management controller are an integrated device.

In a further exemplary embodiment of the present disclosure, a system is provided. The system comprising a plurality of recreational vehicles, a plurality of group management controllers, and a group management master controller. Each recreational vehicle comprising a plurality of ground engaging members; a frame supported by the plurality of ground engaging members; a power system operatively coupled to at least one of the plurality of ground engaging members; at least one sensor supported by the frame and coupled to the power system to monitor at least one characteristic of the power system; seating supported by the frame; at least one controller supported by the frame, the at least one controller being operatively coupled to the at least one sensor; and a user interface supported by the frame. The user interface including at least one display having an at least one associated display controller. The at least one display positioned forward of the seating. The at least one display controller operatively coupled to the at least one controller to receive an indication of the at least one characteristic of the power system for display on the at least one display. Each group management controller being associated with a respective recreational vehicle and each group management controller receives an indication of a location of the respective recreational vehicle. The group management master controller operatively coupled to each of the group management controllers. The group management master controller being configured to associate at least two of the plurality of recreational vehicles in a first user group based on requests received from the group management controllers associated with the at least two recreational vehicles and based on the locations of the at least two recreational vehicles.

In an example, the group management master controller is configured to send to each of the at least two recreational vehicles in the first user group the locations of the remaining at least two recreational vehicles in the first user group. In a variation thereof, each of the at least two recreational vehicles in the first user group display on the at least one display the locations of the at least two recreational vehicles in the first user group.

In another example, a first recreational vehicle of the plurality of recreational vehicles includes a first group management controller. The first group management controller is supported by the frame of the first recreational vehicle during movement of the first recreational vehicle. In a variation thereof, the first group management controller is integrated into the user interface of the first recreational vehicle. In another variation thereof, the first group management controller is integrated into the at least one controller of the first recreational vehicle. In another variation thereof, the first group management controller is integrated into a portable rider computing device supported by the rider during movement of the first recreational vehicle. In yet another variation, the system further comprises a plurality of location determiners. Each location determiner being associated with a respective recreational vehicle and supported by the frame of the recreational vehicle during movement of the respective recreational vehicle. Each location determiner is configured to determine the location of the respective recreational vehicle.

Additional features of the present invention will become more apparent to those skilled in the art upon consideration of the following detailed descriptions of illustrative embodiments exemplifying the best mode of carrying out the invention as presently perceived.

BRIEF DESCRIPTION OF THE DRAWINGS

Advantages and features of the embodiments of this disclosure will become more apparent from the following detailed description of exemplary embodiments when viewed in conjunction with the accompanying drawings, wherein.

DETAILED DESCRIPTION OF THE DRAWINGS

Figure 1:
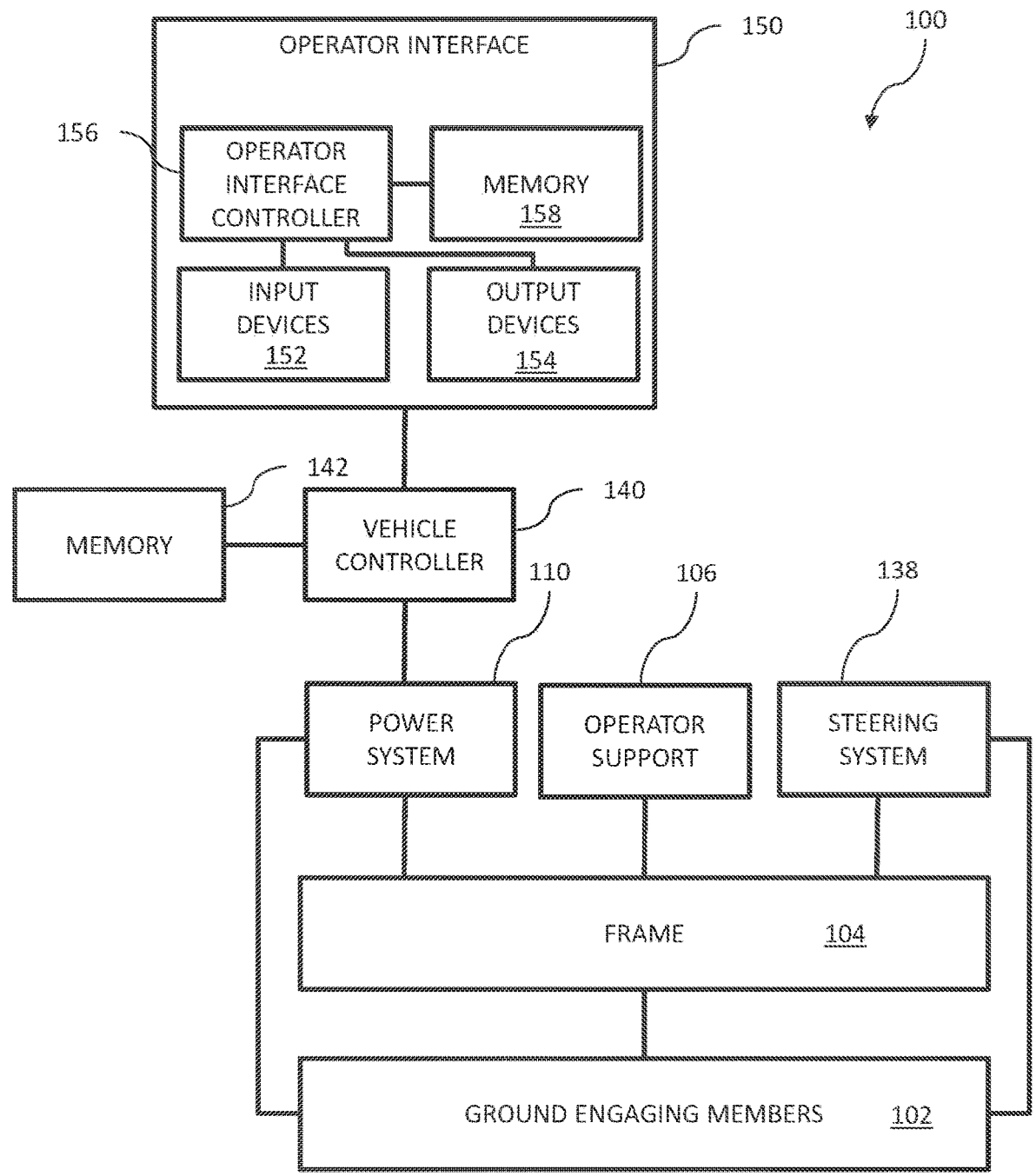
FIG. 1 is a representative view of an exemplary vehicle.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The entire disclosures of U.S. patent application Ser. No. 14/190,369, titled RECREATIONAL VEHICLE INTERACTIVE, TELEMETRY, MAPPING, AND TRIP PLANNING SYSTEM, filed Feb. 26, 2014, U.S. patent application Ser. No. 14/667,172, titled VEHICLE SECURITY SYSTEM, filed Mar. 24, 2015, and PCT Patent Application No. PCT/US2014/018638, titled RECREATIONAL VEHICLE INTERACTIVE, TELEMETRY, MAPPING, AND TRIP PLANNING SYSTEM, filed Feb. 26, 2014, are expressly incorporated by reference.

Referring to FIG. 1, a recreational vehicle 100 is represented. Recreational vehicle 100 includes a plurality of ground engaging members 102. Exemplary ground engaging members include skis, endless tracks, wheels, and other suitable devices which support vehicle 100 relative to the ground. Recreational vehicle 100 further includes a frame 104 supported by the plurality of ground engaging members 102. In one embodiment, frame 104 includes cast portions, weldments, tubular components or a combination thereof. In one embodiment, frame 104 is a rigid frame. In one embodiment, frame 104 has at least two sections which are moveable relative to each other.

An operator support 106 is supported by frame 104. Exemplary operator supports include straddle seats, bench seats, bucket seats, and other suitable support members. In addition to operator support 106, recreational vehicle 100 may further include a passenger support. Exemplary passenger supports include straddle seats, bench seats, bucket seats, and other suitable support members.

A power system 110 is supported by frame 104. Power system 110 provides the motive force and communicates the same to at least one of the ground engagement members 102 to power movement of recreational vehicle 100.

Figure 2:
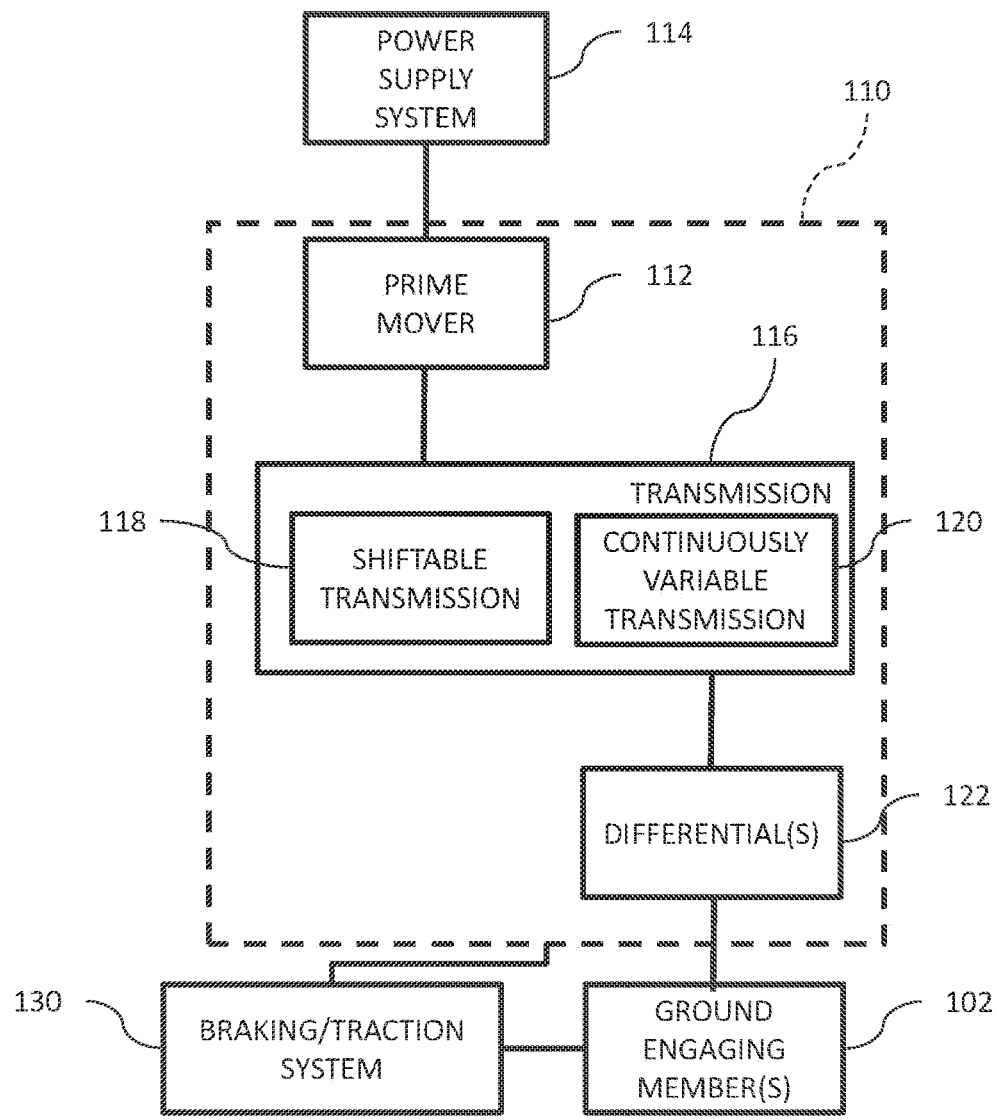
FIG. 2 is a representative view of an exemplary power system of the vehicle of FIG. 1.

Referring to FIG. 2, one embodiment of power system 110 is illustrated. Power system 110 includes a prime mover 112. Exemplary prime movers 112 include internal combustion engines, two stroke internal combustion engines, four stroke internal combustion engines, diesel engines, electric motors, hybrid engines, and other suitable sources of motive force. To start the prime mover 112, a power supply system 114 is provided. The type of power supply system 114 depends on the type of prime mover 112 used. In one embodiment, prime mover 112 is an internal combustion engine and power supply system 114 is one of a pull start system and an electric start system. In one embodiment, prime mover 112 is an electric motor and power supply system 114 is a switch system which electrically couples one or more batteries to the electric motor.

A transmission 116 is coupled to prime mover 112. Transmission 116 is illustrated as having a shiftable transmission 118 and a continuously variable transmission ("CVT") 120. CVT 120 is coupled to prime mover 112. Shiftable transmission 118 is in turn coupled to CVT 120. In one embodiment, shiftable transmission 118 includes a forward high setting, a forward low setting, a neutral setting, a park setting, and a reverse setting. The power communicated from prime mover 112 to CVT 120 is provided to a drive member of CVT 120. The drive member in turn provides power to a driven member through a belt. Exemplary CVTs are disclosed in U.S. Pat. Nos. 3,861,229; 6,176,796; 6,120,399; 6,860,826; and 6,938,508, the disclosures of which are expressly incorporated by reference herein. The driven member provides power to an input shaft of shiftable transmission 118. Although transmission 116 is illustrated as including both shiftable transmission 118 and CVT 120, transmission 116 may include only one of shiftable transmission 118 and CVT 120.

Transmission 116 is further coupled to at least one differential 122 which is in turn coupled to at least one ground engaging members 102. Differential 122 may communicate the power from transmission 116 to one of ground engaging members 102 or multiple ground engaging members 102. In an ATV embodiment, one or both of a front differential and a rear differential are provided. The front differential powering at least one of two front wheels of the ATV and the rear differential powering at least one of two rear wheels. In a utility vehicle embodiment, one or both of a front differential and a rear differential are provided. The front differential powering at least one of two front wheels of the utility vehicle and the rear differential powering at least one of multiple rear wheels of the utility vehicle. In one example, the utility vehicle has three axles and a differential is provided for each axle. In a motorcycle embodiment, a differential 122 and CVT 120 are not included. Rather, shiftable transmission. 118 is coupled to at least one rear wheel through a chain or belt. In another motorcycle embodiment, a differential 122 is not included. Rather, CVT 120 is coupled to at least one rear wheel through a chain or belt. In a snowmobile embodiment, a differential 122 is not included. Rather, CVT 120 is coupled to an endless track through a chain case. In one golf cart embodiment, a transmission is not included. Rather an electric motor is coupled directly to a differential 122. An exemplary differential is a helical gear set. The motor can be run in a first direction for forward operation of the golf cart and in a second direction for reverse operation of the golf cart. Although mentioned in connection with a golf cart, the concepts described herein may be used in connection with any electric vehicle.

Recreational vehicle 100 further includes a braking/traction system 130. In one embodiment, braking/traction system 130 includes anti-lock brakes. In one embodiment, braking/traction system 130 includes active descent control and/or engine braking. In one embodiment, braking/traction system 130 includes a brake and in some embodiments a separate parking brake. Braking/traction system 130 may be coupled to any of prime mover 112, transmission 116, differential 122, and ground engaging members 102 or the connecting drive members therebetween.

Returning to FIG. 1, recreational vehicle 100 further includes a steering system 138. Steering system 138 is coupled to at least one of the ground engagement members 102 to direct recreational vehicle 100.

Further, recreational vehicle 100 includes a vehicle controller 140 having at least one associated memory 142. Vehicle controller 140 provides the electronic control of the various components of recreational vehicle 100. Further, vehicle controller 140 is operatively coupled to a plurality of sensors 144 (see FIG. 3) which monitor various parameters of recreational vehicle 100 or the environment surrounding vehicle 100. Vehicle controller 140 performs certain operations to control one or more subsystems of other vehicle components, such as one or more of a fuel system 110, an air handling system 115, CVT 120, shiftable transmission 118, prime mover 112, differentials 122 and other systems. In certain embodiments, the controller 140 forms a portion of a processing subsystem including one or more computing devices having memory, processing, and communication hardware. The controller 140 may be a single device or a distributed device, and the functions of the controller 140 may be performed by hardware and/or as computer instructions on a non-transitory computer readable storage medium, such as memory 142.

Vehicle controller 140 also interacts with an operator interface 150 which includes at least one input device 152 and at least one output device 154. Exemplary input devices 152 include levers, buttons, switches, soft keys, and other suitable input devices. Exemplary output devices include lights, displays, audio devices, tactile devices, and other suitable output devices. Operator interface 150 further includes an interface controller 156 and an associated memory 158. Interface controller 156 performs certain operations to control one or more subsystems of operator interface 150 or of other vehicle components, such as one or more of input devices 152 and output devices 154. In one example, operator interface 150 includes a touch screen display and interface controller 156 interprets various types of touches to the touch screen display as inputs and controls the content displayed on touch screen display. In certain embodiments, the interface controller 156 forms a portion of a processing subsystem including one or more computing devices having memory, processing, and communication hardware. The interface controller 156 may be a single device or a distributed device, and the functions of the interface controller 156 may be performed by hardware and/or as computer instructions on a non-transitory computer readable storage medium, such as memory 158.

Figure 3:
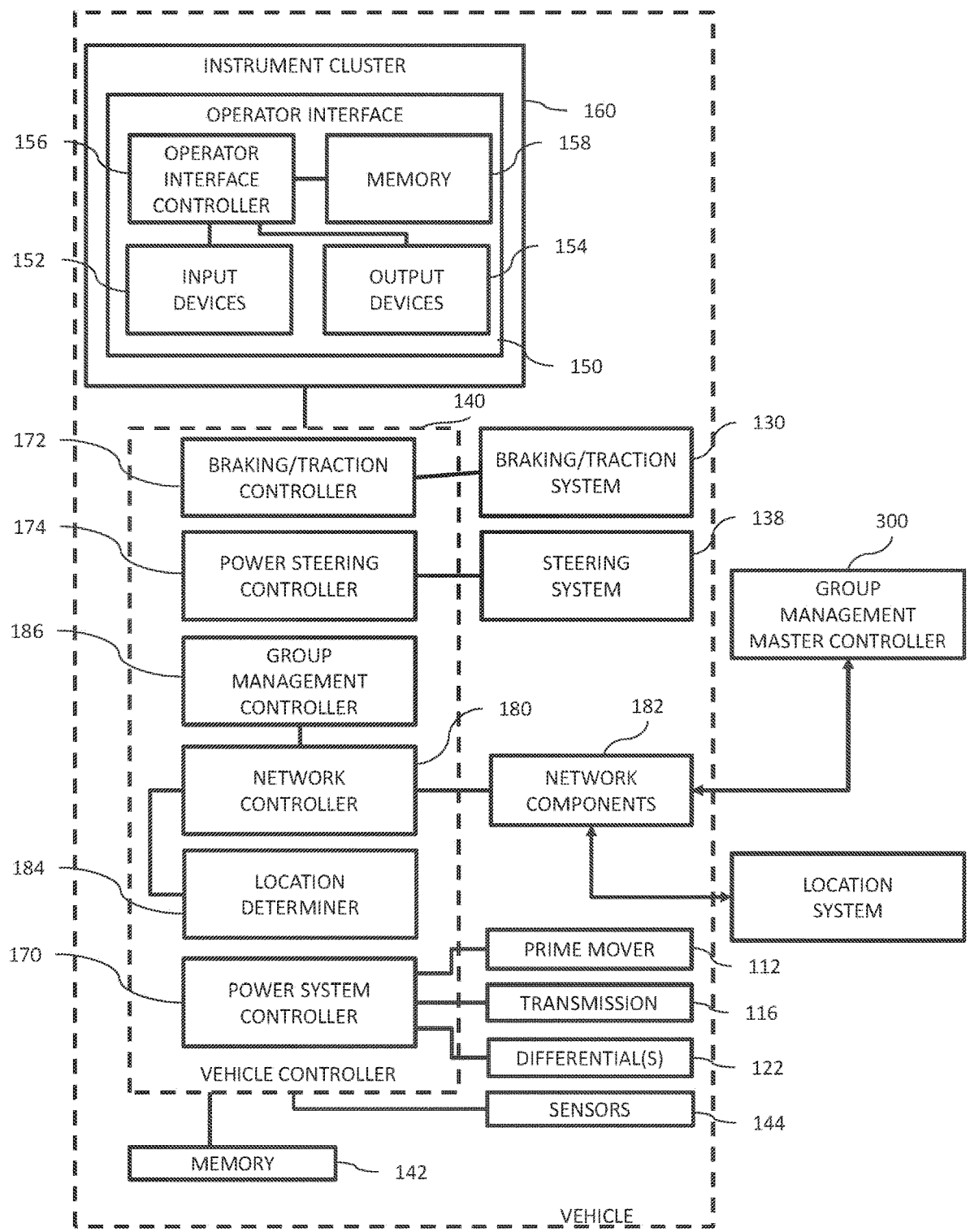
FIG. 3 is a representative view of exemplary components of the vehicle of FIG. 1 operatively coupled to a group management master controller.

Referring to FIG. 3, operator interface 150 is included as part of an instrument cluster 160. Interface controller 156 controls the operation of output devices 154 and monitors the actuation of input devices 152. In one embodiment, output devices 154 includes a display and interface controller 156 formats information to be displayed on the display and displays the information. In one embodiment, output devices 154 includes a touch display and interface controller 156 formats information to be displayed on the touch display, displays the information, and monitors the touch display for operator input. Exemplary operator inputs include a touch, a drag, a swipe, a pinch, a spread, and other known types of gesturing.

As illustrated in the embodiment of FIG. 3, vehicle controller 140 is represented as including several controllers. These controllers may each be single devices or distributed devices or one or more of these controllers may together be part of a single device or distributed device. The functions of these controllers may be performed by hardware and/or as computer instructions on a non-transitory' computer readable storage medium, such as memory 142.

In one embodiment, vehicle controller 140 includes at least two separate controllers which communicate over a network. In one embodiment, the network is a CAN network. In one embodiment, the CAN network is implemented in accord with the J1939 protocol. Details regarding an exemplary CAN network are disclosed in U.S. patent application Ser. No. 11/218,163, filed Sep. 1, 2005, the disclosure of which is expressly incorporated by reference herein. Of course any suitable type of network or data bus may be used in place of the CAN network. In one embodiment, two wire serial communication is used.

Referring to FIG. 3, controller 140 includes a power system controller 170 which controls the operation of at least one of prime mover 112, transmission 116, and differentials 122. In one example, prime mover 112 is an internal combustion engine and power system controller 170 controls the provision of fuel, provision of spark, engine performance, reverse operation of vehicle, locking differential, all wheel drive, ignition timing, electrical power distribution, transmission control. Further, power system controller 170 monitors a plurality of sensors. Exemplary sensors include a temperature sensor which monitors the temperature of a coolant which circulates through the engine, throttle position sensor (TPS), exhaust gas temperature sensor (EGT), crank position sensor (CPS), detonation sensor (DET), airbox pressure sensor, intake air temperature sensor, and other parameters as required to control the engine performance.

Controller 140 further includes a braking/traction controller 172 which controls the operation of braking/traction system 130. In one example, braking/traction controller 172 controls pressure and frequency of the actuation of the brake caliper. Further, braking/traction controlled 172 monitors a plurality of sensors. Exemplary sensors include a vehicle speed sensor which monitors track speed and an engine RPM sensor.

Controller 140 further includes a power steering controller 174 which controls the operation of steering system 138. In one example, power steering controller 174 controls an amount of assist provided by a power steering unit of recreational vehicle 100. Further, power steering controller 174 monitors a plurality of sensors. Exemplary sensors and electronic power steering units, including speed profiles, examples of which are provided in U.S. patent application Ser. No. 12/135,107, assigned to the assignee of the present application, titled VEHICLE, docket PLR-06-22542.02P, the disclosure of which is expressly incorporated by reference herein.

Controller 140 further includes a network controller 180 which controls communications between recreational vehicle 100 and other devices through one or more network components 182. In one embodiment, network controller 180 of recreational vehicle 100 communicates with paired devices over a wireless network. An exemplary wireless network is a radio frequency network utilizing a BLUETOOTH protocol. In this example, network components 182 includes a radio frequency antenna. Network controller 180 controls the pairing of devices to recreational vehicle 100 and the communications between recreational vehicle 100 and the remote device. An exemplary remote device is rider computing device 190 described herein. In one embodiment, network controller 180 of recreational vehicle 100 communicates with group management master controller 300 over a cellular network. In this example, network components 182 includes a cellular antenna and network controller 180 receives and sends cellular messages from and to the cellular network. In one embodiment, network controller 180 of recreational vehicle 100 communicates with group management master controller 300 over a satellite network. In this example, network components 182 includes a satellite antenna and network controller 180 receives and sends messages from and to the satellite network.

Controller 140 further includes a location determiner 184 which determines a current location of recreational vehicle 100. An exemplary location determiner 184 is a GPS unit which determines the position of recreational vehicle 100 based on interaction with a global satellite system.

Controller 140 further includes a group management controller 186. As discussed in more detail herein, group management controller 186 controls adding vehicle/rider 100 to a group, creating a new group, leaving a group, setting a privacy setting for the group, communicating location updates with group management master controller 300. In one embodiment, one or more of network controller 180, location determiner 184, and group management controller 186 are part of interface controller 156 instead of vehicle controller 140.

Memory 142 (FIG. 1) may be representative of multiple memories which are provided locally with power system controller 170, braking/traction controller 172, power steering controller 174, network controller 180, location determiner 184, and group management controller 186. The information recorded or determined by one or more of power system controller 170, braking/traction controller 172, power steering controller 174, network controller 180, location determiner 184, and group management controller 186 may be stored on memory 142. Memory 158 (FIG. 1) is one or more non-transitory computer readable medium. Memory 158 may be representative of multiple memories which are provided locally with interface controller 156, and one or more of network controller 180, location determiner 184, and group management controller 186 when included as part of interface controller 156. The information recorded or determined by one or more of interface controller 156, network controller 180, location determiner 184, and group management controller 186 may be stored on memory 158.

Figure 4:
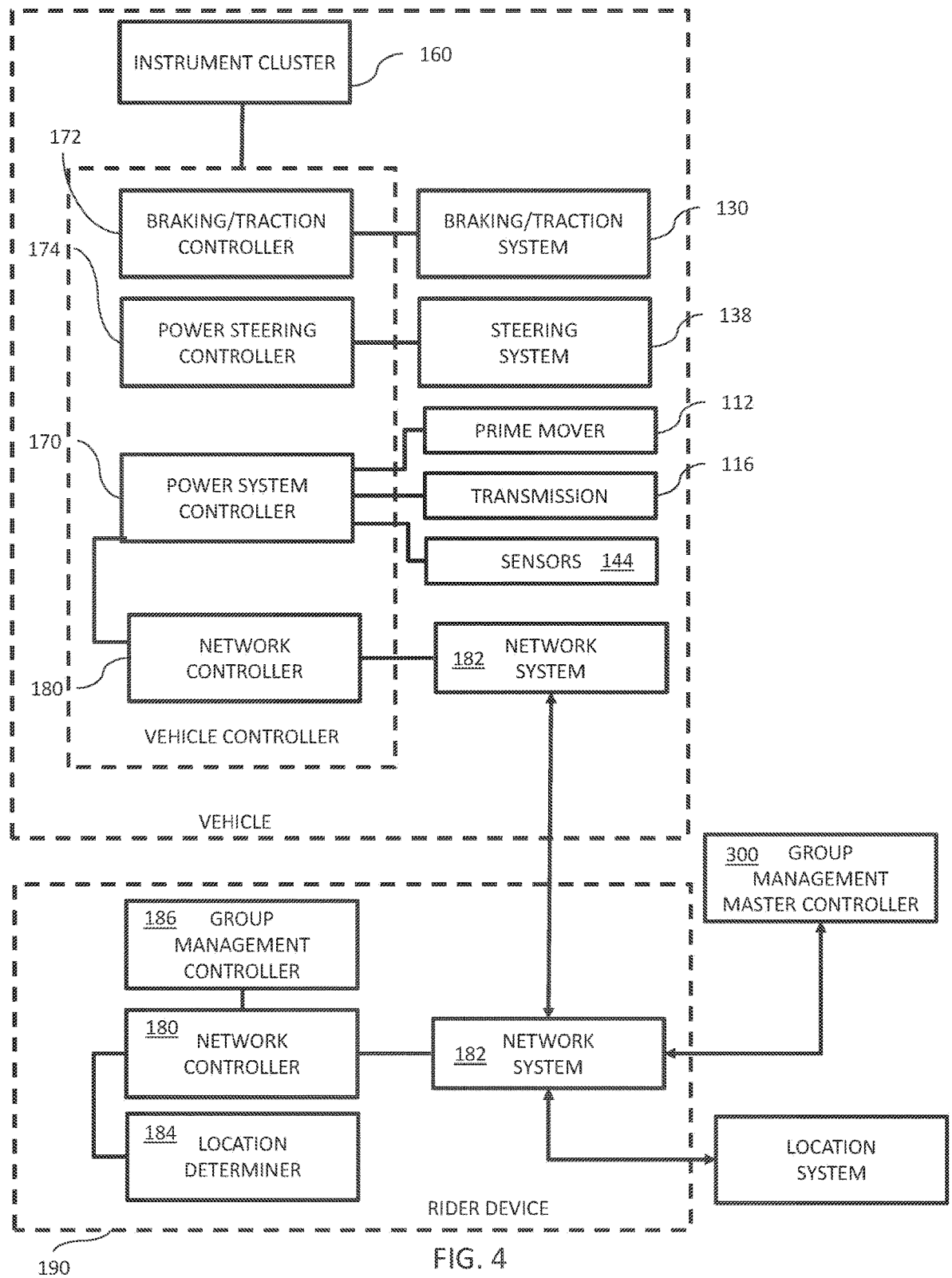
FIG. 4 is a representative view of exemplary components of the vehicle of FIG. 1 and a rider computing device.

Referring to FIG. 4, in one embodiment, network controller 180, location determiner 184, and group management controller 186 are part of a rider computing device 190. Exemplary rider computing devices 190 include cellular phones and tablets. Exemplary cellular phones, include the IPHONE brand cellular phone sold by Apple Inc., located at 1 Infinite Loop, Cupertino, California 95014 and the GALAXY brand cellular phone sold by Samsung Electronics Co., Ltd.

Figure 5:
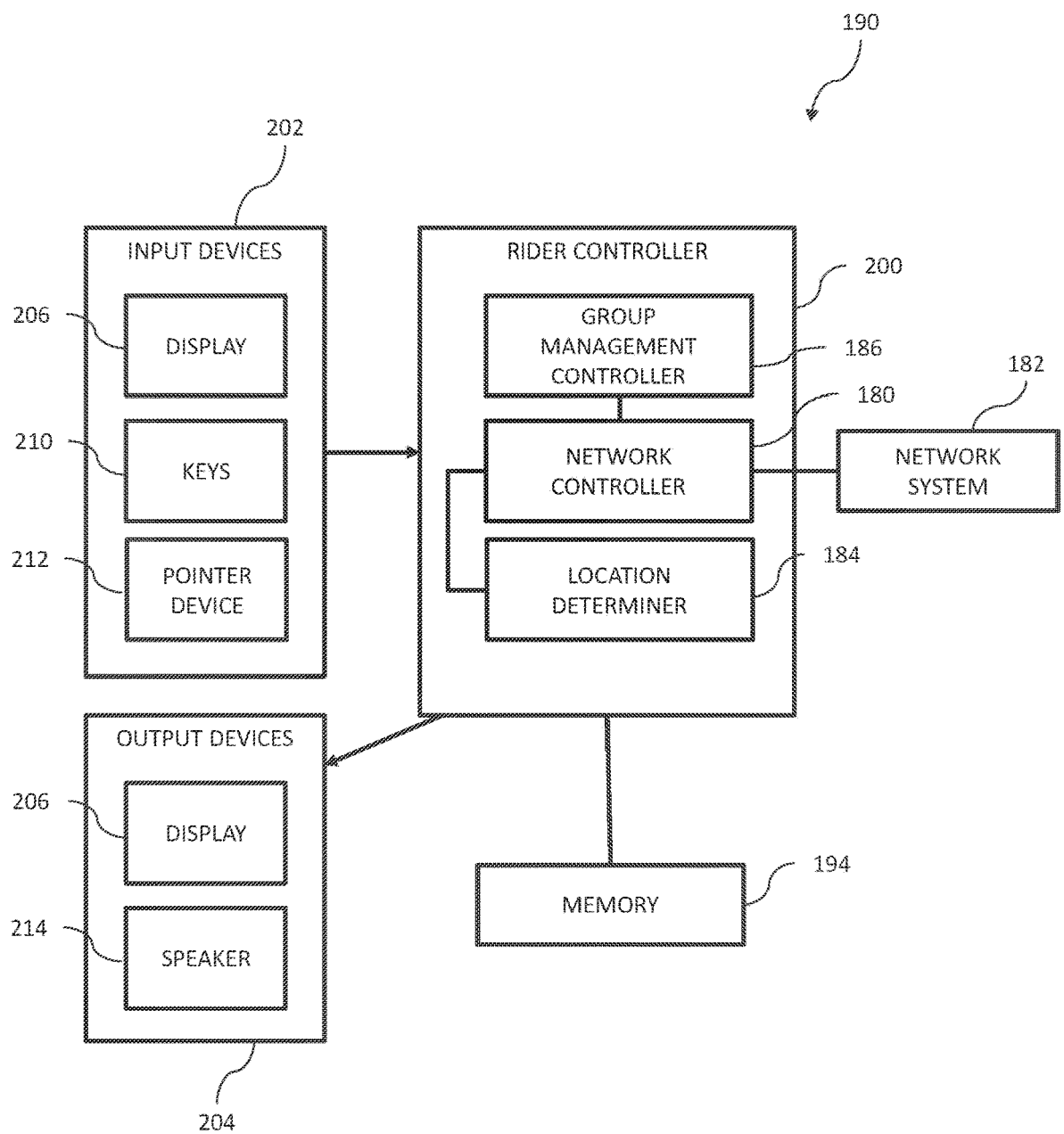
FIG. 5 is a representative view of an exemplary rider computing device.

Referring to FIG. 5, an exemplary rider computing device 190 is illustrated. Rider computing device 190 includes a controller 200, input devices 202, and output devices 204. Rider controller 200 includes group management controller 186, network controller 180, and location determiner 184. Group management controller 186, network controller 180, and location determiner 184 function in the same manner as described herein in connection with recreational vehicle 100. In one embodiment, network components 182 includes a radio frequency antenna and a cellular antenna. Network controller 180 communicates with recreational vehicle 100 over a wireless radio frequency network, such as a BLUETOOTH network, and communicates with group management master controller 300 over a cellular network or a radio network, such as a WIFI network.

Exemplary input devices 202 include a touch display 206, keys or buttons 210, and a pointer device 212. Exemplary output devices include touch display 206 and a speaker 214.

In the embodiment illustrated in FIG. 4, a network controller 180 of rider computing device 190 communicates with network controller 180 of recreational vehicle 100 over a wireless network. An exemplary wireless network is a radio frequency network utilizing a BLUETOOTH protocol. Although location determiner 184 is part of a rider computing device, it still provides a current location of recreational vehicle 100 due to the fact that the rider is carrying the rider computing device 190 while riding recreational vehicle 100.

Recreational vehicle 100 may be any suitable type of vehicle for transporting an operator through power provided by a power system 110. The operation of network controller 180, location determiner 184, and group management controller 186 are described herein in reference to the operation of a snowmobile 250 shown in FIGS. 6-10. However, the disclosure is applicable to other types of vehicles such as all-terrain vehicles, motorcycles, utility vehicles, side-by-side vehicles, and golf carts. In addition, the operation of network controller 180, location determiner 184, and group management controller 186 may be used with any suitable mobile computing devices, such as cell phones and tablets. Thus, the functionality disclosed herein may be used by pedestrians or any group of people regardless of whether the group members are riding recreational vehicles 100.

Figure 6:
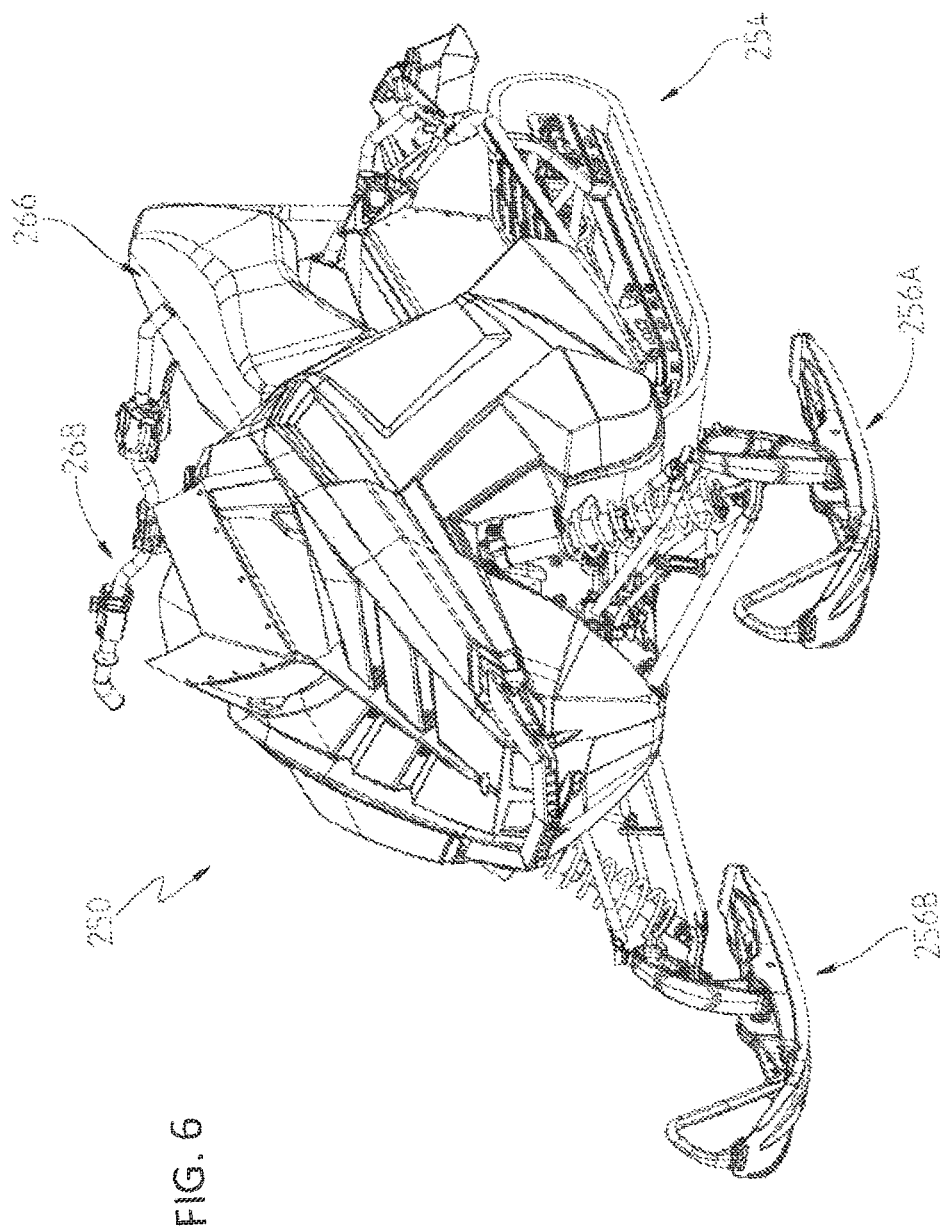
FIG. 6 is a front, perspective view of an exemplary snowmobile vehicle including the components represented in FIG. 3.
Figure 7:
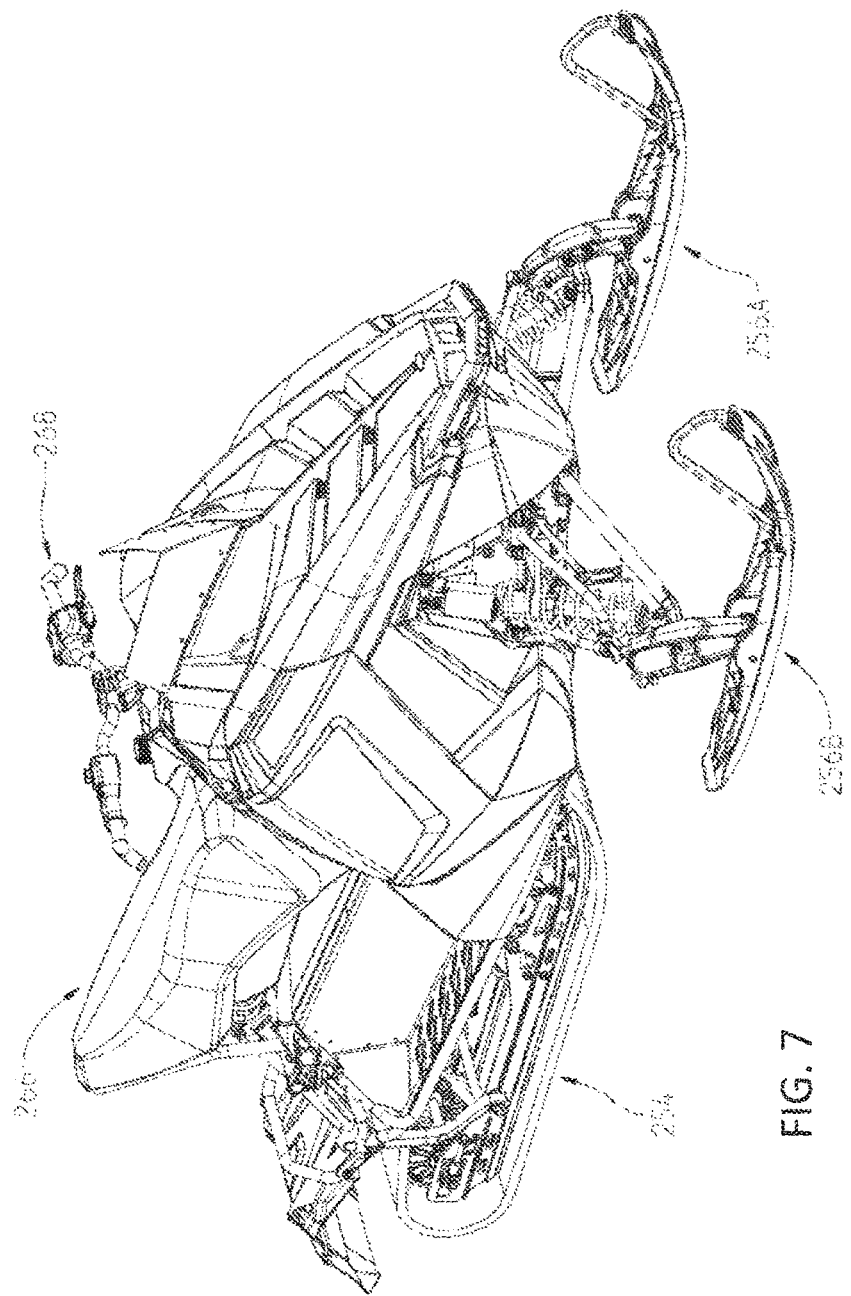
FIG. 7 is another front, perspective view of the snowmobile of FIG. 6.
Figure 8:
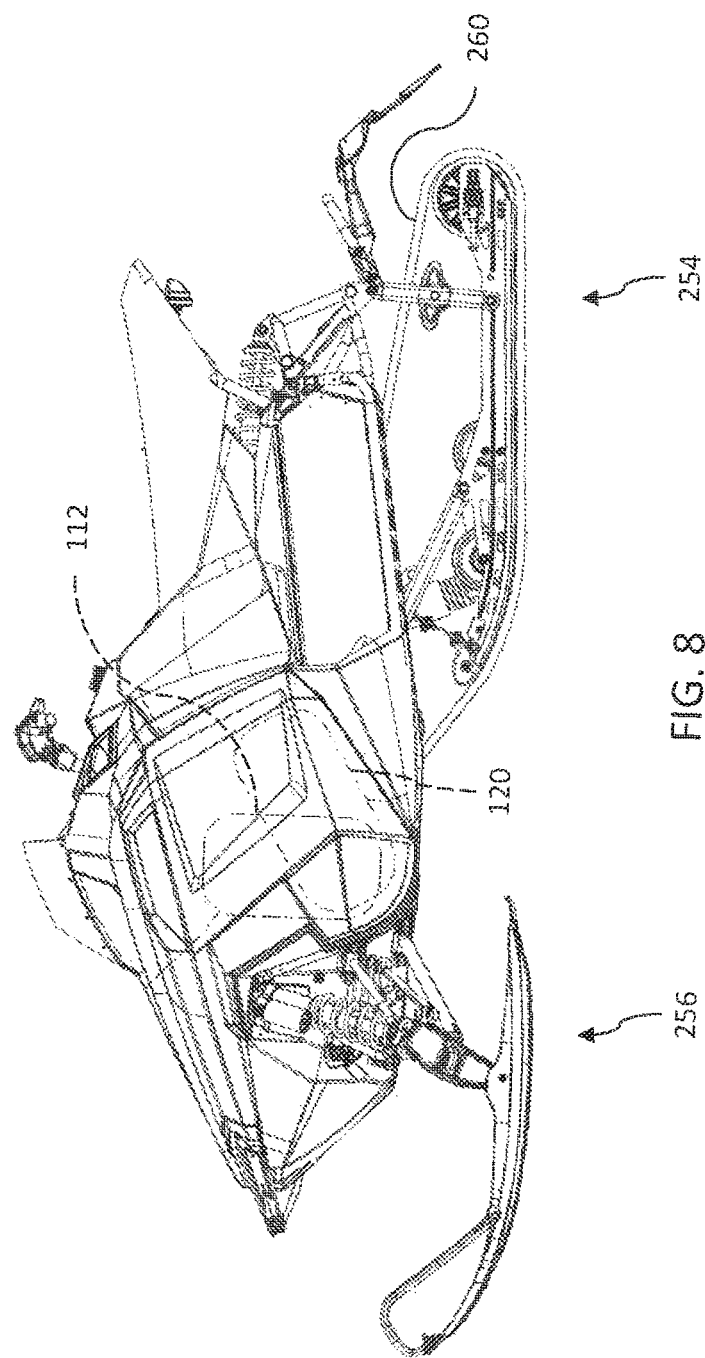
FIG. 8 is a side view of the snowmobile of FIG. 6.

Referring to FIG. 6, a snowmobile 250 is shown. Snowmobile 250 includes an endless track assembly 254 and a pair of front skis 256A and 256B. Endless track assembly 254 supports a rear portion of snowmobile 250 while skis 256 support a front portion of snowmobile 250. Endless track assembly 254 includes a belt 260 which is coupled to a prime mover 112 (see FIG. 7) through a CVT 120 (see FIG. 8). Front skis 256 are oriented by an operator positioned on seat 266 through handlebars 268. Additional details regarding snowmobile 250 are provided in U.S. patent application Ser. No. 14/087,767, filed Nov. 22, 2013, and titled SNOWMOBILE, the entire disclosure of which is expressly incorporated by reference herein.

Figure 9:
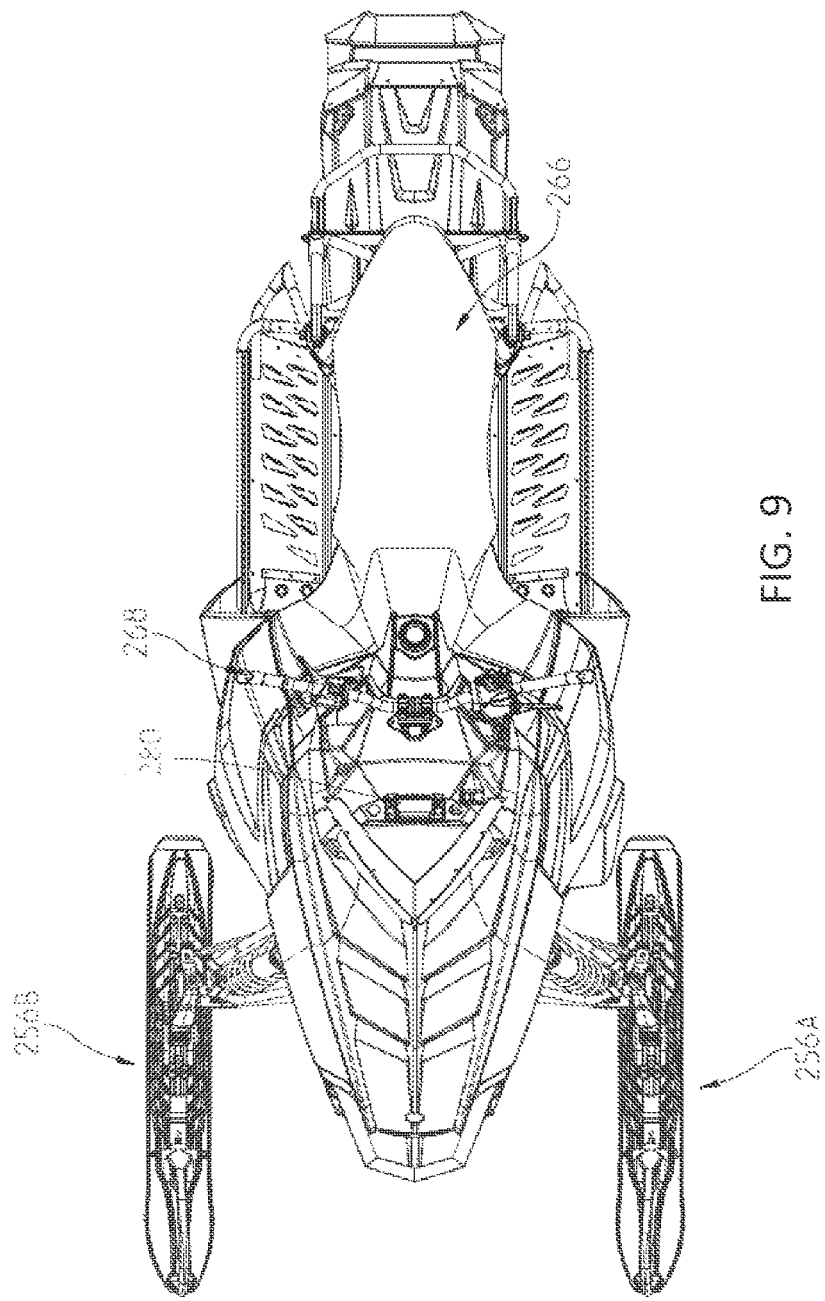
FIG. 9 is a top view of the snowmobile of FIG. 6.
Figure 10:
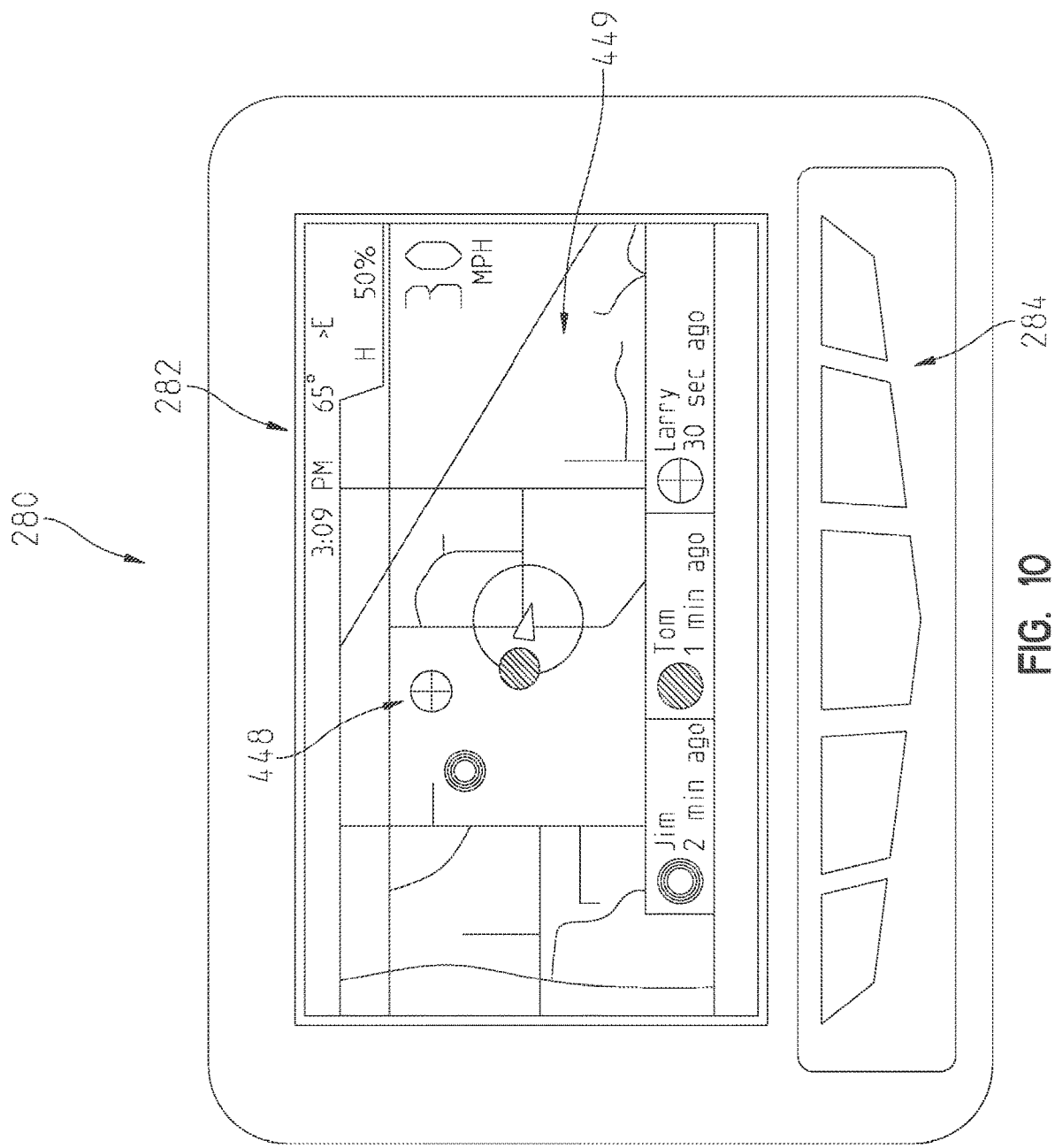
FIG. 10 is an exemplary view of an instrument cluster of the vehicle of FIG. 6.

Snowmobile 250 includes a vehicle controller 140 based on FIG. 3. Referring to FIG. 9, an operator interface of snowmobile 250 is shown as instrument cluster 280. As shown in FIG. 9, instrument cluster 280 is viewable by an operator on seat 266 and forward of handlebars 268. As illustrated in FIG. 10 (instrument cluster 280 for an ATV vehicle) includes as an output device a touch display 282 and as input devices touch display 282 and a plurality of buttons 284. As explained herein, in some embodiments, instrument cluster 280 provides an operator an interface to communicate with group management controller 186. Exemplary displays and their functionality are disclosed in PCT Patent Application No. PCT/US2014/018638, titled RECREATIONAL VEHICLE INTERACTIVE, TELEMETRY, MAPPING, AND TRIP PLANNING SYSTEM, filed Feb. 26, 2014, the disclosure of which is expressly incorporated by reference.

Returning to FIG. 3, group management controller 186 communicates with a group management master controller 300 over on or more networks. Group management master controller 300 is operatively coupled to a network controller 330 (see FIG. 11) which in turn is operatively coupled to a network system 332 (see FIG. 11). In one example, network components 182 is a cellular antenna and group management controller 186 is operatively coupled to group management master controller 300 through at least a cellular network.

Figure 11:
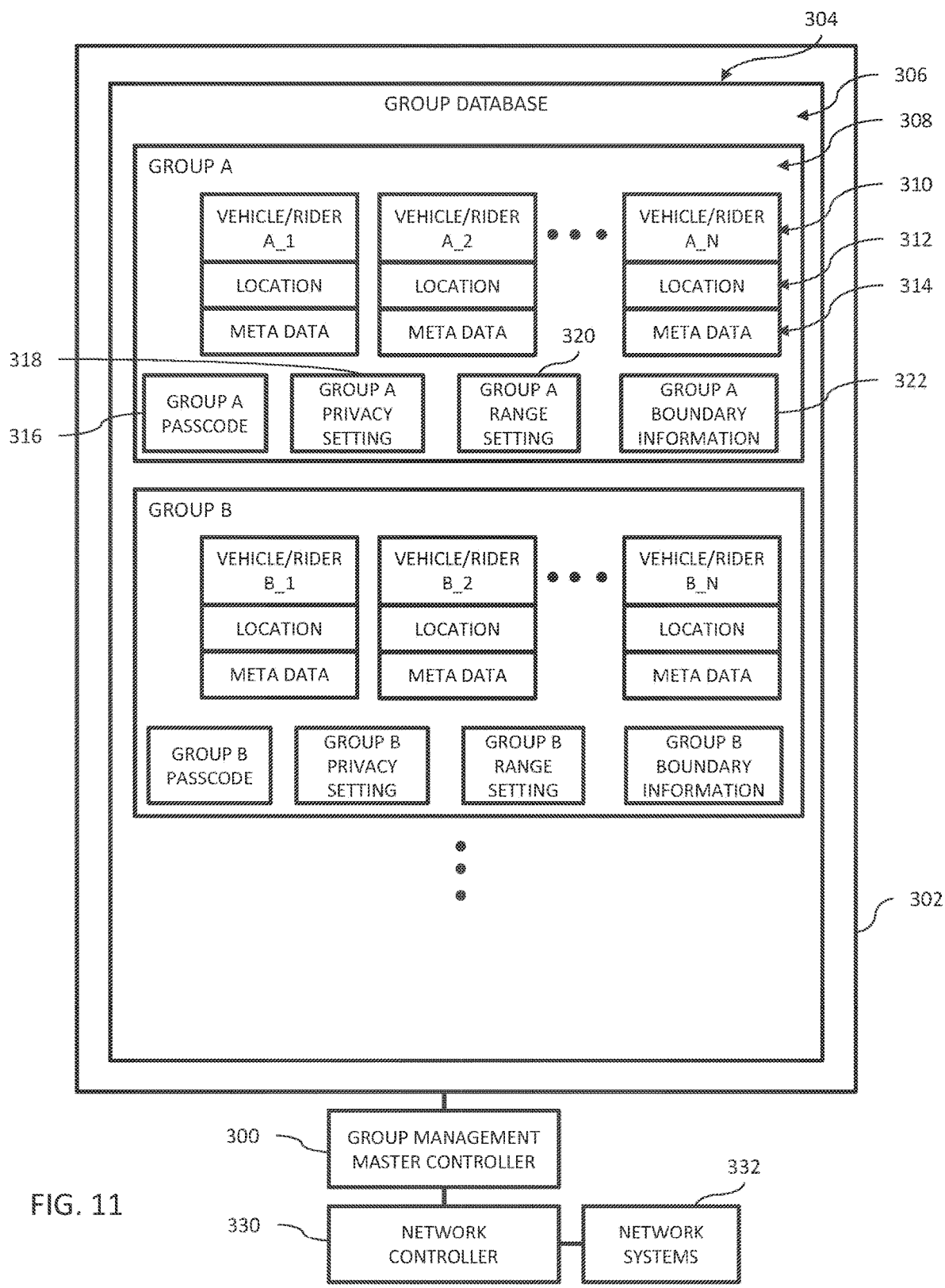
FIG. 11 is a representative view of group database of a group management master controller

Group management master controller 300 controls the formation and management of user groups. Referring to FIG. 11, group management master controller 300 has access to a memory 302 which includes a group database 304. In the illustrated example of group database 304, a plurality of groups 306, GROUP A and GROUP B, are shown. Turning to GROUP A, a plurality of vehicles or riders 308, VEHICLE/RIDER A_1, VEHICLE/RIDER A_2, and VEHICLE/RIDER A_N, are shown. The record for each vehicle/rider 308, includes a vehicle/rider identifier 310, a location value 312, and meta data 314. Exemplary meta data includes rider name, rider phone number, vehicle information, a photo, and other information regarding the rider or vehicle. Group database 304 further includes passcode 316 for GROUP A, a privacy setting 318 for GROUP A, a range setting 320 for GROUP A, and boundary information 322 for Group A.

Figure 12:
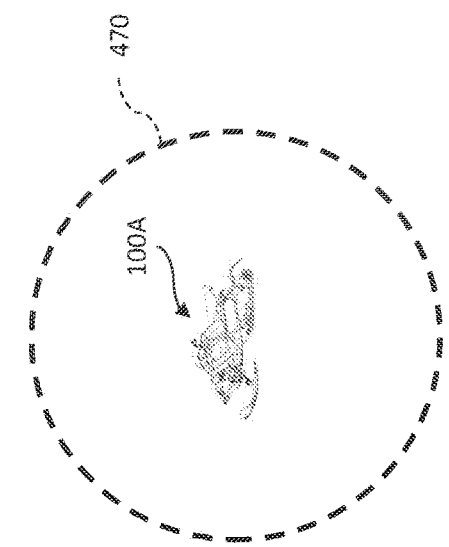
FIG. 12 illustrates a first vehicle and a boundary for a group including the first vehicle.

Referring to FIG. 12, a first vehicle 100A is illustrated. If a rider of vehicle 100A desires to create a group 306 in group database 304, the rider through group management controller 186 would connect to group management master controller 300. In one embodiment, the rider provides an input through operator interface 150 of recreational vehicle 100. In one embodiment, the rider provides an input through an input device 202 of rider computing device 190 to group management controller 186.

Figure 13:
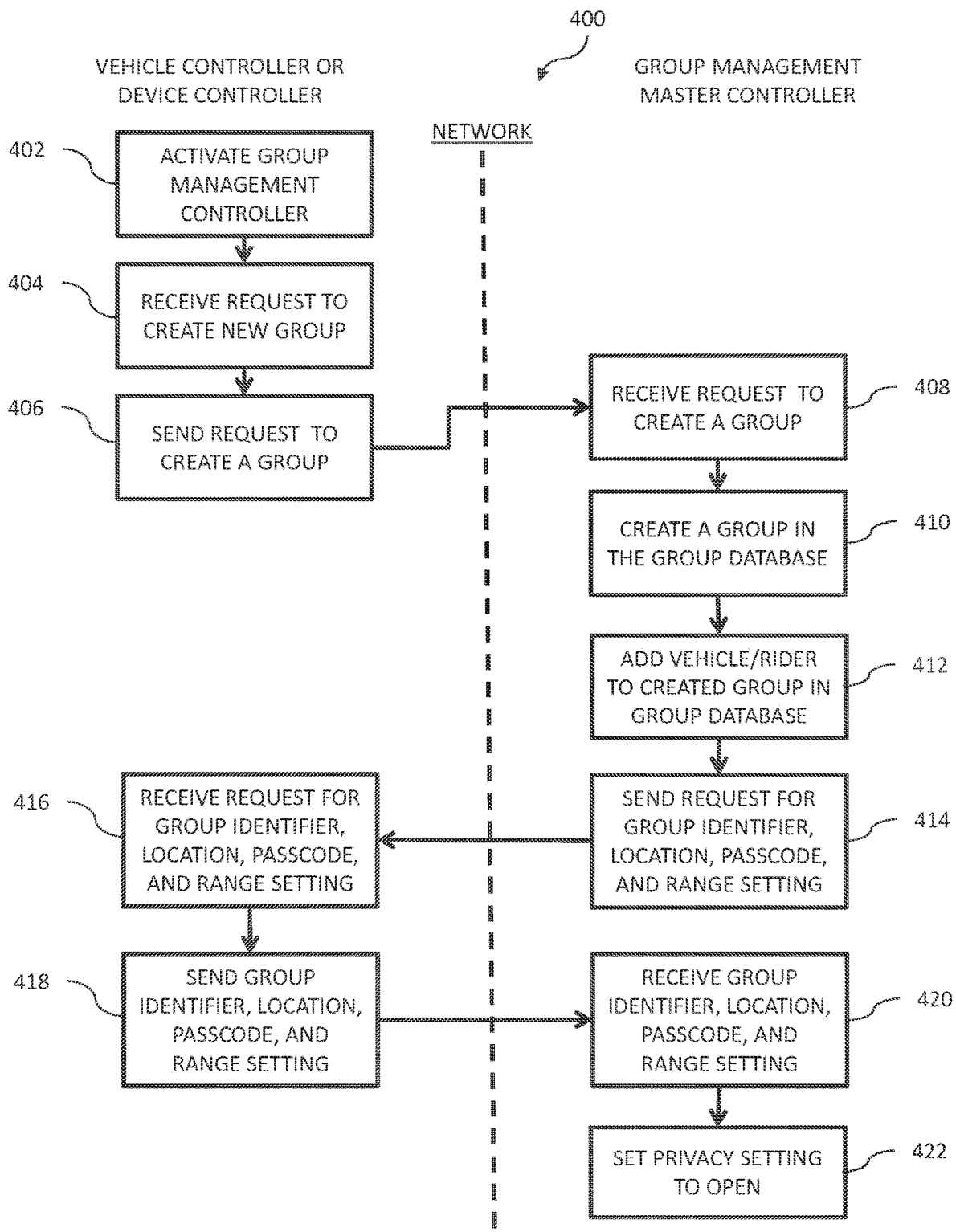
FIG. 13 illustrates an exemplary process for creating a group in the group database of FIG. 11.

An exemplary process 400 for creating a new group is illustrated in FIG. 13. The process is explained based on the rider connecting to group management master controller 300 through group management controller 186 on rider computing device 190, but is equally applicable to connecting to group management master controller 300 through group management controller 186 on recreational vehicle 100.

Figure 31:
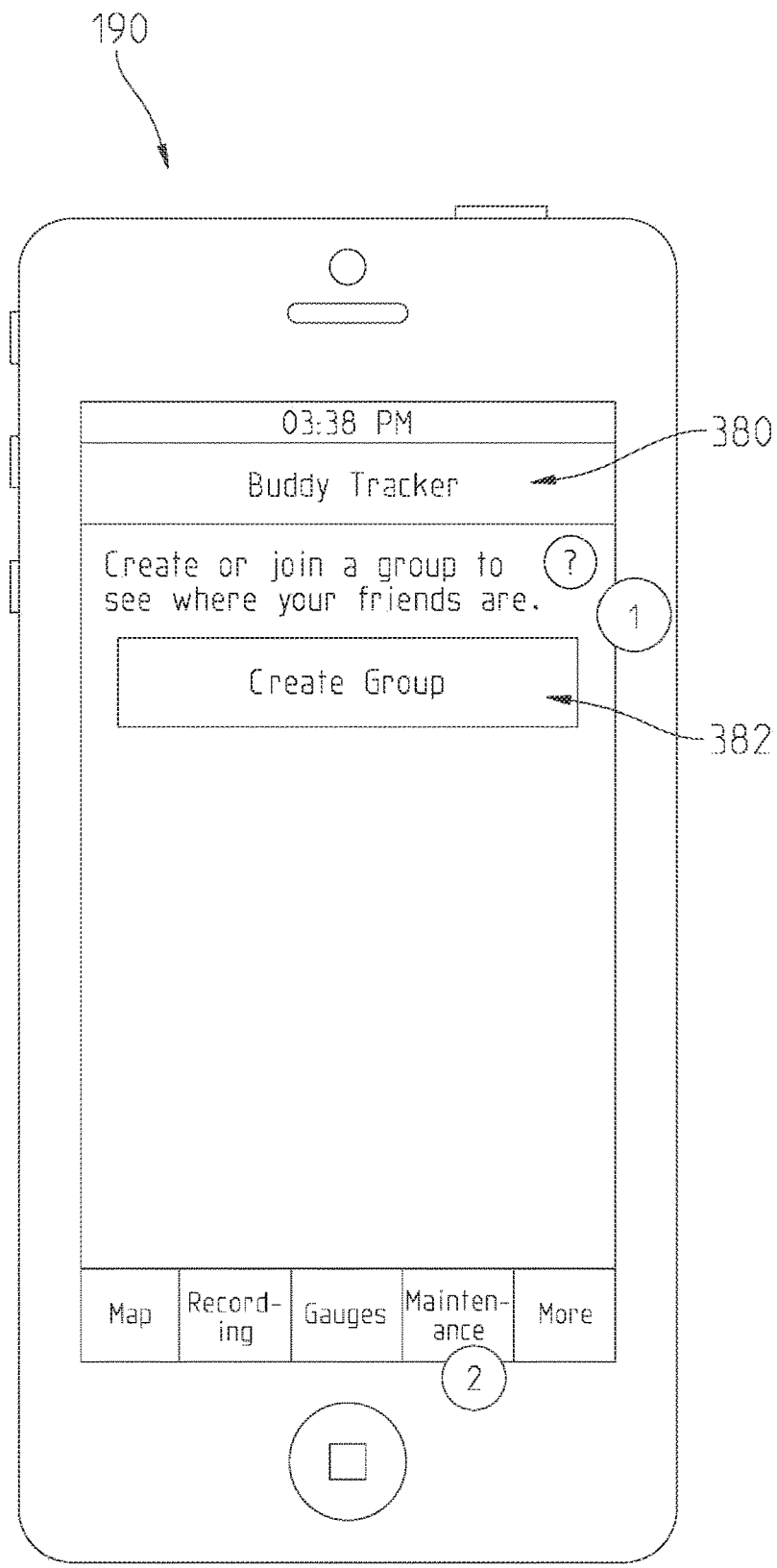
FIG. 31 illustrates an exemplary user interface for creating a new group.

The rider activates group management controller 186 on rider computing device 190, as represented by block 402. In one embodiment, group management controller 186 is activated by launching a software application on rider computing device 190. Through input devices 202 of rider computing device 190, the rider requests a new group be created, as represented by block 404. An exemplary create group page 380 for group management controller 186 displayed on display 206 of rider computing device 190 is shown in FIG. 31. The rider would select selectable region 382 to instruct group management controller 186 to send a request to group management master controller 300 to create a new group. In response, group management controller 186 sends a request to group management master controller 300 to create a new group, as represented by block 406.

Group management master controller 300 receives the request to create a new group, as represented by block 408. In response, group management master controller 300 creates a new group in group database 304, as represented by block 410, and adds information regarding the recreational vehicle 100 and/or rider to the created group in group database 304, as represented by block 412.

If not previously provided, group management master controller 300 sends a request to group management controller 186 on rider computing device 190 for a group name or identifier, a location of rider computing device 190, a group passcode 316, and range setting 320 for the group, as represented by block 414. Group management controller 186 of rider computing device 190 receives the request, as represented by block 416. Some information group management controller 186 retrieves without interaction with the rider. For example, group management controller 186 queries location determiner 184 for the current location of rider computing device 190. Other information, such as group identifier, group passcode, and range settings, group management controller 186 prompts the rider for input through output devices 204 which the rider subsequently provides through input devices 202. Once the requested information is gathered, group management controller 186 sends the information to group management master controller 300, as represented by block 418. Group management master controller 300 receives the response, as represented by block 420.

Group management master controller 300 sets the privacy setting for the group to open, as represented by block 422. In one embodiment, the privacy setting is an option selected in group management controller 186 by the rider. In one embodiment, the privacy setting is set by group management master controller 300 based on whether any one of the group members has a group management page of group management controller 186 displayed on display 206 of rider computing device 190. The group management page permits a user to at least one of view information about other members of the group, leave the group, or send invitations to join the group.

Figure 33:
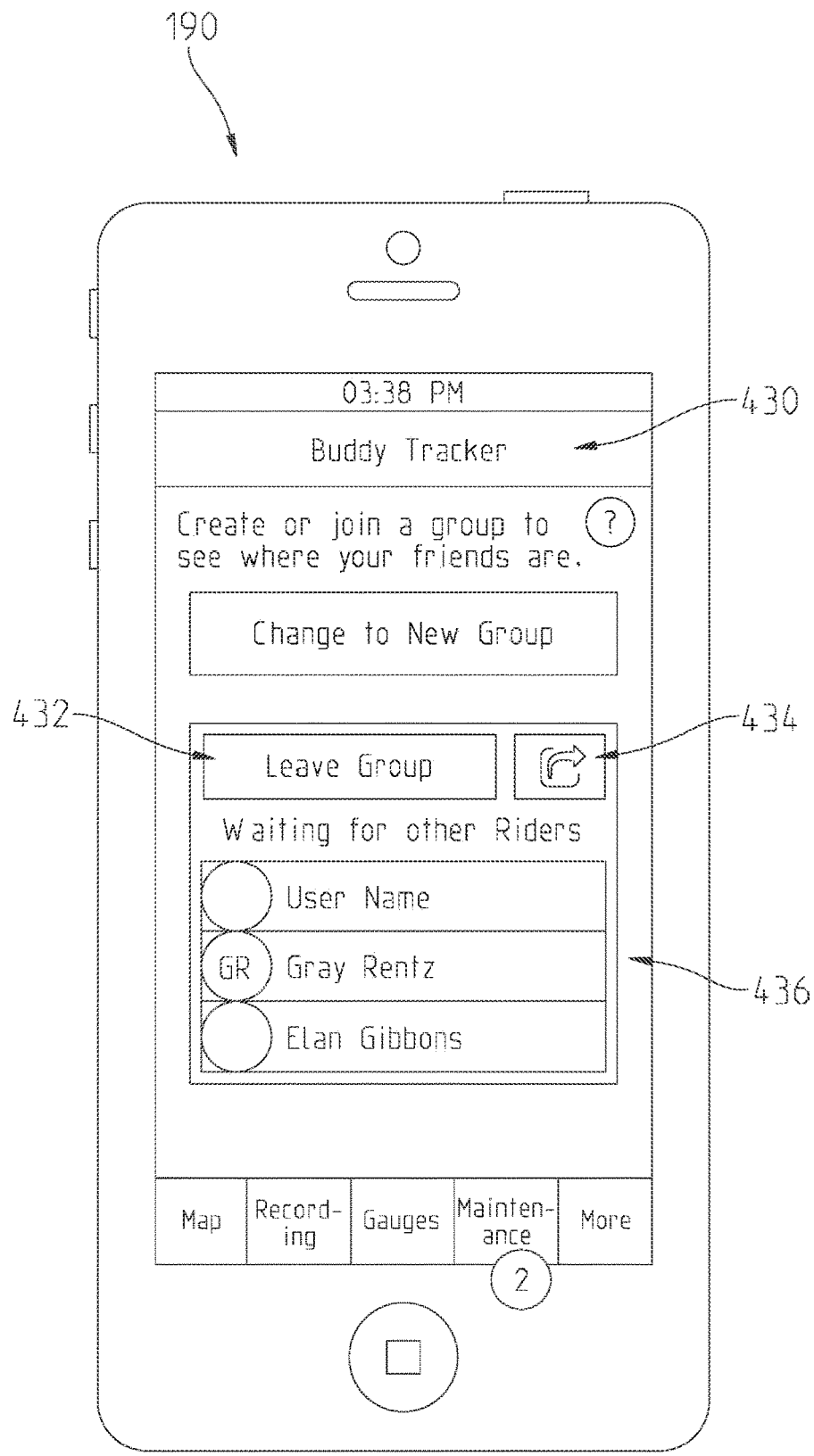
FIG. 33 illustrates an exemplary user interface for leaving a group.
Figure 34:
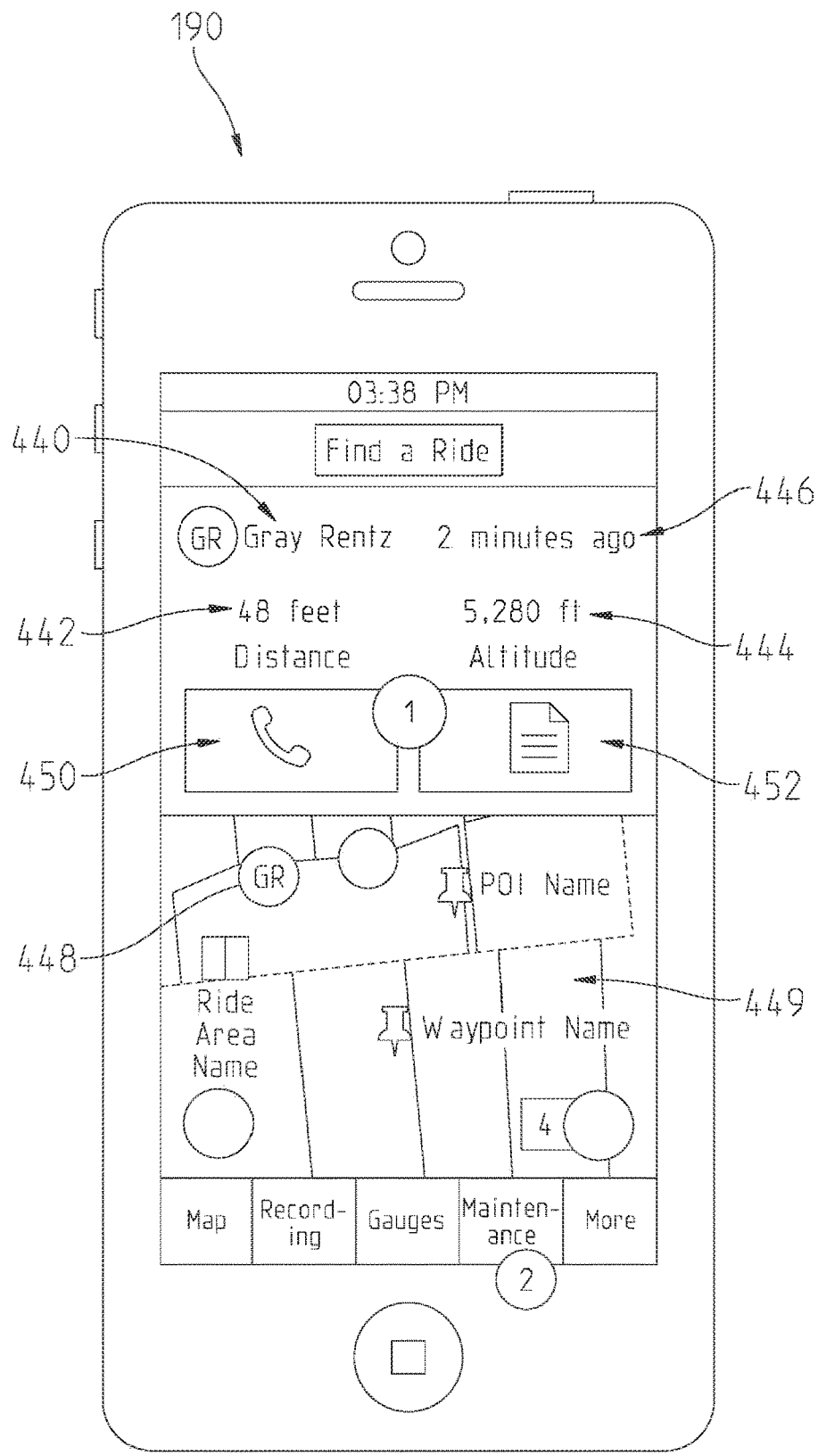
FIG. 34 illustrates an exemplary user interface for viewing information regarding a group member of a group.

An exemplary group management page 430 is shown in FIG. 33. Group management page 430 includes a first selectable portion 432 which sends a request to group management master controller 300 to remove the rider from the group, a second selectable portion 434 which prompts the rider to provide contact information for a potential group member. The contact information is then sent by group management controller 186 to group management master controller 300 for forwarding to the potential group member. A third selectable portion 436 sends a request to group management master controller 300 to provide information regarding a selected group member. An example response from group management master controller 300 and displayed by group management controller 186 is shown in FIG. 34. The information includes the rider meta data for the selected group member. The information may include name 440, distance away 442, altitude 444, last location update time 446, a graphical representative of last location 448 on a map 449, telephone contact 450 (selectable portion which causes a call to be placed), and text messaging contact 452 (selectable portion which causes a messaging application to be activated.

Figure 30:
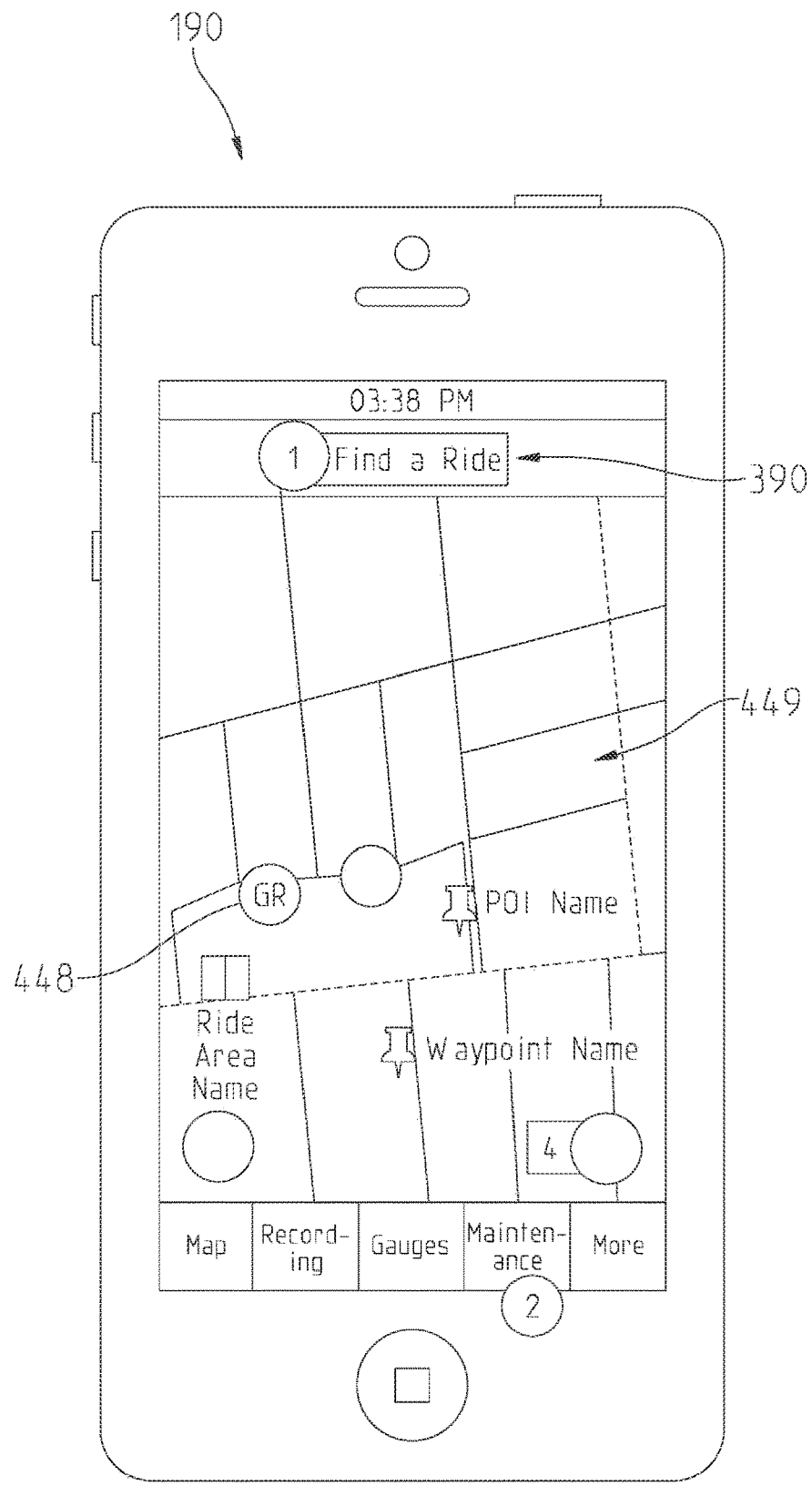
FIG. 30 illustrates an exemplary user interface for viewing the location of group members.
Figure 35:
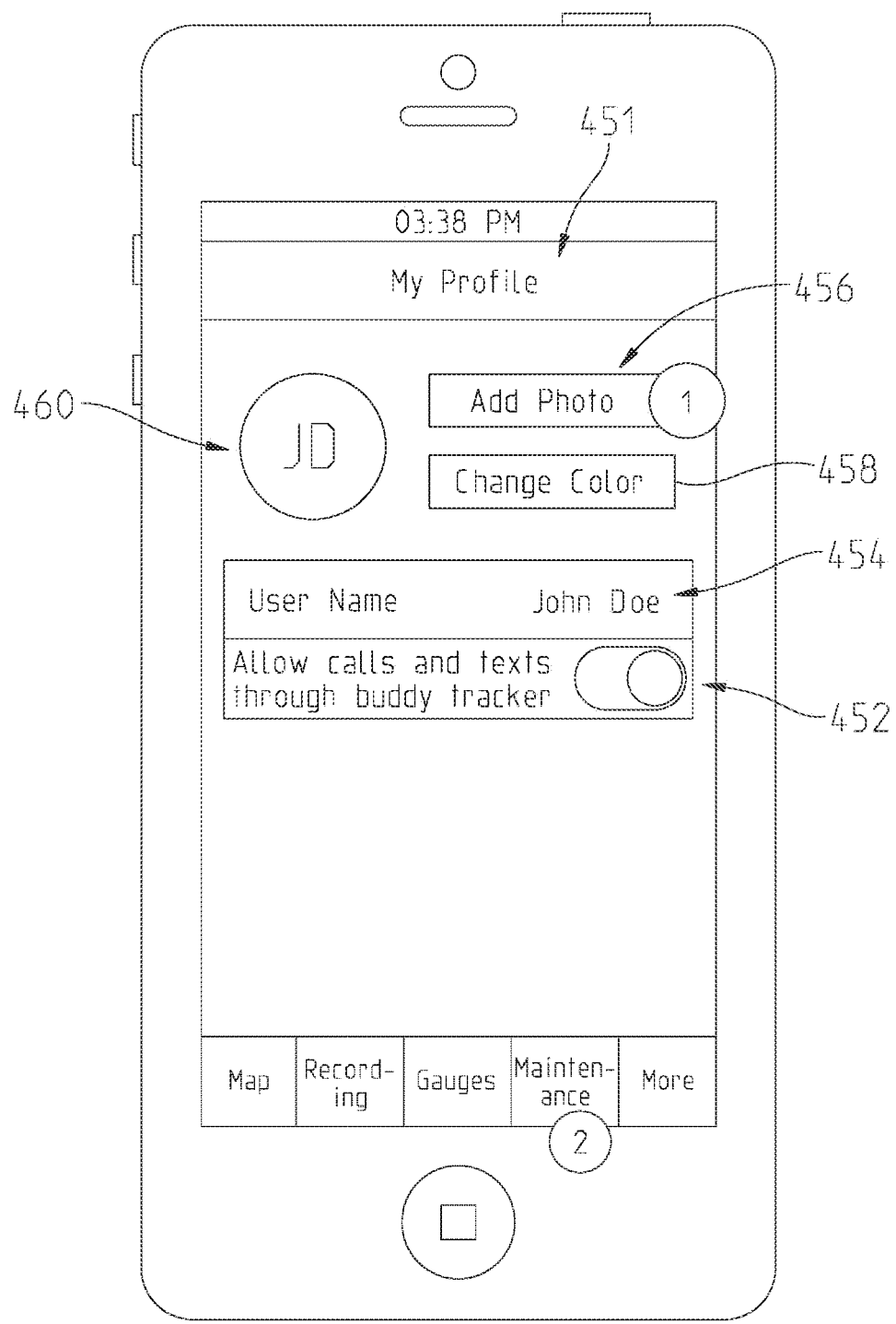
FIG. 35 illustrates an exemplary user interface for a group profile.

The ability to receive calls or texts from group members is an option selectable in group management controller 186. Referring to FIG. 35, an exemplary profile page 451 is displayed on display 206 by group management controller 186. Profile page 451 includes a selectable option 452 for permitting or denying communications from other group members. Further, a rider may change their displayed name through field 454, add a photo to their profile through selectable portion 456, or change a color of their displayed icon 460 through selectable area 458. The display icon 460 is the representative of a rider on the map 449 displayed on display 206 of other group member's rider computing device 190 or operator interface 150 (see icon 448 in FIG. 30). When a photo is uploaded, a representation of the photo is used as the displayed icon 460.

In one embodiment, the displayed icon further provides information regarding a state of the other group member's vehicle. For example, referring to FIG. 37, an exemplary user interface 800 provided on touch display 282 of instrument cluster 280, provides an indication of a movement state of each vehicle in a group. An icon 802 having a first shape, illustratively square, is representative of a non-moving vehicle while an icon 804 having a second shape, illustratively round, is representative of a moving vehicle. Each icon 804 further includes a heading indicator 806, illustratively an arrow pointing in a heading direction of the respective vehicle.

Figure 36:
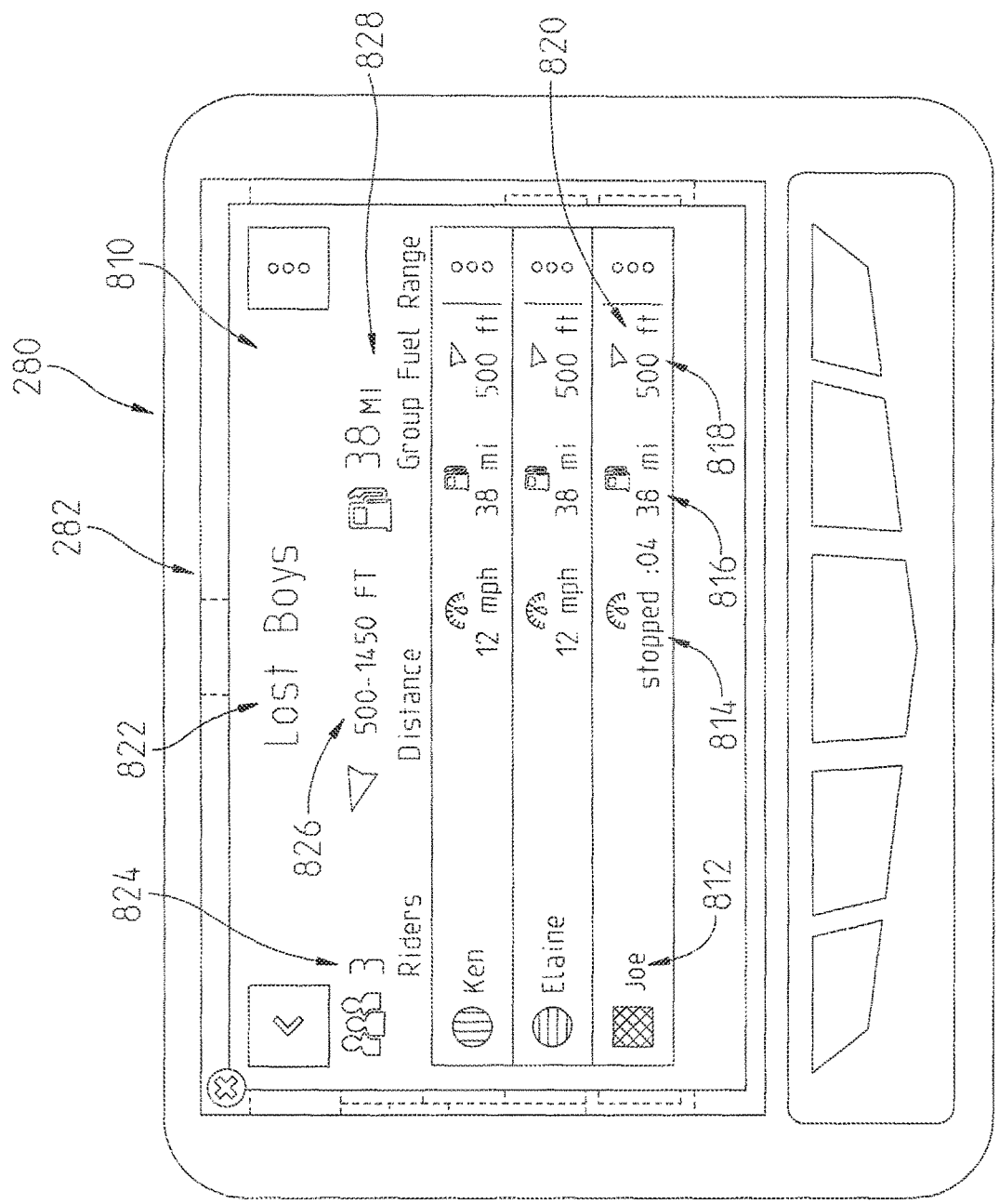
FIG. 36 illustrates an exemplary user interface for displaying information regarding members of a group.

In one embodiment, a first display icon is displayed on the display 206 of other user's logged into the group management system and a second display icon is displayed on the display 206 of user's logged into the group management system that are also in the same group as the current rider. The first display icon will provide only limited user information, such as location. The second display icon will provide more detailed user information, such as names, photos, and other data related to the user and/or the user's recreational vehicle. Exemplary first display icons may be a dot and exemplary second display icons may be a photo. Referring to FIG. 36, an exemplary user interface 810 provided on touch display 282 of instrument cluster 280 is shown. User interface 810 provides information regarding each member in a group that the current vehicle is associated with. Exemplary information includes group member name 812, vehicle speed 814 or, if stopped, the time duration the vehicle has been stopped; vehicle fuel range 816 or vehicle fuel level; distance to vehicle 818; and direction to vehicle 820. Further, user interface 810 provides additional information regarding the overall group. Exemplary information includes group name 822, number of riders in group 824, range to closest and furthest group members 826, and minimum fuel range 828 or fuel level of the group. In one example, the minimum fuel range corresponds to the lowest vehicle fuel range 816 across all of the vehicles in the group. In another example, the minimum fuel level corresponds to the lowest vehicle fuel level across all of the vehicles in the group.

Additional information may be displayed regarding the vehicle setup of each group member, such as, suspension settings, throttle profiles, gear selections, ride modes, and other suitable information. In one example, the location of each vehicle is determined by location system (FIG. 3). In another example, the location of each vehicle is further determined by indicated vehicle speed and direction and last known location.

In one embodiment, the location of every user logged into the group management system is sent to the rider computing device 190 or operator interface 150 for each user. In this manner, the location of each rider is shown on a map (based on the zoom level of the map) so that riders are aware of the location of nearby riders, even if those riders are not in the same group.

Figure 14:
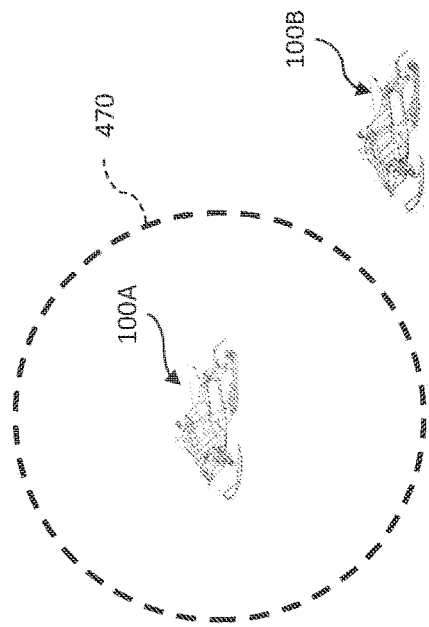
FIG. 14 illustrates the first vehicle and boundary of FIG. 12 and a second vehicle positioned outside of the boundary.
Figure 15:
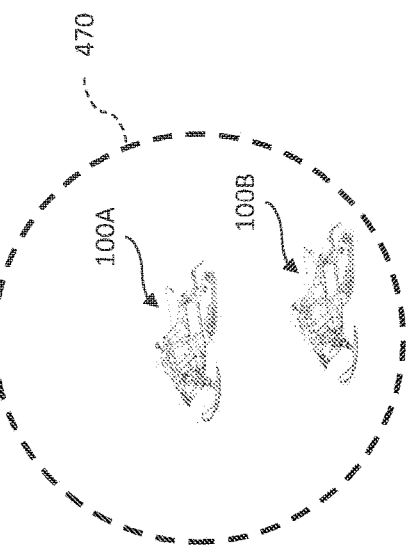
FIG. 15 illustrates the first vehicle and boundary of FIG. 12 and a second vehicle positioned inside of the boundary.

Once the group including vehicle 100A has been established, other vehicles 100 may join the group. In one embodiment, another vehicle 100 may join the group if the vehicle is within a geolocation boundary 470 (see FIG. 12) of the group. The geolocation boundary is set based on the location of the group members and the range setting 320 in group database 304. In FIG. 12, the group consists of a single recreational vehicle 100. In this case, the geolocation boundary 470 is a circle with a radius equal to the value of the range setting 320. In this scenario, a vehicle 100B as positioned in FIG. 14 could not join the group based on its geolocation because it is outside of geolocation boundary 470. In contrast, if vehicle 100B is positioned as in FIG. 15, vehicle 100B could join the group (assuming the privacy setting is open) because its geolocation is within geolocation boundary 470.

Figure 16:
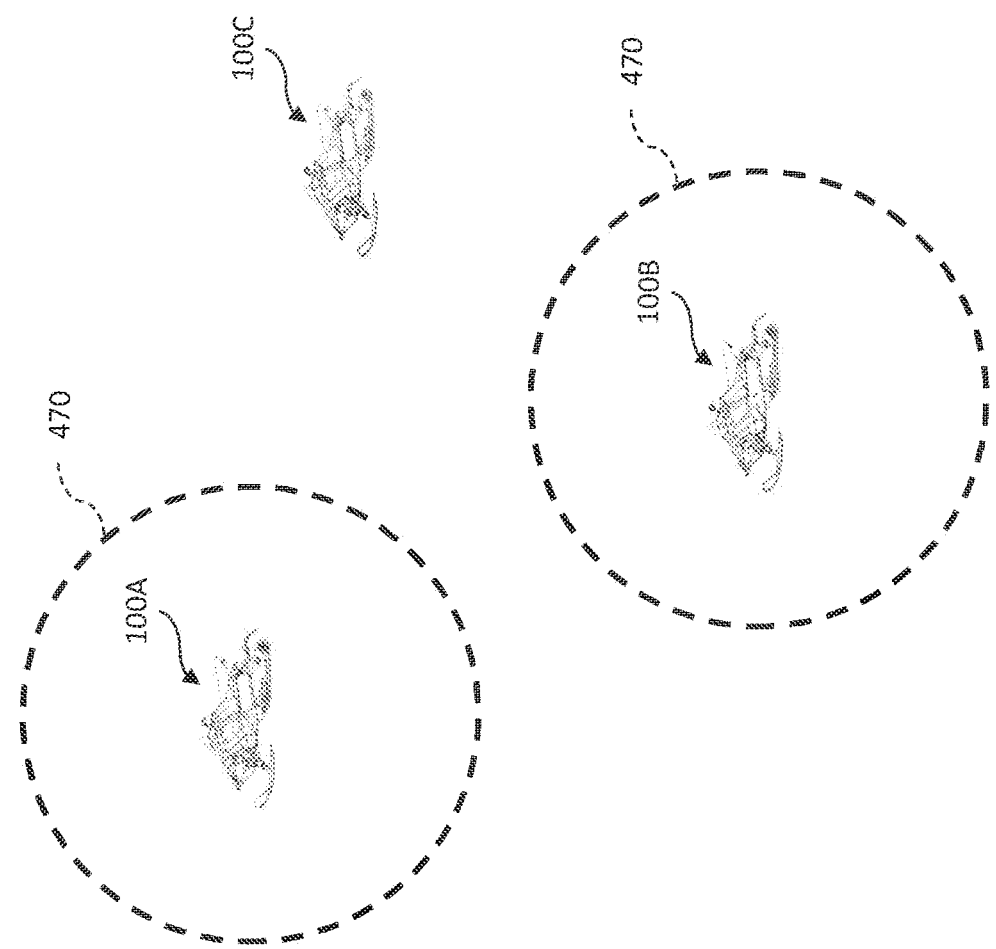
FIG. 16 illustrates a first vehicle and a second vehicle in a group together, a boundary for the group including the first vehicle and the second vehicle, and a third vehicle positioned outside of the boundary for the group.

For a group having at least two vehicles 100 in the group, the geolocation boundary 470 for the group encompasses each vehicle in the group. Referring to FIG. 16, a first example is illustrated wherein vehicle 100A and vehicle 100B are in a group together and the group boundary consists of two distinct boundaries, one surrounding each vehicle 100A and 100B. In order for a third vehicle 100C to be eligible to join the group based on its geolocation it would have to be within one of the two distinct boundaries 470.

Figure 17:
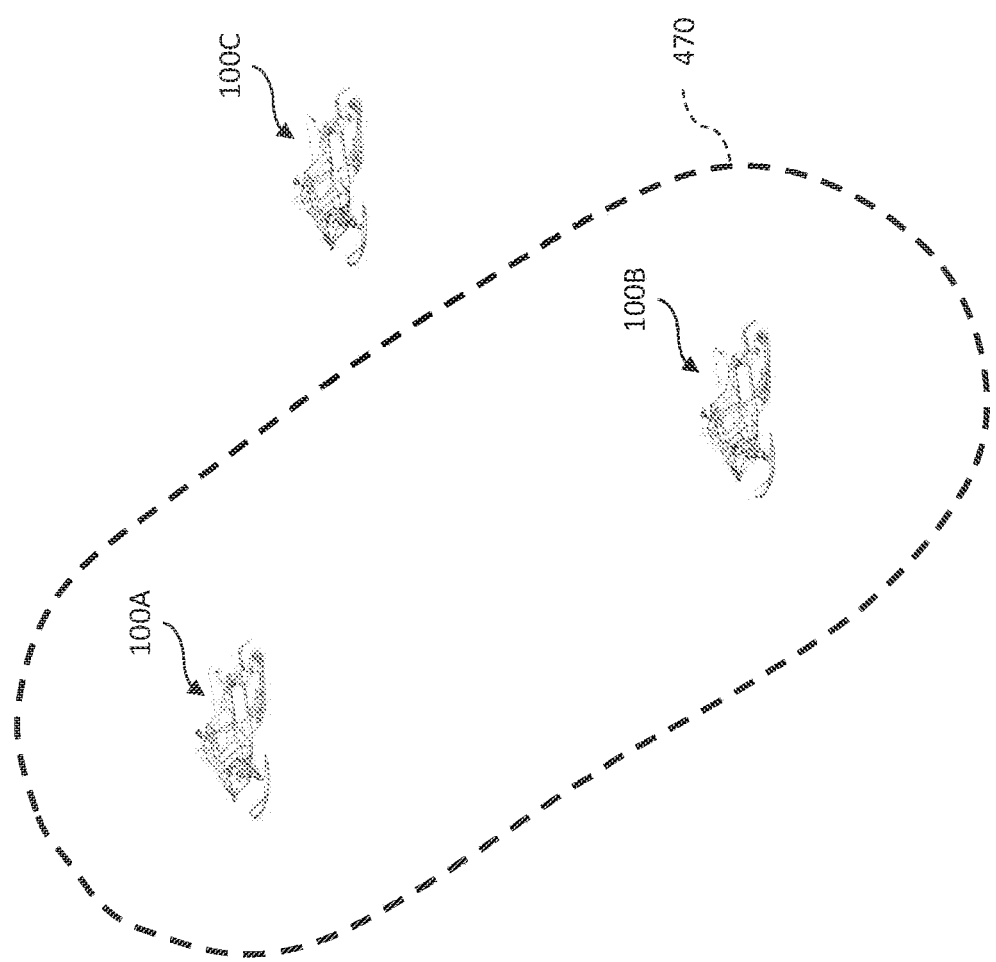
FIG. 17 illustrates a first vehicle and a second vehicle in a group together, a boundary for the group including the first vehicle and the second vehicle, and a third vehicle positioned outside of the boundary for the group.

Referring to FIG. 17, a second example is illustrated wherein vehicle 100A and vehicle 100B are in a group together and the group boundary 470 consists of a single boundary that surrounds each of vehicles 100A and 100B. In order for a third vehicle 100C to be eligible to join the group based on its geolocation it would have to be within boundary 470.

Figure 18:
FIG. 18 illustrates four vehicles in a first group together, a boundary for the first group including the four vehicles, three vehicles in a second group together, a boundary for the second group including the three vehicles, and an eighth vehicle positioned inside of the boundary for the first group and inside of the boundary for the second group.

Referring to FIG. 18, vehicles 100A, 100B, 100C, and 100D are in a first group with a first geolocation boundary 470A and vehicles 100E, 100F, and 100G are in a second group with a second geolocation boundary 470B. Based on its geolocation, a vehicle 100H would be eligible to join either group based on its geolocation because it is within each of boundary 470A and boundary 470B.

Figure 19:
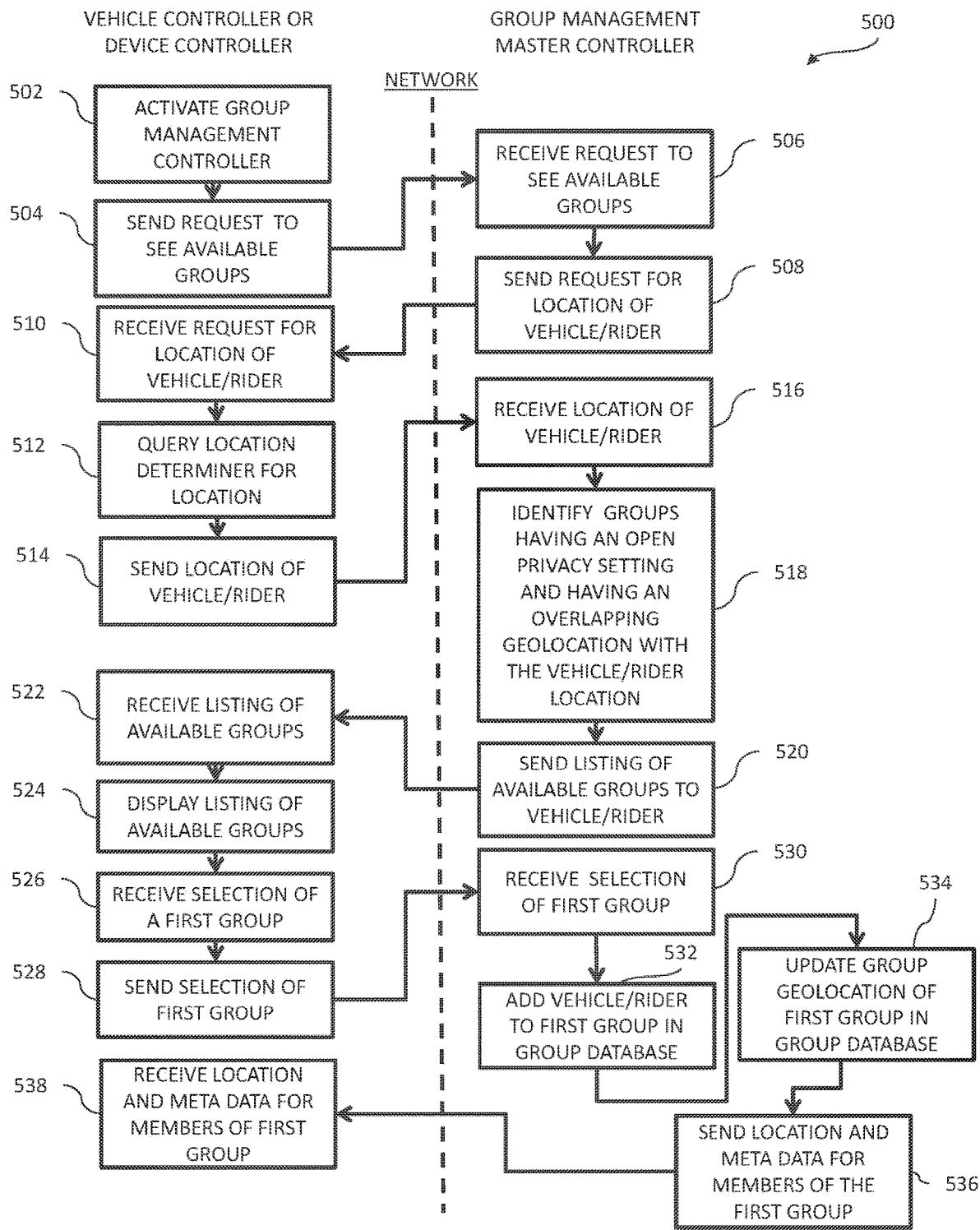
FIG. 19 illustrates an exemplary process for joining a group in the group database of FIG. 11 based on a geolocation of the vehicle/rider desiring to join and the geolocation of the group.

An exemplary process 500 for joining a group based on the geolocation of the requestor is illustrated in FIG. 19. The process is explained based on the rider connecting to group management master controller 300 through group management controller 186 on rider computing device 190, but is equally applicable to connecting to group management master controller 300 through group management controller 186 on recreational vehicle 100.

The rider activates group management controller 186 on rider computing device 190, as represented by block 502. In one embodiment, group management controller 186 is activated by launching a software application on rider computing device 190. Through input devices 202 of rider computing device 190, the rider requests a listing of available groups, as represented by block 504. In one example illustrated in FIG. 30, a rider would select selectable region 390 to cause group management controller 186 to send a request to group management master controller 300 for available groups.

Returning to FIG. 19, group management master controller 300 receives the request to see a listing of available groups, as represented by block 506. If not already provided, group management master controller 300 sends to group management controller 186 a request for the location of rider computing device 190, as represented by block 508. Group management controller 186 receives the request for the location of rider computing device 190, as represented by block 510 and queries location determiner 184 for the location, as represented by block 512. Group management controller 186 sends the location to group management master controller 300, as represented by block 514.

Group management master controller 300 receives the location of rider computing device 190 and identifies groups having an open privacy setting and having an overlapping geolocation with the location of rider computing device 190, as represented by block 518. Group management master controller 300 sends the listing of available groups to group management controller 186, as represented by block 520.

Figure 32:
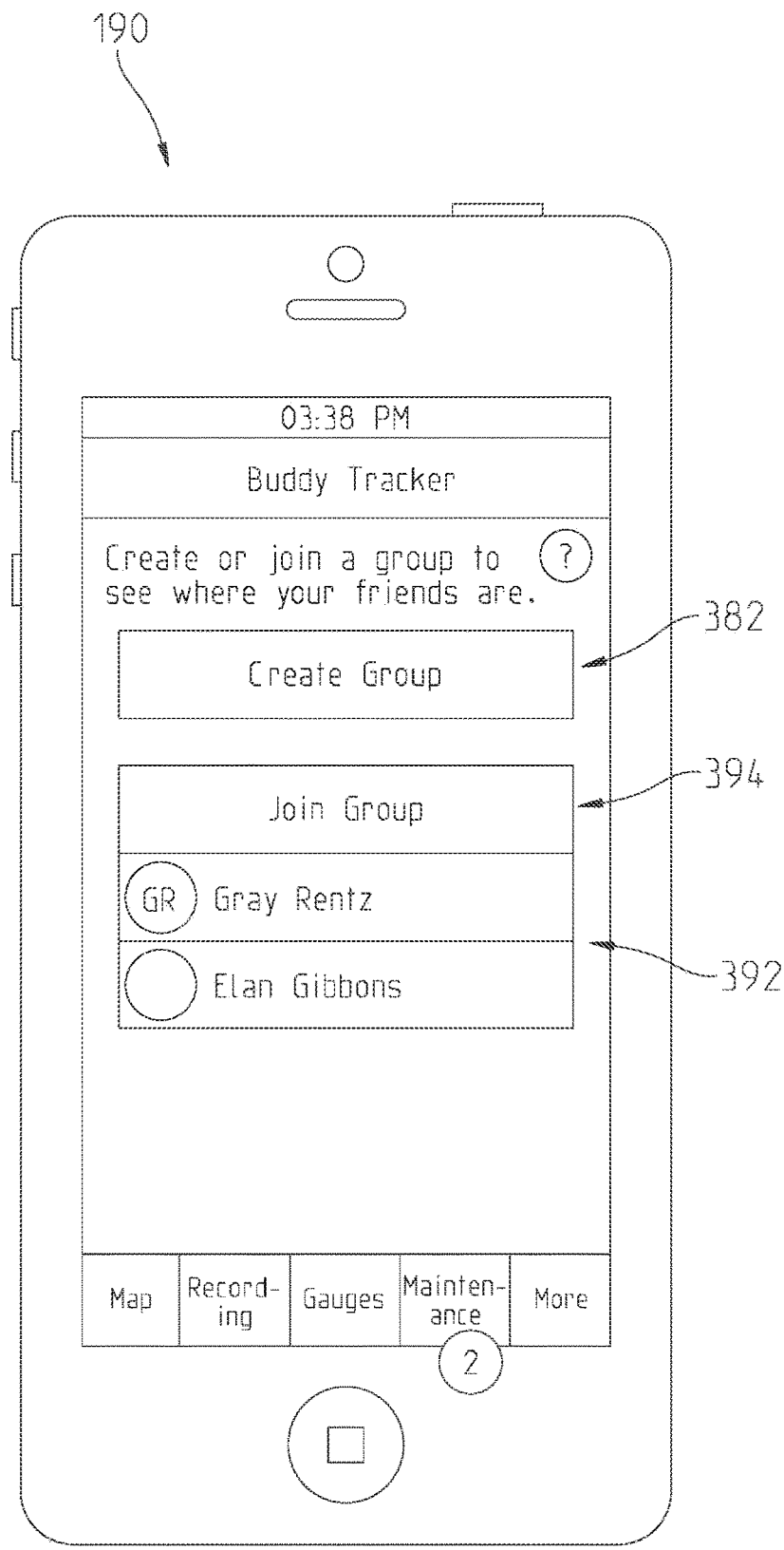
FIG. 32 illustrates an exemplary user interface for joining a group.

Group management controller 186 receives the listing of available groups, as represented by block 522. Group management controller 186 causes the listing of available groups to be displayed on display 206 of rider computing device 190, as represented by block 524. Referring to FIG. 32, an example listing 392 is provided (a single group of two other riders). The rider can select to join the group by selecting selectable area 394 on display 206 of rider computing device 190. Group management controller 186 receives the selection, as represented by block 526, and sends the selected group to group management master controller 300, as represented by block 528.

Group management master controller 300 receives the selection of a first group, as represented by block 530. Group management master controller 300 then adds information regarding the recreational vehicle 100 and/or the rider to the first group in group database 304, as represented by block 532. Group management master controller 300 then updates the geolocation information of the first group (boundary information 322) in group database 304, as represented by block 534.

Group management master controller 300 then sends the location and meta data for the other members of the first group to group management controller 186 of the newly added group member and the location and meta data of the newly added group member to the other members of the first group, as represented by block 536. Group management controller 186 of the newly added group member receives the location and meta data of the other members of the first group, as represented by block 538.

Process 500 permits the joining of an open group based on location data. An exemplary process 600 illustrated in FIG. 20, permits the joining of a group based on knowledge of the group passcode 316. As mentioned herein, an invitation to join a group may be sent by selecting second selectable portion 434 on group management page 430 displayed by group management controller 186 of rider computing device 190. This permits someone to join a group that is outside of geolocation boundary 470 of the group.

Figure 20:
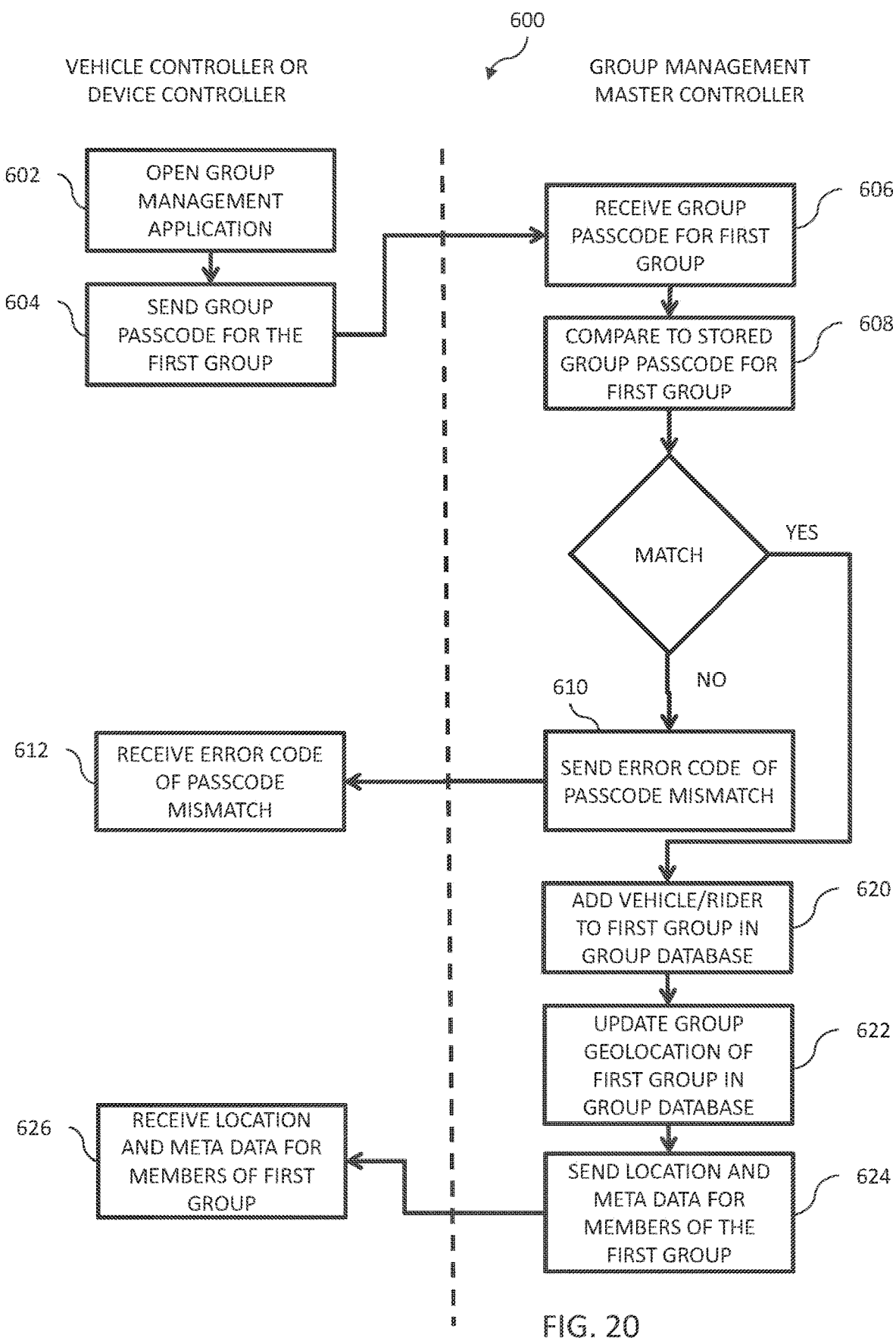
FIG. 20 illustrates an exemplary process for joining a group in the group database of FIG. 11 based on knowledge of a group passcode.

Turning to FIG. 20, process 600 is explained based on the rider connecting to group management master controller 300 through group management controller 186 on rider computing device 190, but is equally applicable to connecting to group management master controller 300 through group management controller 186 on recreational vehicle 100.

The rider inputs the group passcode into rider computing device 190 and group management controller 186 of rider computing device 190 sends the group passcode to group management master controller 300, as represented by block 604. Group management master controller 300 receives the entered passcode, as represented by block 606, and compares the entered passcode to the group passcode 316 in group database 304, as represented by block 608. If the entered passcode does not match the stored passcode 316, group management master controller 300 sends an error code to group management controller 186 of rider computing device 190, as represented by block 610. The error code is received by rider computing device 190, as represented by block 612.

If the entered passcode does match the stored group passcode 316, group management master controller 300 then adds information regarding the recreational vehicle 100 and/or the rider to the group in group database 304, as represented by block 620. Group management master controller 300 then updates the geolocation information of the first group (boundary information 322) in group database 304, as represented by block 534. In one embodiment, the addition of a group member based on knowledge of the passcode does not alter the geolocation boundary 470 for the group.

Group management master controller 300 then sends the location and meta data for the other members of the group to group management controller 186 of the newly added group member and the location and/or meta data of the newly added group member to the other members of the first group, as represented by block 624. Group management controller 186 of the newly added group member receives the location and meta data of the other members of the first group, as represented by block 626.

Figure 21:
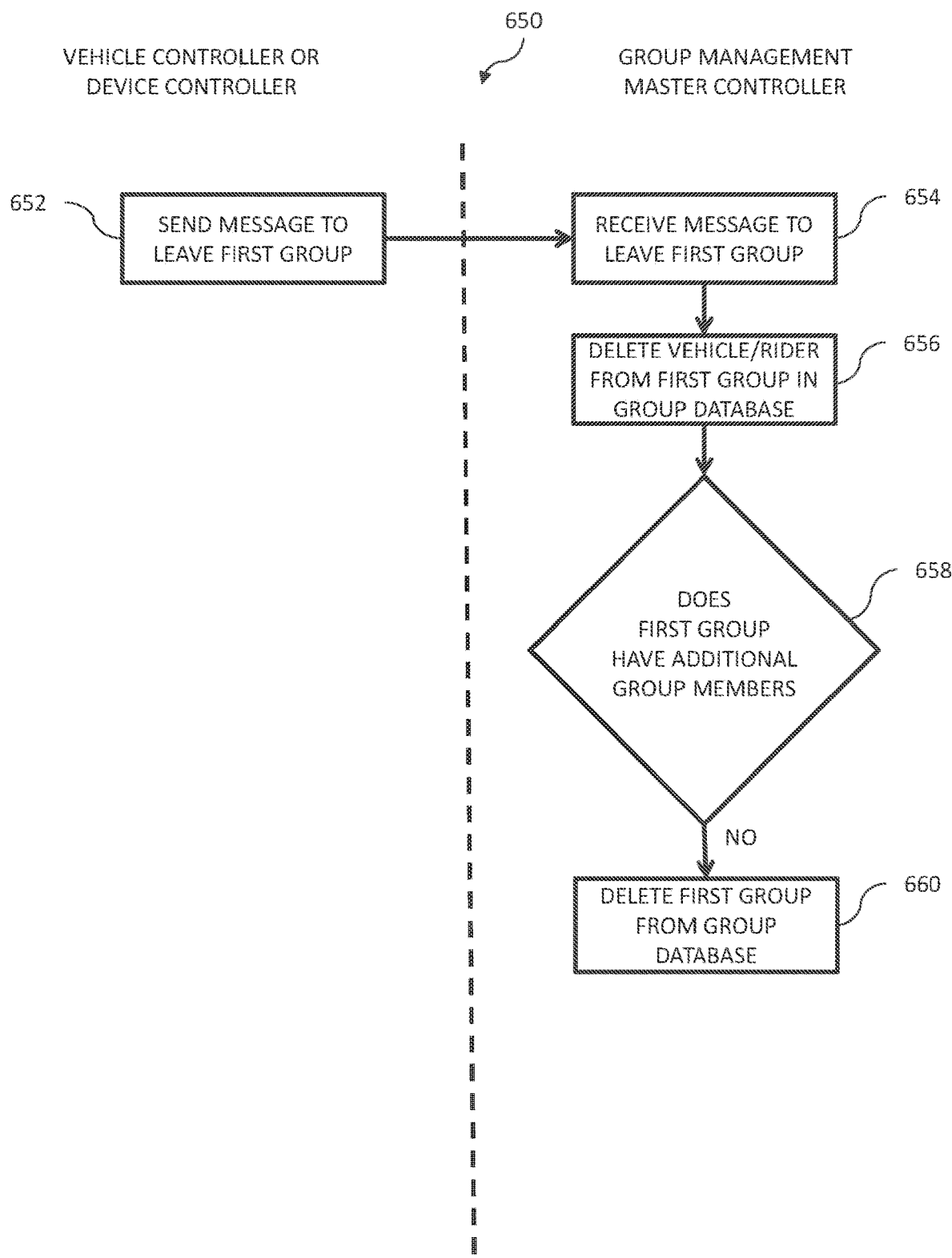
FIG. 21 illustrates an exemplary process for leaving a group in the group database of FIG. 11.

Referring to FIG. 21, an exemplary process 650 for leaving a group is provided. Process 650 is explained based on the rider connecting to group management master controller 300 through group management controller 186 on rider computing device 190, but is equally applicable to connecting to group management master controller 300 through group management controller 186 on recreational vehicle 100.

The rider provides an input to group management controller 186 to send a message to group management master controller 300 that the rider is leaving the group, as represented by block 652. In one embodiment, a user selects selectable region 432 of group management page 430 displayed on display 206 of rider computing device 190 by group management controller 186 to provide the input to group management controller 186. Group management master controller 300 receives the message to delete user from group database 304, as represented by block 654.

Group management master controller 300 deletes the user from the group in group database 304, as represented by block 656. Group management master controller 300 also checks to see if the group has remaining additional members, as represented by block 658. If not, group management master controller 300 deletes the entire group from group database 304.

Figure 22:
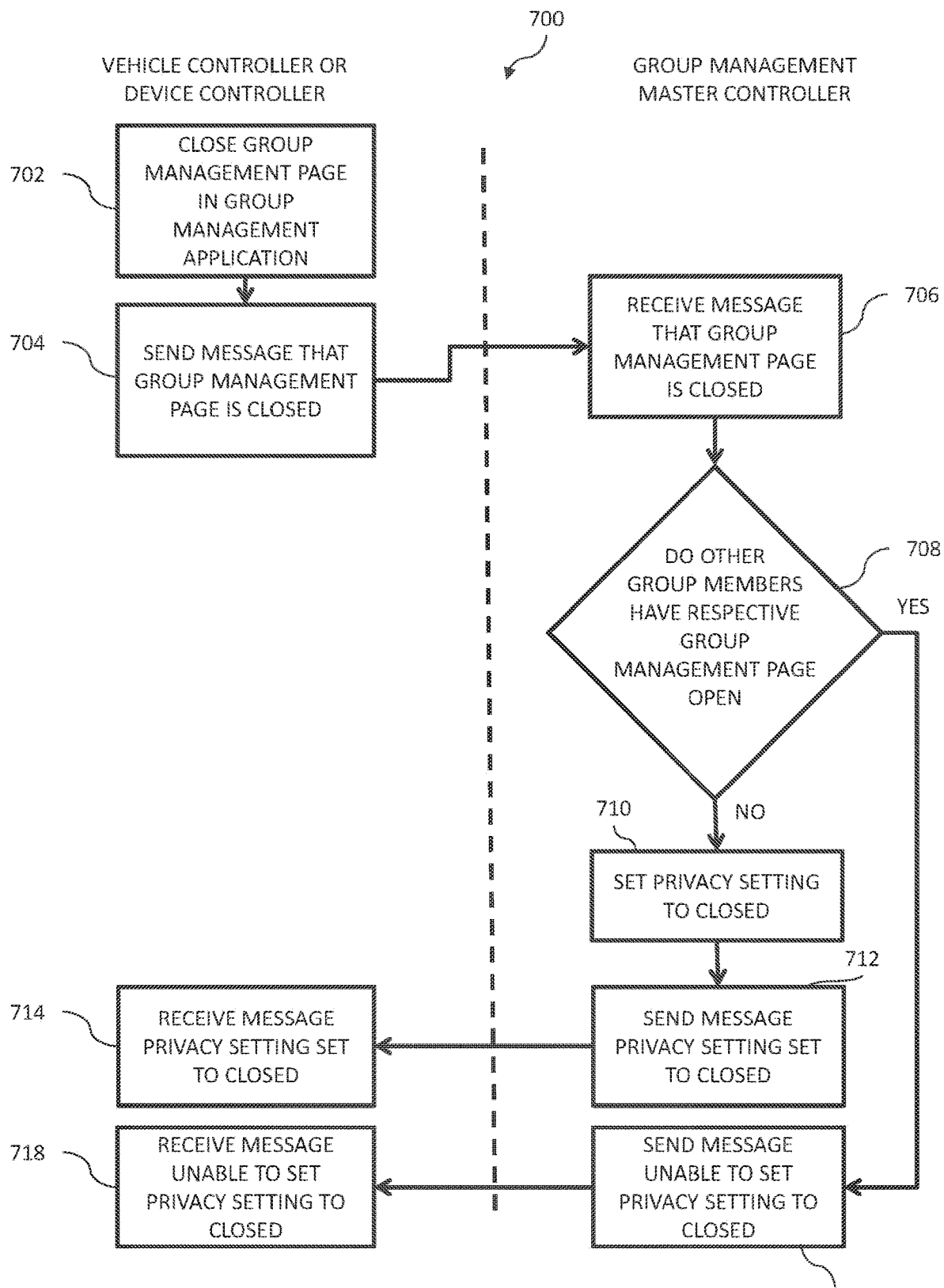
FIG. 22 illustrates an exemplary process for setting a privacy setting of a group in the group database of FIG. 11 to closed.

Referring to FIG. 22, an exemplary process 700 for setting a group privacy setting to closed is provided. Process 700 is explained based on the rider connecting to group management master controller 300 through group management controller 186 on rider computing device 190, but is equally applicable to connecting to group management master controller 300 through group management controller 186 on recreational vehicle 100.

As mentioned herein, in one embodiment, the privacy setting is set by group management master controller 300 based on whether any one of the group members has a group management page of group management controller 186 displayed on display 206 of rider computing device 190. The group management page 430 permits a user to at least one of view information about other members of the group, leave the group, or send invitations to join the group. An exemplary group management page 430 is shown in FIG. 33.

When a user closes the group management page 430, as represented by block 702, group management controller 186 sends a message to group management master controller 300 that the group management application is closed, as represented by block 704. Group management master controller 300 receives the message that the group management page 430 is closed, as represented by block 706. Group management master controller 300 checks to see if any other members in the group have their group management page open, as represented by block 708. If not, the privacy setting 318 for the group is set to closed, as represented by block 710.

Group management master controller 300 sends a message to group management controller 186 that the privacy setting has been set to closed, as represented by block 712. Group management controller 186 of rider computing device 190 receives the message regarding the privacy setting, as represented by block 714. In one embodiment, group management master controller 300 sends a message to all members in the group that the privacy setting has been changed to closed. Once a group member opens the group management page of group management controller 186, the privacy setting of the group changes back to open.

Returning to block 708, if one of the remaining group members has the group management page open, group management master controller 300 leaves the privacy setting 318 as open and sends a message to group management controller 186 that the privacy setting 318 is unable to be set to closed, as represented by block 716. Group management controller 186 receives the message, as represented by block 718. In one embodiment, group management master controller 300 closes the privacy setting after a preset time period of inactivity or after a preset time period from the last user to join the group.

Figure 23:
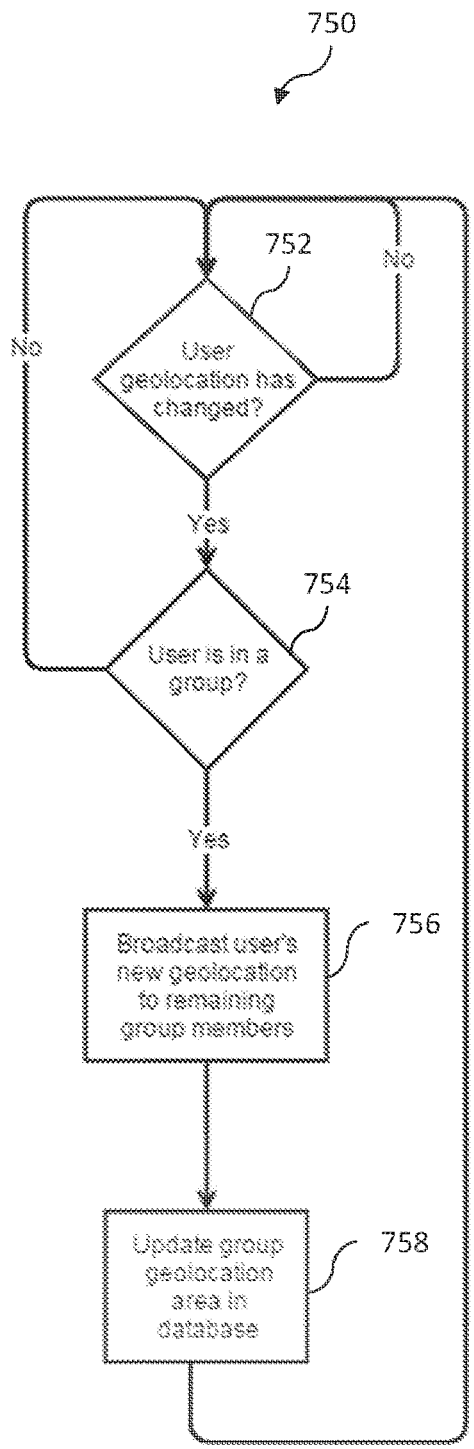
FIG. 23 illustrates an exemplary process for updating the geolocation information in a group in the group database of FIG. 11.

Group management master controller 300 tracks the geolocation information for every vehicle or rider in a group in group database 304. Referring to FIG. 23, an exemplary process 750 for tracking the geolocation information is provided. Process 750 is explained based on the rider connecting to group management master controller 300 through group management controller 186 on rider computing device 190, but is equally applicable to connecting to group management master controller 300 through group management controller 186 on recreational vehicle 100.

Group management master controller 300 determines if the geolocation for a given vehicle or rider has changed, as represented by block 752. In one embodiment, group management master controller 300 periodically queries each group management controller 186 for a current location of a given vehicle or rider. In one embodiment, a given vehicle or rider when in a group periodically sends its current location to group management master controller 300.

Group management master controller 300 verifies that the vehicle or rider is still in a group, as represented by block 754. If so, group management master controller 300 sends the received current location of the given vehicle or rider to the remaining members of its group, as represented by block 756. Group management master controller 300 further updates the location 312 of the given vehicle or rider in group database 304, as represented by block 758.

As mentioned herein group management controller 186 may be implemented on a rider computing device 190 and/or a recreational vehicle 100. FIGS. 24-29 illustrate various arrangements of the communication flow between recreational vehicle 100, rider computing device 190, and group management master controller 300.

Figure 24:
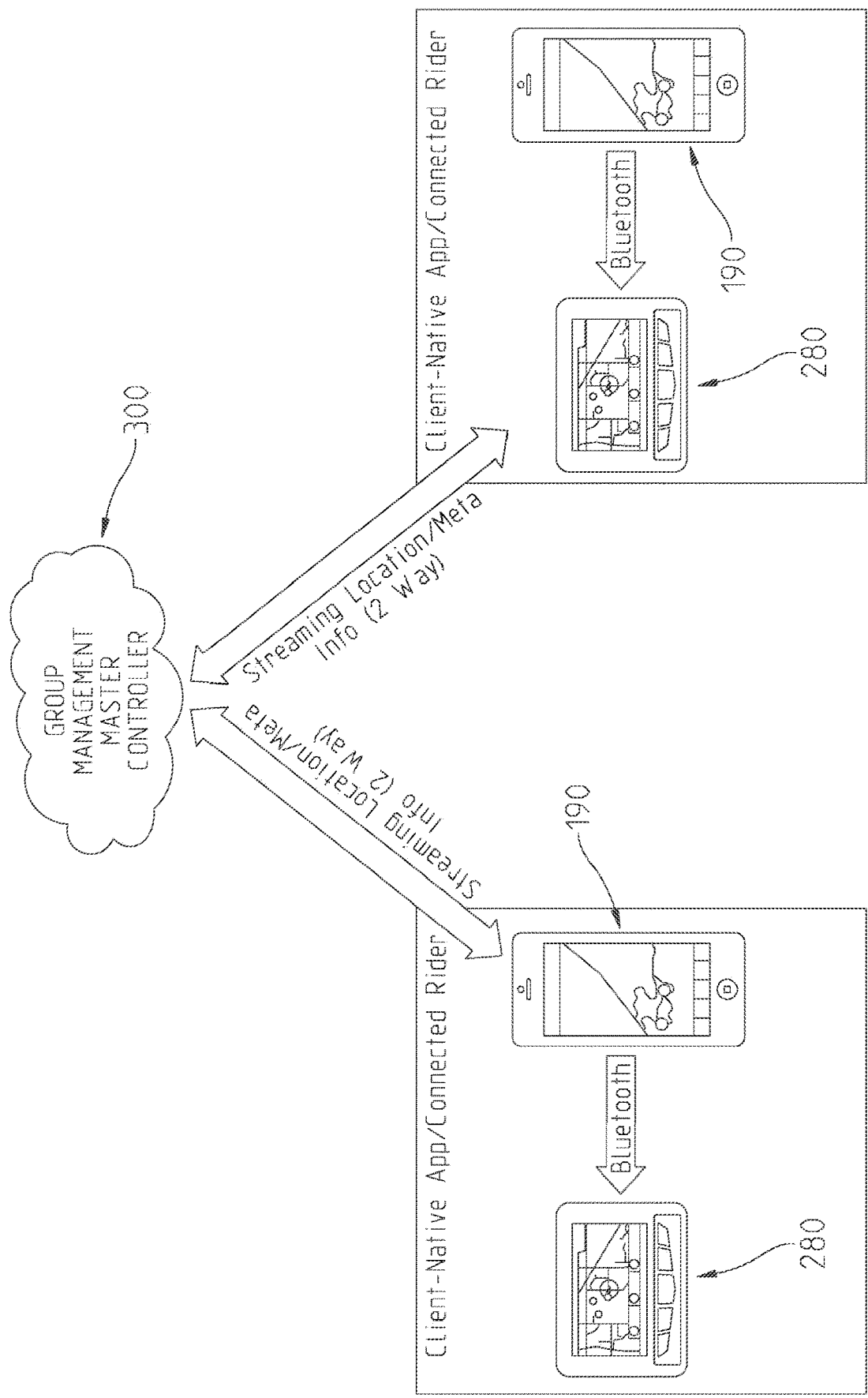
FIG. 24 illustrates a first communication flow arrangement between vehicles, rider computing devices, and a group management master controller.

Referring to FIG. 24, vehicle instrument cluster 280 of respective vehicles 100 communicate with respective rider computing device 190 over a wireless network. Exemplary wireless networks include radio frequency networks, cellular networks, and/or satellite networks. Rider computing devices 190 communicate with group management master controller 300 over wireless network. Exemplary wireless networks include radio frequency networks, cellular networks, and/or satellite networks.

Figure 25:
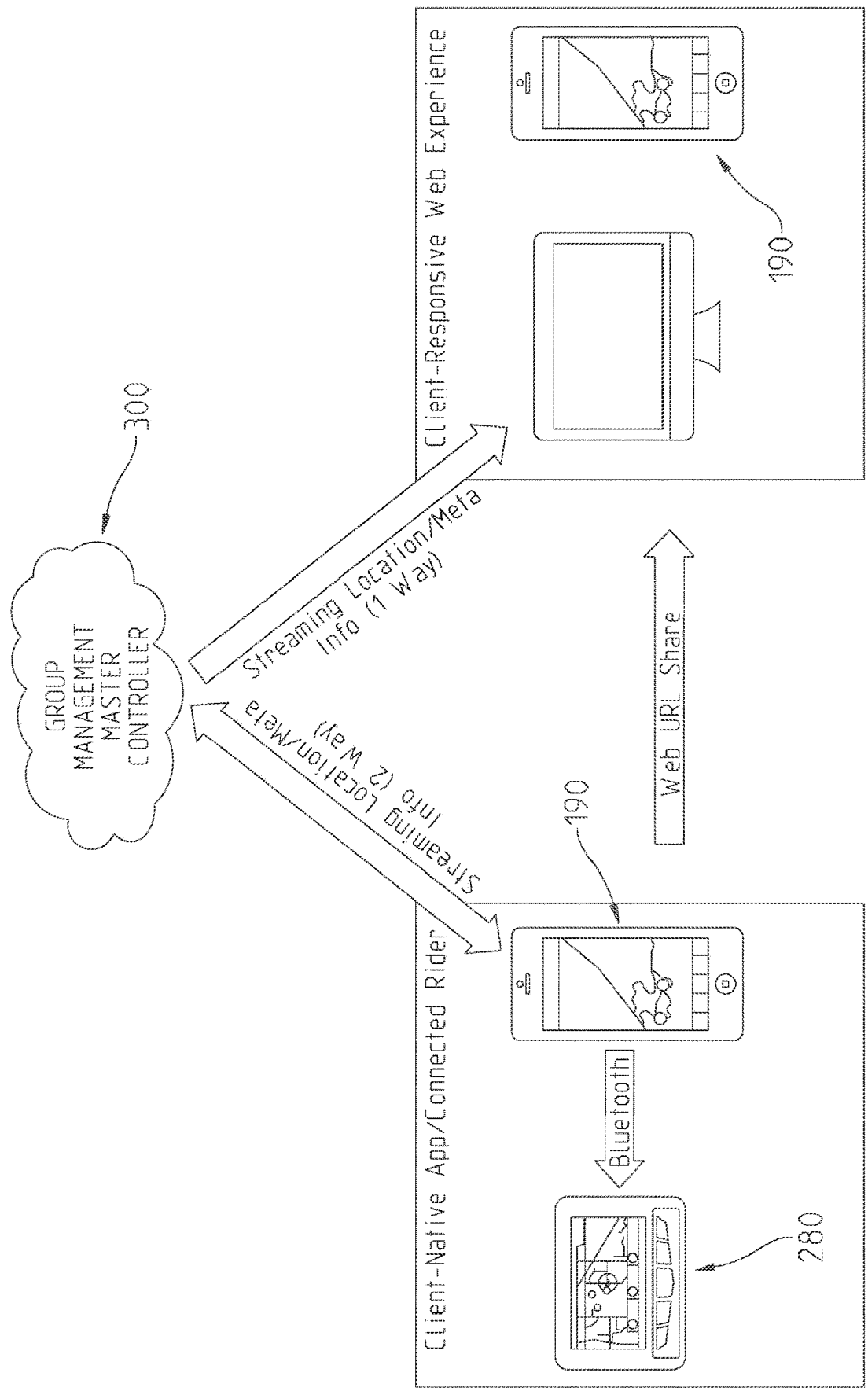
FIG. 25 illustrates a second communication flow arrangement between vehicles, rider computing devices, and a group management master controller.

Referring to FIG. 25, vehicle instrument cluster 280 of respective vehicles 100 communicate with respective rider computing device 190 over a wireless network. Exemplary wireless networks include radio frequency networks, cellular networks, and/or satellite networks. Further, a rider computing device 190 sends and invitation to another rider computing device 190 or other computing device to join the group. The invitation may be sent by any suitable method including text, e-mail, or social media. Rider computing devices 190 communicate with group management master controller 300 over wireless network. Exemplary wireless networks include radio frequency networks, cellular networks, and/or satellite networks.

Figure 26:
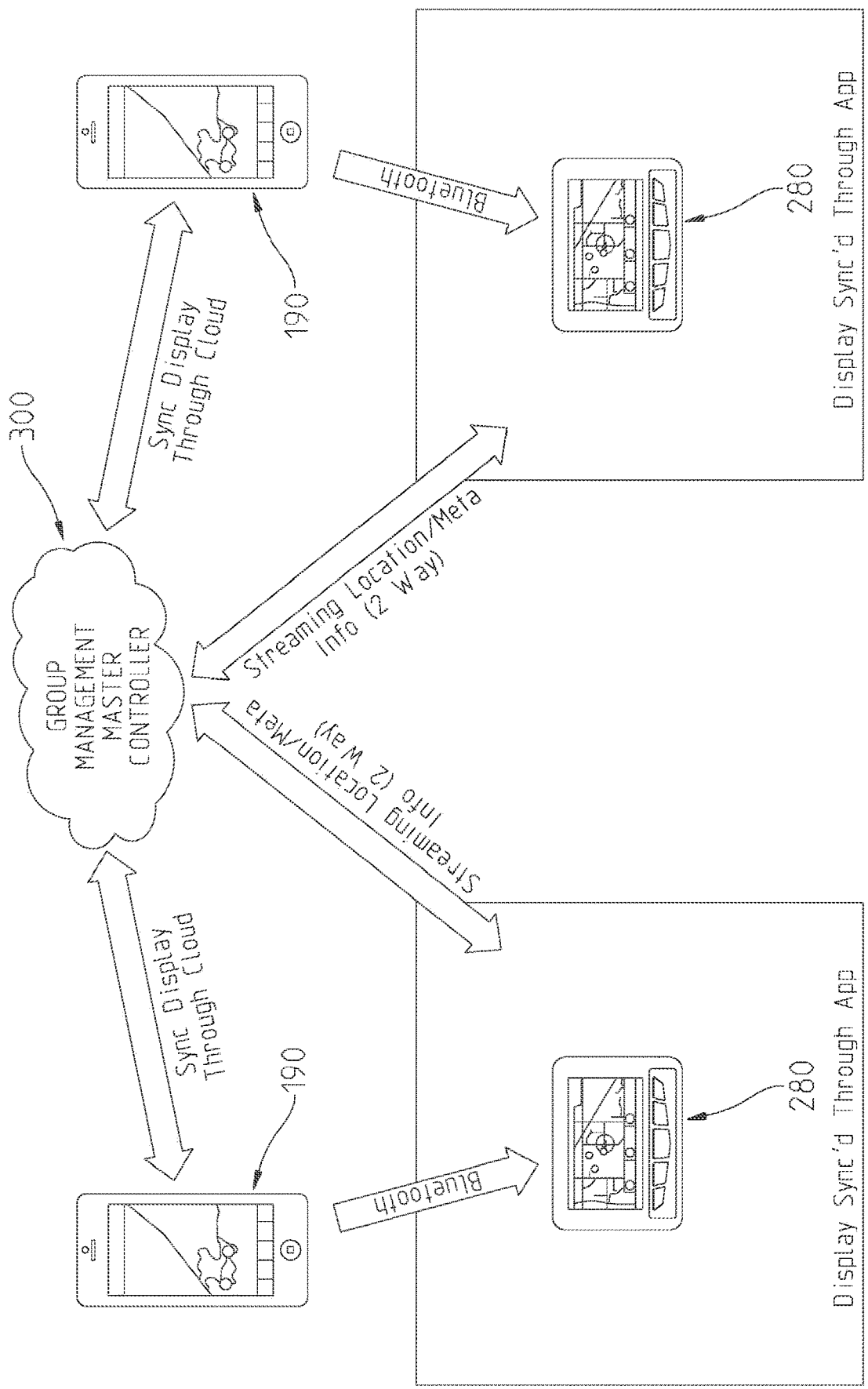
FIG. 26 illustrates a third communication flow arrangement between vehicles, rider computing devices, and a group management master controller.

Referring to FIG. 26, vehicle instrument cluster 280 of respective vehicles 100 communicate with respective rider computing device 190 over a wireless network. Exemplary wireless networks include radio frequency networks, cellular networks, and/or satellite networks. Further, both rider computing device 190 and vehicle instrument cluster 280 communicate with group management master controller 300 over wireless network. Exemplary wireless networks include radio frequency networks, cellular networks, and/or satellite networks. As such, vehicle instrument cluster 280 have an independent connection to group management master controller 300 from rider computing device 190.

Figure 27:
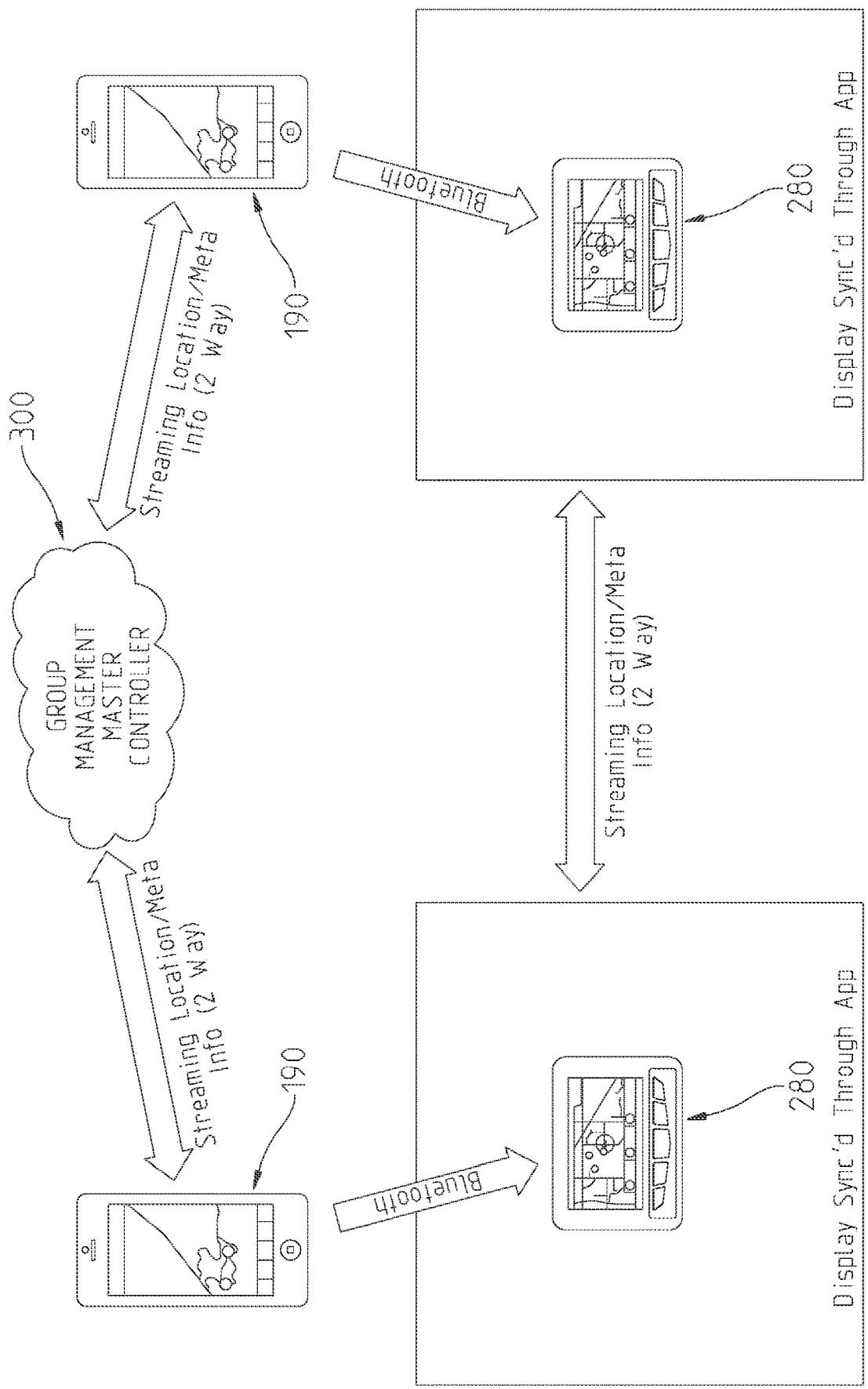
FIG. 27 illustrates a fourth communication flow arrangement between vehicles, rider computing devices, and a group management master controller.

Referring to FIG. 27, vehicle instrument cluster 280 of respective vehicles 100 communicate with respective rider computing device 190 over a wireless network. Exemplary wireless networks include radio frequency networks, cellular networks, and/or satellite networks. Rider computing devices 190 communicate with group management master controller 300 over wireless network. Exemplary wireless networks include radio frequency networks, cellular networks, and/or satellite networks. Further, vehicle instrument cluster 280 may communicate directly with each other over a wireless network. Exemplary wireless networks include radio frequency networks, cellular networks, and/or satellite networks.

Figure 28:
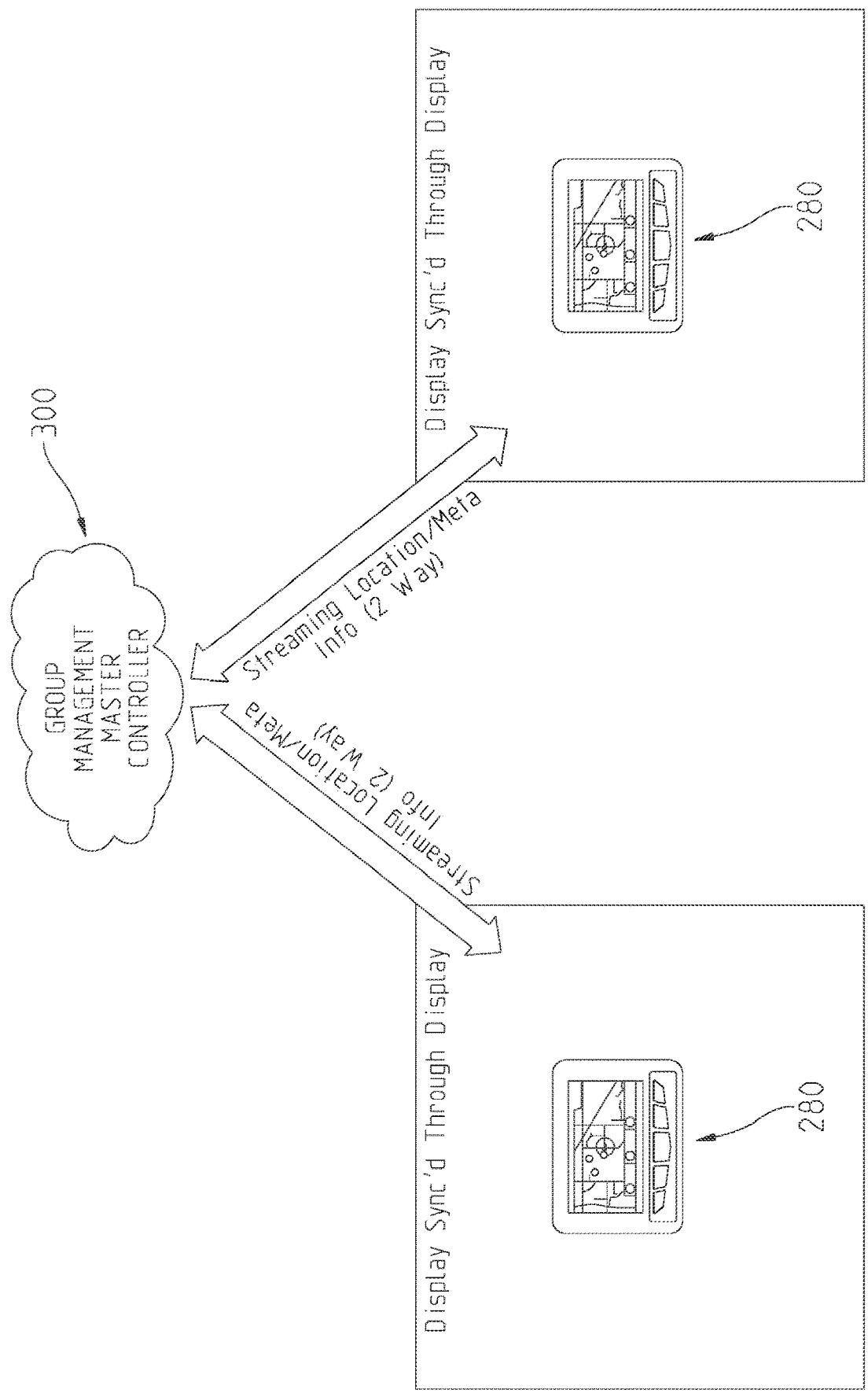
FIG. 28 illustrates a fifth communication flow arrangement between vehicles and a group management master controller.

Referring to FIG. 28, vehicle instrument cluster 280 of respective vehicles 100 communicate with group management master controller 300 over a wireless network. Exemplary wireless networks include radio frequency networks, cellular networks, and/or satellite networks.

Figure 29:
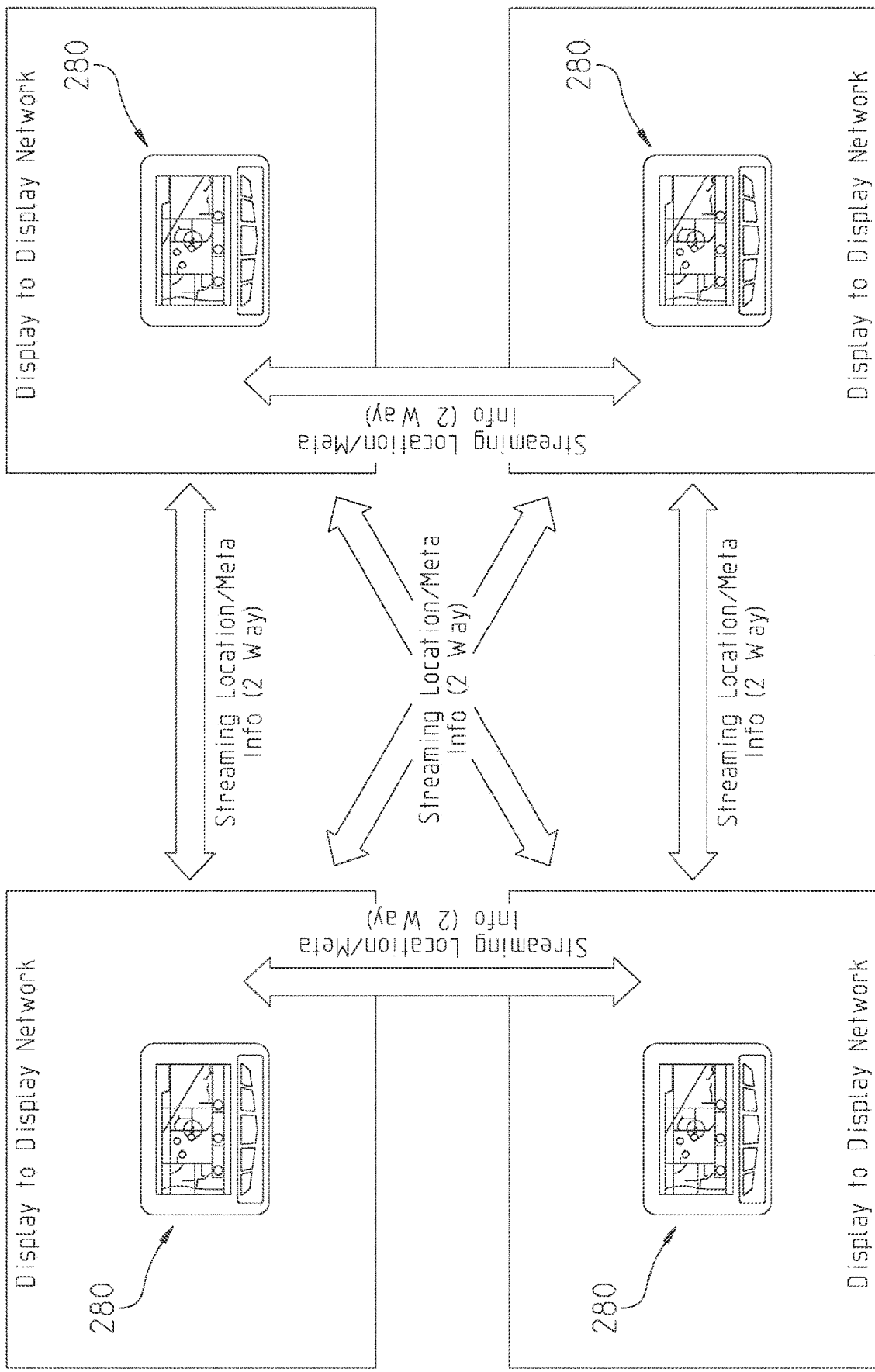
FIG. 29 illustrates a sixth communication flow arrangement between vehicles.

Referring to FIG. 29, vehicle instrument cluster 280 of respective vehicles 100 communicate with each other over a wireless network. Exemplary wireless networks include radio frequency networks, cellular networks, and/or satellite networks. In this embodiment, one of vehicle instrument cluster 280 hosts the functional aspects of group management master controller 300 to manage the group.

In one embodiment, when a group member enters into a distress situation, the group member can issue a request for assistance to his or her group. An exemplary request may be a text message. The request will display as an alert on the displays associated with the other group members. In one example, the location of the group member issuing the distress changes to an SOS icon indicator. Exemplary SOS icon indicators include a flashing icon and/or changing a color of an icon, such as from blue to red. In one embodiment, all users logged into the group management system within a defined geographical boundary will see the SOS icon, but only members of the same group will receive the request message from the rider in distress. The request may be manually triggered by depressing a button or selecting other input associated with the rider's computing device or vehicle display. The request may also be automatically triggered based on a sensor value. For example, in the case of a roll-over, an inclinometer associated with the vehicle will auto-trigger the request. In one example, the rider issuing the distress has a displayed icon on their own screen that flashes to alert them that the distress is still active. The distress may be deactivated by selecting an input. In one embodiment, the distress is deactivated by an input being selected for an extended period of time, such as several seconds.

In one embodiment, the zoom level of the map provided on touch display 282 of instrument cluster 280 may be controlled to automatically zoom to a size to illustrate the locations of all members in a group including the current vehicle including instrument cluster 280. Alternatively, the zoom level of the map provided on touch display 282 of instrument cluster 280 may be controlled to zoom to a size to illustrate a waypoint, such as a selected destination, and a current location of the vehicle including instrument cluster 280; to a size to illustrate a first vehicle selected to follow and a current location of the vehicle including instrument cluster 280; or to a user selected zoom level.

Figure 37:
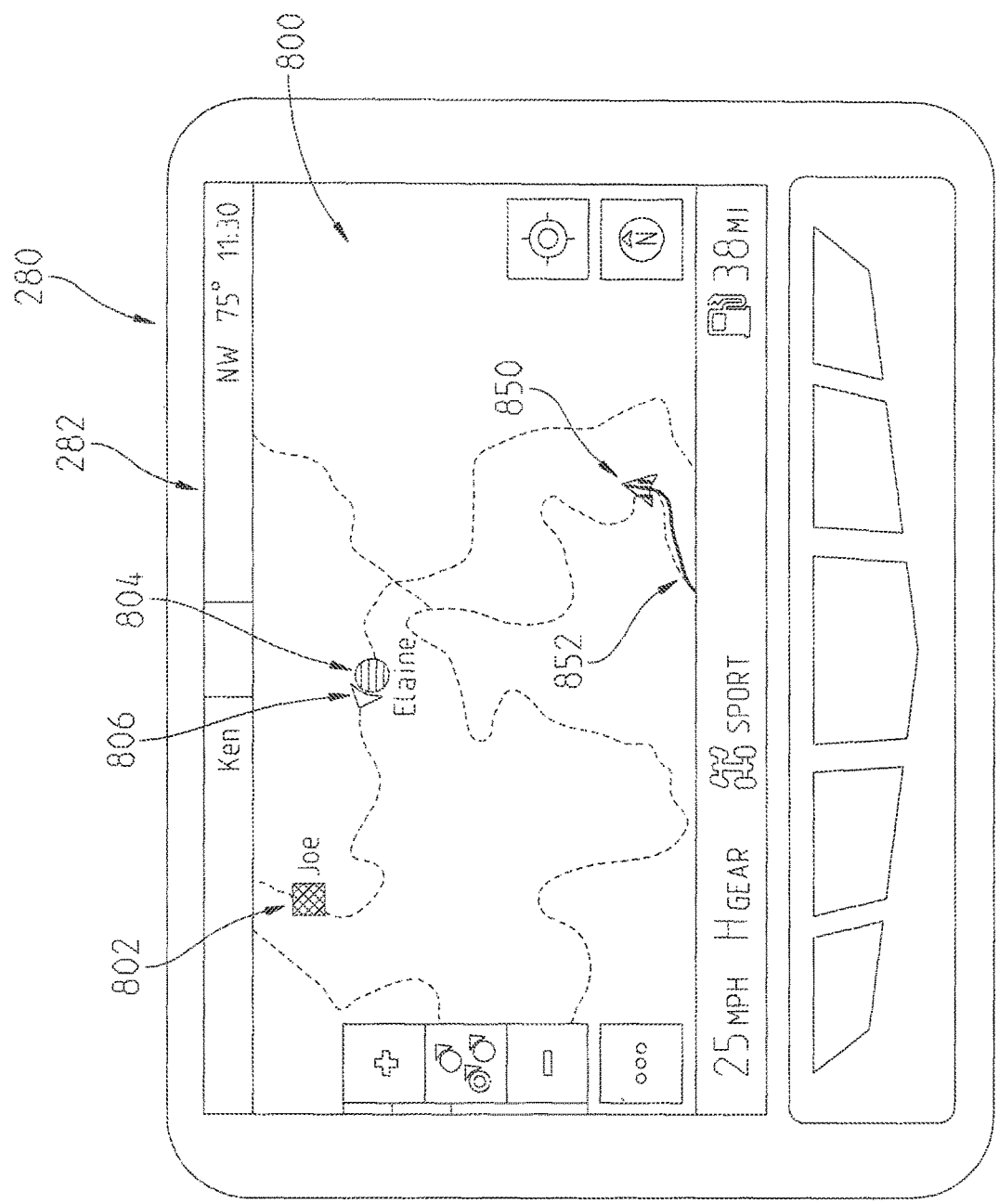
FIG. 37 illustrates an exemplary user interface illustrating a group auto-zoom.

Referring to FIG. 36, three group members are provided in the group designated "Lost Boys." Referring to FIG. 37, user interface 800 is auto-zoomed to display the location of each of the members of the group "Lost Boys." The members of Lost Boys include Joe whose location is indicated by icon 802 and Elaine whose location is indicated by icon 804. The location of Ken (the vehicle including instrument cluster 280) is indicated by icon 850. Further, the historical route of Ken is illustrated as route 852.

Figure 38:
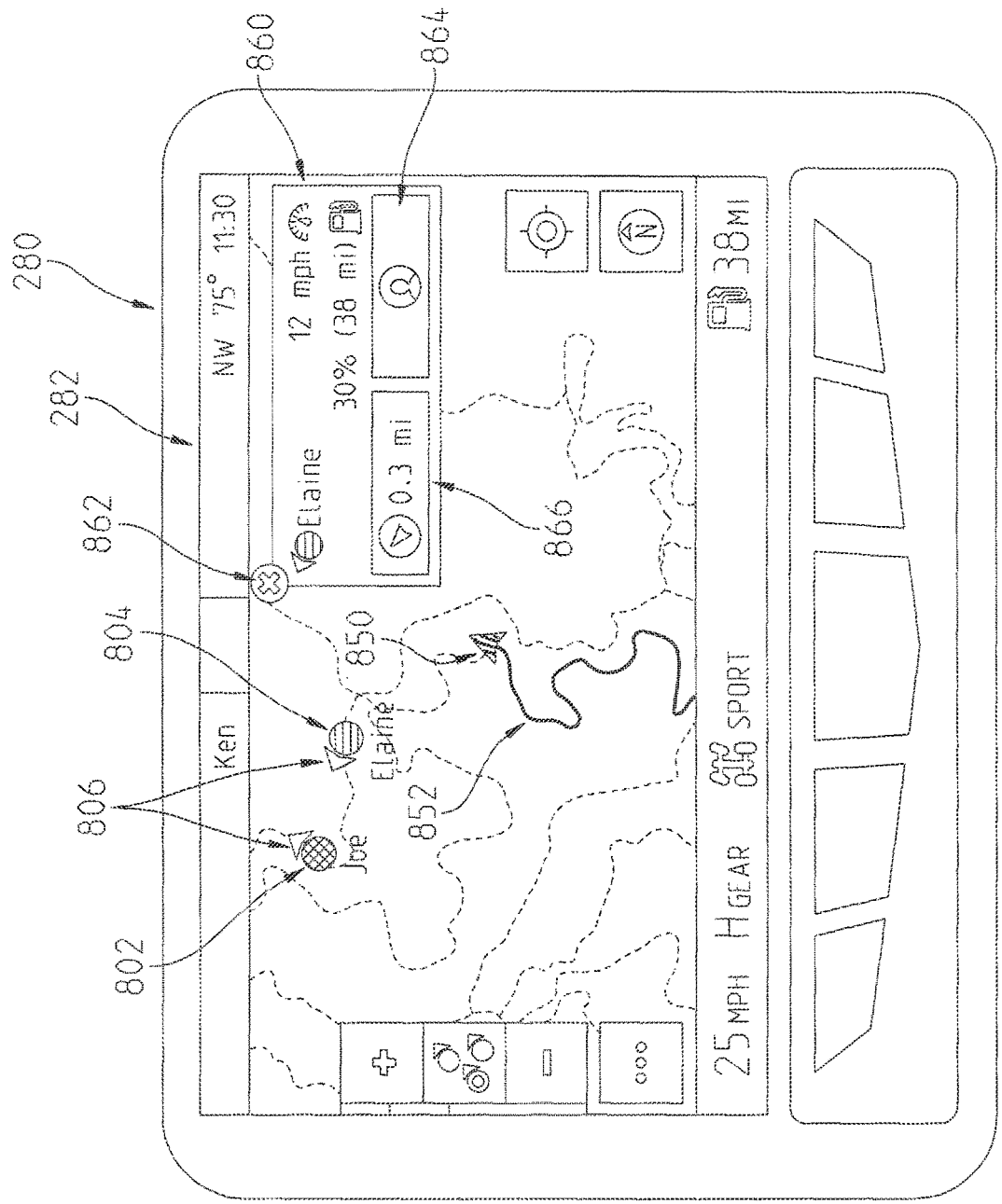
FIG. 38 illustrates an exemplary user interface including a pop-up window providing additional information regarding a selected group member.

Referring to FIG. 38, in one embodiment, each of icons 802 and 804 are selectable regions of touch display 282. In the illustrated example, icon 804 has been selected and a pop-up window 860 is presented. The pop-up window 860 includes further information regarding the group member, Elaine, associated with icon 804. Pop-up window 860 may be closed by selecting region 862. Additionally, pop-up window 860 includes a first selectable region 864 and a second selectable region 866. If region 864 is selected, additional information regarding the group member Elaine and/or the vehicle associated with Elaine is displayed on touch display 282.

Figure 39:
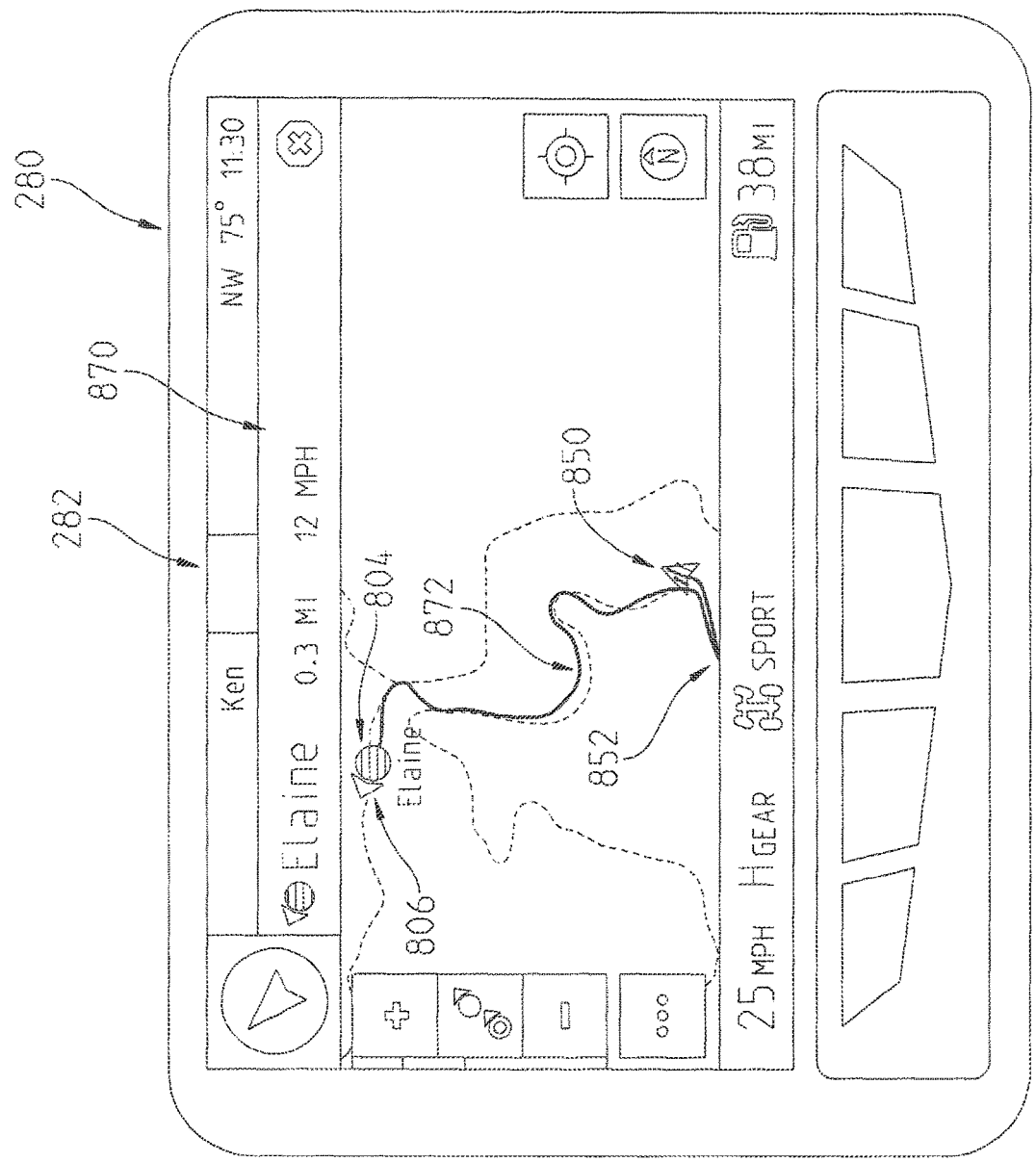
FIG. 39 illustrates an exemplary user interface illustrating a route taken by another group member.

If region 866 is selected, a user interface 870 (see FIG. 39) is displayed on touch display 282. User interface 870 auto-zooms to illustrate the location of the current vehicle including instrument cluster 280 and the vehicle associated with icon 804. User interface further includes a historical route 872 of the vehicle associated with icon 804, so that the current vehicle can follow the path of the vehicle corresponding to route 872.

Figure 40:
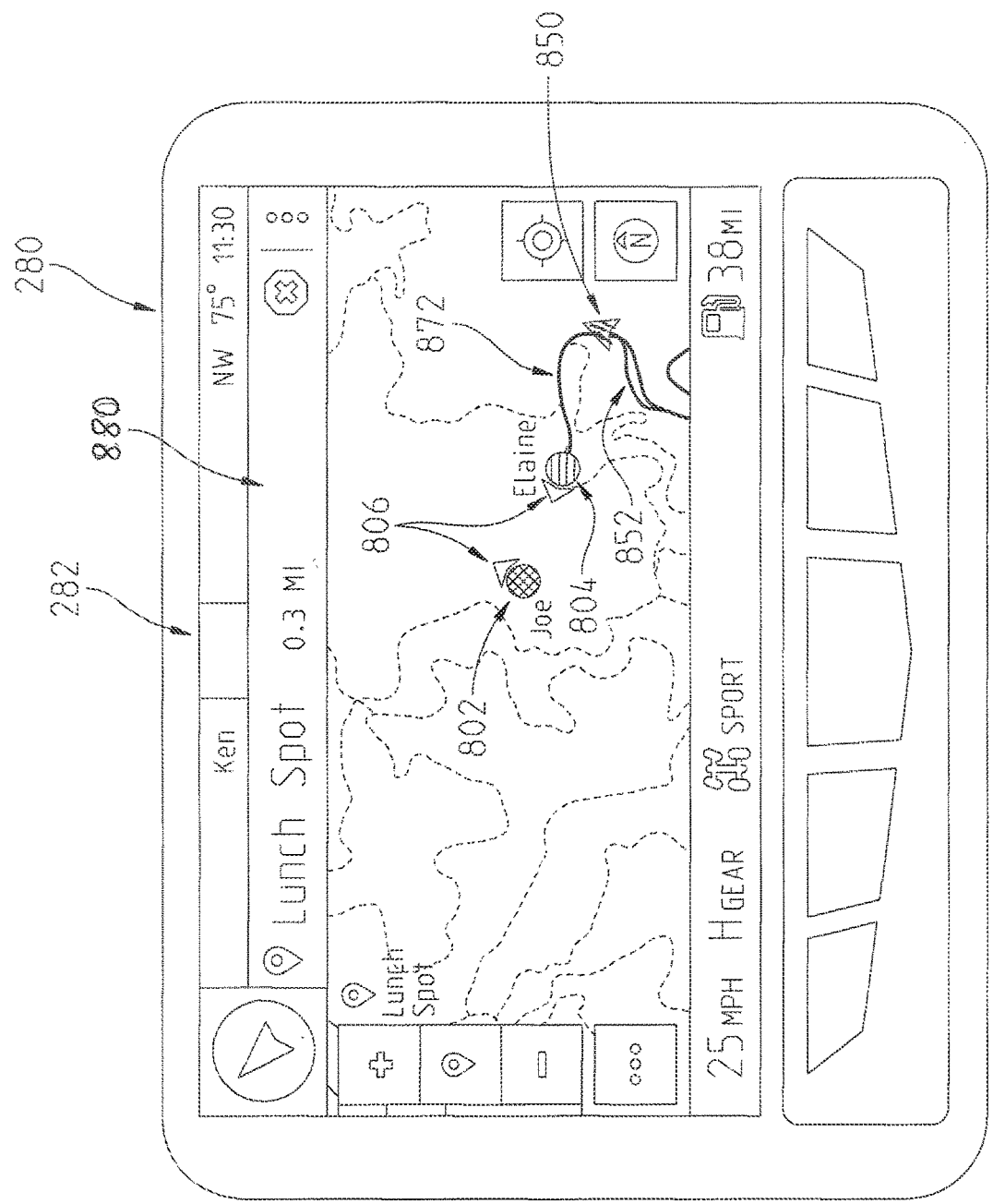
FIG. 40 illustrates an exemplary user interface illustrating a location of a waypoint and other group members.

Referring to FIG. 40, a user interface 880 is shown. User interface 880 auto-zooms to illustrate the locations of the group members and a selected waypoint 882. A user of the vehicle associated with instrument cluster 280 may choose to either follow another group member, such as the group member associated with icon 804, to waypoint 882 or have a route displayed on user interface 880 from the current location of the vehicle associated with instrument cluster 280 to waypoint 882.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A user interface of a first display associated with a recreational vehicle and communicatively coupled to a second display, comprising:
   at least one controller, the at least one controller configured to communicate with the second display;
   the first display being configurable with the at least one controller to display at least one screen layout, the at least one screen layout including:
   (i) a marker indicating a location of the second display,
   (ii) a heading indicator pointing in a direction of the second display;
   (iii) a distance to the second display; and
   (iv) a second heading indicator pointing in a direction of travel of the second display.

2. The user interface of claim 1, wherein the at least one screen layout further includes (v) a name associated with the second display.

3. The user interface of claim 1, wherein a first screen layout of the at least one screen layout includes (i) the marker indicating the location of the second display, (ii) the heading indicator pointing in the direction of the second display; and (iii) the distance to the second display.

4. The user interface of claim 3, wherein the first screen layout further includes (iv) a name associated with the second display.

5. The user interface of claim 2, wherein the first display is associated with a first user and the second display is associated with a second user, and each of the first user and the second user are associated with a first group.

6. The user interface of claim 2, wherein the first display includes a selectable area displaying a first group associated the first display and the second display.

7. The user interface of claim 2, wherein the first display is configured to send a message to the second display.

8. The user interface of claim 1, wherein the first display is communicably coupled to a first location determiner and the at least one controller includes a first network controller, the first location determiner configured to communicate a first location of the first location determiner to the first network controller, the first network controller configured to communicate with a first network; and the second display is communicably coupled to a second location determiner and a second network controller, the second location determiner configured communicate a second location of the second location determiner to the second network controller, the second network controller configured to communicate with the first network.

9. The user interface of claim 8, wherein the first network is a radio network.

10. The user interface of claim 1, wherein the first display is configured to communicate with a first user device over a second network, the first user device associated with a third location.

11. The user interface of claim 10, wherein the second network is a cellular network.

12. The user interface of claim 1, wherein the first display is supported by the recreational vehicle and moves with the recreational vehicle.

13. The user interface of claim 1, wherein the at least one screen layout includes a speed of the recreational vehicle.

14. The user interface of claim 1, wherein the at least one screen layout includes a waypoint location.

15. The user interface of claim 1, wherein the heading indicator points from a location of the first display towards a location of the second display.

* * * * *